United States Patent
Iodice et al.

(10) Patent No.: US 11,360,546 B2
(45) Date of Patent: Jun. 14, 2022

(54) TRACKING IN HAPTIC SYSTEMS

(71) Applicant: ULTRAHAPTICS IP LIMITED, Bristol (GB)

(72) Inventors: Michele Iodice, Bristol (GB); Benjamin John Oliver Long, Bristol (GB); Rafel Jibry, Bristol (GB)

(73) Assignee: ULTRAHAPTICS IP LTD, Bristol (GB)

( * ) Notice: Subject to any disclaimer, the term of this patent is extended or adjusted under 35 U.S.C. 154(b) by 0 days.

(21) Appl. No.: 16/228,760

(22) Filed: Dec. 21, 2018

(65) Prior Publication Data
US 2019/0196578 A1 Jun. 27, 2019

Related U.S. Application Data

(60) Provisional application No. 62/776,554, filed on Dec. 7, 2018, provisional application No. 62/776,457, filed
(Continued)

(51) Int. Cl.
*G06F 3/01* (2006.01)
*G06T 7/20* (2017.01)
(Continued)

(52) U.S. Cl.
CPC .............. *G06F 3/011* (2013.01); *G01S 15/66* (2013.01); *G06F 3/016* (2013.01); *G06T 7/20* (2013.01);
(Continued)

(58) Field of Classification Search
CPC .......... G06F 3/011; G06F 3/016; G06F 3/017; G10K 11/346; G06T 7/20; G06T 7/70;
(Continued)

(56) References Cited

U.S. PATENT DOCUMENTS

| | | | |
|---|---|---|---|
| 4,218,921 A | 8/1980 | Berge | |
| 4,771,205 A | 9/1988 | Mequio | |

(Continued)

FOREIGN PATENT DOCUMENTS

| | | |
|---|---|---|
| CA | 2470115 A1 | 6/2003 |
| CN | 101986787 | 3/2011 |

(Continued)

OTHER PUBLICATIONS

Corrected Notice of Allowability dated Jun. 21, 2019 for U.S. Appl. No. 15/966,213 (2 pages).
(Continued)

*Primary Examiner* — Tat C Chio
(74) *Attorney, Agent, or Firm* — Koffsky Schwalb LLC; Mark I. Koffsky

(57) ABSTRACT

Described herein are techniques for tracking objects (including human body parts such as a hand), namely: 1) two-state transducer interpolation in acoustic phased-arrays; 2) modulation techniques in acoustic phased-arrays; 3) fast acoustic full matrix capture during haptic effects; 4) time-of-flight depth sensor fusion system; 5) phase modulated spherical wave-fronts in acoustic phased-arrays; 6) long wavelength phase modulation of acoustic field for location and tracking; and 7) camera calibration through ultrasonic range sensing.

12 Claims, 27 Drawing Sheets

Related U.S. Application Data on Dec. 6, 2018, provisional application No. 62/776,449, filed on Dec. 6, 2018, provisional application No. 62/776,274, filed on Dec. 6, 2018, provisional application No. 62/776,439, filed on Dec. 6, 2018, provisional application No. 62/776,209, filed on Dec. 6, 2018, provisional application No. 62/609,576, filed on Dec. 22, 2017.

(51) Int. Cl.
  *G01S 15/66* (2006.01)
  *G06T 7/70* (2017.01)
  *G10K 11/34* (2006.01)
  *G06V 40/10* (2022.01)

(52) U.S. Cl.
  CPC .............. *G06T 7/70* (2017.01); *G06V 40/107* (2022.01); *G10K 11/346* (2013.01); *G06F 3/017* (2013.01); *G06T 2207/10028* (2013.01); *G06T 2207/30196* (2013.01)

(58) Field of Classification Search
  CPC ........... G06T 2207/10028; G06T 2207/30196; G06K 9/00375; G01S 15/66
  See application file for complete search history.

(56) References Cited

U.S. PATENT DOCUMENTS

| | | | |
|---|---|---|---|
| 4,881,212 | A | 11/1989 | Takeuchi |
| 5,226,000 | A | 7/1993 | Moses |
| 5,243,344 | A | 9/1993 | Koulopoulos |
| 5,329,682 | A | 7/1994 | Thurn |
| 5,422,431 | A | 6/1995 | Ichiki |
| 5,426,388 | A | 6/1995 | Flora |
| 5,477,736 | A | 12/1995 | Lorraine |
| 5,511,296 | A | 4/1996 | Dias |
| 5,859,915 | A | 1/1999 | Norris |
| 6,029,518 | A | 2/2000 | Oeftering |
| 6,193,936 | B1 | 2/2001 | Gardner |
| 6,503,204 | B1 | 1/2003 | Sumanaweera |
| 6,647,359 | B1 | 11/2003 | Verplank |
| 6,771,294 | B1 | 8/2004 | Pulli |
| 6,772,490 | B2 | 8/2004 | Toda |
| 6,800,987 | B2 | 10/2004 | Toda |
| 7,107,159 | B2 | 9/2006 | German |
| 7,109,789 | B2 | 9/2006 | Spencer |
| 7,182,726 | B2 | 2/2007 | Williams |
| 7,225,404 | B1 | 5/2007 | Zilles |
| 7,345,600 | B1 | 3/2008 | Fedigan |
| 7,487,662 | B2 | 2/2009 | Schabron |
| 7,577,260 | B1 | 8/2009 | Hooley |
| 7,692,661 | B2 | 4/2010 | Cook |
| RE42,192 | E | 3/2011 | Schabron |
| 7,966,134 | B2 | 6/2011 | German |
| 8,000,481 | B2 | 8/2011 | Nishikawa |
| 8,123,502 | B2 | 2/2012 | Blakey |
| 8,269,168 | B1 | 9/2012 | Axelrod |
| 8,279,193 | B1 | 10/2012 | Birnbaum |
| 8,369,973 | B2 | 2/2013 | Risbo |
| 8,607,922 | B1 | 12/2013 | Werner |
| 8,833,510 | B2 | 9/2014 | Koh |
| 8,884,927 | B1 | 11/2014 | Cheatham, III |
| 9,208,664 | B1 | 12/2015 | Peters |
| 9,267,735 | B2 | 2/2016 | Funayama |
| 9,421,291 | B2 | 8/2016 | Robert |
| 9,612,658 | B2 | 4/2017 | Subramanian |
| 9,662,680 | B2 | 5/2017 | Yamamoto |
| 9,816,757 | B1 | 11/2017 | Zielinski |
| 9,841,819 | B2 | 12/2017 | Carter |
| 9,863,699 | B2 | 1/2018 | Corbin, III |
| 9,898,089 | B2 | 2/2018 | Subramanian |
| 9,945,818 | B2 | 4/2018 | Ganti |
| 9,977,120 | B2 | 5/2018 | Carter |
| 10,101,811 | B2 | 10/2018 | Carter |
| 10,101,814 | B2 | 10/2018 | Carter |
| 10,133,353 | B2 | 11/2018 | Eid |
| 10,140,776 | B2 | 11/2018 | Schwarz |
| 10,146,353 | B1 | 12/2018 | Smith |
| 10,469,973 | B2 | 11/2019 | Hayashi |
| 10,510,357 | B2 | 12/2019 | Kovesi |
| 10,523,159 | B2 | 12/2019 | Megretski |
| 10,569,300 | B2 | 2/2020 | Hoshi |
| 2001/0033124 | A1 | 10/2001 | Norris |
| 2002/0149570 | A1 | 10/2002 | Knowles |
| 2003/0024317 | A1 | 2/2003 | Miller |
| 2003/0144032 | A1 | 7/2003 | Brunner |
| 2003/0182647 | A1 | 9/2003 | Radeskog |
| 2004/0005715 | A1 | 1/2004 | Schabron |
| 2004/0014434 | A1 | 1/2004 | Haardt |
| 2004/0052387 | A1 | 3/2004 | Norris |
| 2004/0091119 | A1 | 5/2004 | Duraiswami |
| 2004/0210158 | A1 | 10/2004 | Organ |
| 2004/0226378 | A1 | 11/2004 | Oda |
| 2004/0264707 | A1 | 12/2004 | Yang |
| 2005/0052714 | A1 | 3/2005 | Klug |
| 2005/0056851 | A1 | 3/2005 | Althaus |
| 2005/0212760 | A1 | 9/2005 | Marvit |
| 2005/0267695 | A1 | 12/2005 | German |
| 2006/0085049 | A1 | 4/2006 | Cory |
| 2006/0090955 | A1 | 5/2006 | Cardas |
| 2006/0091301 | A1 | 5/2006 | Trisnadi |
| 2006/0164428 | A1 | 7/2006 | Cook |
| 2007/0036492 | A1 | 2/2007 | Lee |
| 2007/0094317 | A1 | 4/2007 | Wang |
| 2007/0177681 | A1 | 8/2007 | Choi |
| 2007/0263741 | A1 | 11/2007 | Erving |
| 2008/0012647 | A1 | 1/2008 | Risbo |
| 2008/0084789 | A1 | 4/2008 | Altman |
| 2008/0130906 | A1 | 6/2008 | Goldstein |
| 2008/0273723 | A1 | 11/2008 | Hartung |
| 2008/0300055 | A1 | 12/2008 | Lutnick |
| 2009/0093724 | A1 | 4/2009 | Pernot |
| 2009/0116660 | A1 | 5/2009 | Croft, III |
| 2009/0232684 | A1 | 9/2009 | Hirata |
| 2009/0251421 | A1 | 10/2009 | Bloebaum |
| 2009/0319065 | A1 | 12/2009 | Risbo |
| 2010/0013613 | A1 | 1/2010 | Weston |
| 2010/0030076 | A1 | 2/2010 | Vortman |
| 2010/0044120 | A1 | 2/2010 | Richter |
| 2010/0066512 | A1 | 3/2010 | Rank |
| 2010/0085168 | A1 | 4/2010 | Kyung |
| 2010/0103246 | A1 | 4/2010 | Schwerdtner |
| 2010/0109481 | A1 | 5/2010 | Buccafusca |
| 2010/0199232 | A1 | 8/2010 | Mistry |
| 2010/0231508 | A1 | 9/2010 | Cruz-Hernandez |
| 2010/0262008 | A1 | 10/2010 | Roundhill |
| 2010/0302015 | A1 | 12/2010 | Kipman |
| 2010/0321216 | A1 | 12/2010 | Jonsson |
| 2011/0006888 | A1 | 1/2011 | Bae |
| 2011/0010958 | A1 | 1/2011 | Clark |
| 2011/0051554 | A1 | 3/2011 | Varray |
| 2011/0066032 | A1 | 3/2011 | Vitek |
| 2011/0199342 | A1 | 8/2011 | Vartanian |
| 2011/0310028 | A1* | 12/2011 | Camp, Jr ................. G06F 3/016 345/173 |
| 2012/0057733 | A1 | 3/2012 | Morii |
| 2012/0063628 | A1 | 3/2012 | Rizzello |
| 2012/0066280 | A1 | 3/2012 | Tsutsui |
| 2012/0223880 | A1 | 9/2012 | Birnbaum |
| 2012/0229400 | A1 | 9/2012 | Birnbaum |
| 2012/0229401 | A1 | 9/2012 | Birnbaum |
| 2012/0236689 | A1 | 9/2012 | Brown |
| 2012/0243374 | A1 | 9/2012 | Dahl |
| 2012/0249409 | A1 | 10/2012 | Toney |
| 2012/0249474 | A1 | 10/2012 | Pratt |
| 2012/0299853 | A1 | 11/2012 | Dagar |
| 2012/0307649 | A1 | 12/2012 | Park |
| 2012/0315605 | A1 | 12/2012 | Cho |
| 2013/0035582 | A1 | 2/2013 | Radulescu |
| 2013/0079621 | A1 | 3/2013 | Shoham |
| 2013/0094678 | A1 | 4/2013 | Scholte |
| 2013/0100008 | A1 | 4/2013 | Marti |

(56) References Cited

U.S. PATENT DOCUMENTS

| | | |
|---|---|---|
| 2013/0101141 A1 | 4/2013 | Mcelveen |
| 2013/0173658 A1 | 7/2013 | Adelman |
| 2014/0027201 A1 | 1/2014 | Islam |
| 2014/0104274 A1 | 4/2014 | Hilliges |
| 2014/0139071 A1 | 5/2014 | Yamamoto |
| 2014/0168091 A1 | 6/2014 | Jones |
| 2014/0204002 A1 | 7/2014 | Bennet |
| 2014/0265572 A1 | 9/2014 | Siedenburg |
| 2014/0269207 A1 | 9/2014 | Baym |
| 2014/0269208 A1 | 9/2014 | Baym |
| 2015/0002477 A1 | 1/2015 | Cheatham, III |
| 2015/0005039 A1 | 1/2015 | Liu |
| 2015/0006645 A1 | 1/2015 | Oh |
| 2015/0007025 A1 | 1/2015 | Sassi |
| 2015/0013023 A1 | 1/2015 | Wang |
| 2015/0066445 A1 | 3/2015 | Lin |
| 2015/0070147 A1 | 3/2015 | Cruz-Hernandez |
| 2015/0070245 A1 | 3/2015 | Han |
| 2015/0078136 A1 | 3/2015 | Sun |
| 2015/0081110 A1 | 3/2015 | Houston |
| 2015/0110310 A1 | 4/2015 | Minnaar |
| 2015/0130323 A1 | 5/2015 | Harris |
| 2015/0168205 A1 | 6/2015 | Lee |
| 2015/0192995 A1 | 7/2015 | Subramanian |
| 2015/0220199 A1 | 8/2015 | Wang |
| 2015/0226537 A1 | 8/2015 | Schorre |
| 2015/0226831 A1 | 8/2015 | Nakamura |
| 2015/0248787 A1 | 9/2015 | Abovitz |
| 2015/0258431 A1 | 9/2015 | Stafford |
| 2015/0277610 A1 | 10/2015 | Kim |
| 2015/0304789 A1 | 10/2015 | Babayoff |
| 2015/0323667 A1 | 11/2015 | Przybyla |
| 2015/0331576 A1 | 11/2015 | Piya |
| 2015/0332075 A1 | 11/2015 | Burch |
| 2016/0019762 A1 | 1/2016 | Levesque |
| 2016/0019879 A1 | 1/2016 | Daley |
| 2016/0026253 A1 | 1/2016 | Bradski |
| 2016/0044417 A1 | 2/2016 | Clemen, Jr. |
| 2016/0124080 A1* | 5/2016 | Carter ............ H04S 7/30 367/95 |
| 2016/0138986 A1* | 5/2016 | Carlin ............ B25B 23/14 73/761 |
| 2016/0175701 A1 | 6/2016 | Froy |
| 2016/0175709 A1 | 6/2016 | Idris |
| 2016/0189702 A1 | 6/2016 | Blanc |
| 2016/0242724 A1 | 8/2016 | Lavallee |
| 2016/0246374 A1 | 8/2016 | Carter |
| 2016/0249150 A1 | 8/2016 | Carter |
| 2016/0291716 A1 | 10/2016 | Boser |
| 2016/0306423 A1 | 10/2016 | Uttermann |
| 2016/0320843 A1 | 11/2016 | Long |
| 2016/0339132 A1 | 11/2016 | Cosman |
| 2016/0374562 A1 | 12/2016 | Vertikov |
| 2017/0002839 A1 | 1/2017 | Bukland |
| 2017/0004819 A1 | 1/2017 | Ochiai |
| 2017/0018171 A1 | 1/2017 | Carter |
| 2017/0052148 A1* | 2/2017 | Estevez ............ G01N 29/11 |
| 2017/0123487 A1 | 5/2017 | Hazra |
| 2017/0123499 A1 | 5/2017 | Eid |
| 2017/0140552 A1 | 5/2017 | Woo |
| 2017/0144190 A1 | 5/2017 | Hoshi |
| 2017/0181725 A1 | 6/2017 | Han |
| 2017/0193768 A1 | 7/2017 | Long |
| 2017/0193823 A1 | 7/2017 | Jiang |
| 2017/0211022 A1* | 7/2017 | Reinke ............ C11D 3/18 |
| 2017/0336860 A1 | 11/2017 | Smoot |
| 2018/0039333 A1 | 2/2018 | Carter |
| 2018/0074580 A1 | 3/2018 | Hardee |
| 2018/0081439 A1 | 3/2018 | Daniels |
| 2018/0139557 A1 | 5/2018 | Ochiai |
| 2018/0146306 A1 | 5/2018 | Benattar |
| 2018/0151035 A1 | 5/2018 | Maalouf |
| 2018/0166063 A1 | 6/2018 | Long |
| 2018/0190007 A1 | 7/2018 | Panteleev |
| 2018/0304310 A1 | 10/2018 | Long |
| 2018/0309515 A1 | 10/2018 | Murakowski |
| 2018/0310111 A1 | 10/2018 | Kappus |
| 2018/0350339 A1 | 12/2018 | Macours |
| 2018/0361174 A1 | 12/2018 | Radulescu |
| 2019/0038496 A1 | 2/2019 | Levesque |
| 2019/0091565 A1 | 3/2019 | Nelson |
| 2019/0175077 A1 | 6/2019 | Zhang |
| 2019/0187244 A1 | 6/2019 | Riccardi |
| 2019/0196578 A1 | 6/2019 | Iodice |
| 2019/0197840 A1 | 6/2019 | Kappus |
| 2019/0197842 A1 | 6/2019 | Long |
| 2019/0235628 A1 | 8/2019 | Lacroix |
| 2020/0080776 A1 | 3/2020 | Kappus |

FOREIGN PATENT DOCUMENTS

| | | |
|---|---|---|
| CN | 102459900 | 5/2012 |
| CN | 102591512 | 7/2012 |
| CN | 103797379 | 5/2014 |
| CN | 103984414 A | 8/2014 |
| CN | 107340871 A | 11/2017 |
| EP | 309003 | 3/1989 |
| EP | 1875081 A1 | 1/2008 |
| EP | 1911530 | 4/2008 |
| EP | 2271129 A1 | 1/2011 |
| EP | 1461598 B1 | 4/2014 |
| EP | 3207817 A1 | 8/2017 |
| GB | 2464117 | 4/2010 |
| GB | 2513884 | 11/2014 |
| GB | 2513884 A | 11/2014 |
| GB | 2530036 | 3/2016 |
| JP | 2008074075 | 4/2008 |
| JP | 2010109579 | 5/2010 |
| JP | 2011172074 | 9/2011 |
| JP | 2012048378 | 3/2012 |
| JP | 2015035657 A | 2/2015 |
| JP | 2016035646 | 3/2016 |
| KR | 20120065779 | 6/2012 |
| KR | 20130055972 | 5/2013 |
| KR | 20160008280 | 1/2016 |
| WO | 9118486 | 11/1991 |
| WO | 9639754 | 12/1996 |
| WO | 03050511 A | 6/2003 |
| WO | 2005017965 | 2/2005 |
| WO | 2007144801 A2 | 12/2007 |
| WO | 2009071746 A1 | 6/2009 |
| WO | 2009112866 | 9/2009 |
| WO | 2010003836 | 1/2010 |
| WO | 2010139916 | 12/2010 |
| WO | 2011132012 A1 | 10/2011 |
| WO | 2012023864 | 2/2012 |
| WO | 2012104648 A1 | 8/2012 |
| WO | 2013179179 | 12/2013 |
| WO | 2014181084 | 11/2014 |
| WO | 2014181084 A1 | 11/2014 |
| WO | 2015006467 | 1/2015 |
| WO | 2015039622 | 3/2015 |
| WO | 2015127335 | 8/2015 |
| WO | 2016007920 | 1/2016 |
| WO | 2016095033 A1 | 6/2016 |
| WO | 2016099279 | 6/2016 |
| WO | 2016132141 A1 | 8/2016 |
| WO | 2016132144 | 8/2016 |
| WO | 2016132144 A1 | 8/2016 |
| WO | 2016137675 | 9/2016 |
| WO | 2016162058 | 10/2016 |
| WO | 2017172006 | 10/2017 |
| WO | 2020049321 A2 | 3/2020 |

OTHER PUBLICATIONS

International Search Report and Written Opinion for Application No. PCT/GB2018/053739, dated Jun. 4, 2019, 16 pages.
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).

(56) References Cited

OTHER PUBLICATIONS

Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
International Preliminary Report on Patentability for Application No. PCT/EP2017/069569 dated Feb. 5, 2019, 11 pages.
Japanese Office Action (with English language translation) for Application No. 2017-514569, dated Mar. 31, 3019, 10 pages.
Notice of Allowance dated May 30, 2019 for U.S. Appl. No. 15/966,213 (pp. 1-9).
Office Action dated Apr. 18, 2019 for U.S. Appl. No. 16/296,127 (pags 1-6).
Office Action dated Apr. 4, 2019 for U.S. Appl. No. 15/897,804 (pp. 1-10).
Office Action dated May 16, 2019 for U.S. Appl. No. 15/396,851 (pp. 1-7).
Steve Guest et al., "Audiotactile interactions in roughness perception", Exp. Brain Res (2002) 146:161-171, DOI 10.1007/s00221-002-1164-z, Accepted: May 16, 2002/Published online: Jul. 26, 2002, Springer-Verlag 2002, (11 pages).
Written Opinion for Application No. PCT/GB2017/052332, 4 pages.
Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Li, Larry, "Time-of-Flight Camera—An Introduction," Texas Instruments, Technical White Paper, SLOA190B—Jan. 2014 Revised May 2014, 10 pages.
Zeng, Wejun, "Microsoft Kinect Sensor and Its Effect," IEEE Multimedia, Apr.-Jun. 2012, 7 pages.
Kolb, et al., "Time-of-Flight Cameras in Computer Graphics," Computer Graphics forum, vol. 29 (2010), No. 1, pp. 141-159.
Iddan, et al., "3D Imaging in the Studio (and Elsewhwere . . . " Apr. 2001, 3DV systems Ltd., Yokneam, Isreal, www.3dvsystems.com.il, 9 pages.
Krim, et al., "Two Decades of Array Signal Processing Research—The Parametric Approach", IEEE Signal Processing Magazine, Jul. 1996, pp. 67-94.
Schmidt, Ralph, "Multiple Emitter Location and Signal Parameter Estimation" IEEE Transactions of Antenna and Propagation, vol. AP-34, No. 3, Mar. 1986, pp. 276-280.
Meijster, A., et al., "A General Algorithm for Computing Distance Transforms in Linear Time," Mathematical Morphology and its Applications to Image and Signal Processing, 2002, pp. 331-340.
Colgan, A., "How Does the Leap Motion Controller Work?" Leap Motion, Aug. 9, 2014, 10 pages.
Definition of "Interferometry" according to Wikipedia, 25 pages., Retrieved Nov. 2018.
Definition of "Multilateration" according to Wikipedia, 7 pages., Retrieved Nov. 2018.
Definition of "Trilateration" according to Wikipedia, 2 pages., Retrieved Nov. 2018.
E.S. Ebbini et al. (1991), Aspherical-section ultrasound phased array applicator for deep localized hyperthermia, Biomedical Engineering, IEEE Transactions on (vol. 38 Issue: 7), pp. 634-643.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
Gavrilov L R et al. (2000) "A theoretical assessment of the relative performance of spherical phased arrays for ultrasound surgery" Ultrasonics, Ferroelectrics, and Freguency Control, IEEE Transactions on (vol. 47, Issue: 1), pp. 125-139.
Pompei, F.J. (2002), "Sound from Ultrasound: The Parametric Array as an Audible Sound Source", Massachusetts Institute of Technology (132 pages).
Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Hoshi T et al, "Noncontact Tactile Display Based on Radiation Pressure of Airborne Ultrasound", IEEE Transactions on Haptics, IEEE, USA, (Jul. 1, 2010), vol. 3, No. 3, ISSN 1939-1412, pp. 155-165.
Yoshino, K. and Shinoda, H. (2013), "Visio Acoustic Screen for Contactless Touch Interface with Tactile Sensation", University of Tokyo (5 pages).
Kamakura, T. and Aoki, K. (2006) "A Highly Directional Audio System using a Parametric Array in Air" Wespac IX 2006 (8 pages).
Alexander, J. et al. (2011), Adding Haptic Feedback to Mobile TV (6 pages).
Tom Carter et al, "UltraHaptics: Multi-Point Mid-Air Haptic Feedback for Touch Surfaces", Proceedings of the 26th Annual ACM Symposium on User Interface Software and Technology, UIST'13, New York, New York, USA, (Jan. 1, 2013), ISBN 978-1-45-032268-3, pp. 505-514.
Search Report for GB1308274.8 dated Nov. 11, 2013. (2 pages).
Iwamoto T et al, "Two-dimensional Scanning Tactile Display using Ultrasound Radiation Pressure", Haptic Interfaces for Virtual Environment and Teleoperator Systems, 20 06 14th Symposium on Alexandria, VA, USA Mar. 25-26, 2006, Piscataway, NJ, USA, IEEE, (Mar. 25, 2006), ISBN 978-1-4244-0226-7, pp. 57-61.
Iwamoto et al. (2008), Non-contact Method for Producing Tactile Sensation Using Airborne Ultrasound, EuroHaptics, pp. 504-513.
Search report for PCT/GB2015/052578 dated Oct. 26, 2015 (12 pages).
Marzo et al.. Holographic acoustic elements for manipulation of levitated objects, Nature Communications DOI: I0.1038/ncomms9661 (2015) (7 pages).
Search report for PCT/GB2014/051319 dated Dec. 8, 2014 (4 pages).
Search Report for GB1415923.0 dated Mar. 11, 2015. (1 page).
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems, (pp. 2185-2188).
Obrist et al., Talking about Tactile Experiences, CHI 2013, Apr. 27-May 2, 2013 (10 pages).
Benjamin Long et al, "Rendering volumetric haptic shapes in mid-air using ultrasound", ACM Transactions on Graphics (TOG), ACM, US, (Nov. 19, 2014), vol. 33, No. 6, ISSN 0730-0301, pp. 1-10.
Freeman et al., Tactile Feedback for Above-Device Gesture Interfaces: Adding Touch to Touchless Interactions ICMI'14, Nov. 12-16, 2014, Istanbul, Turkey (8 pages).
Obrist et al., Emotions Mediated Through Mid-Air Haptics, CHI 2015, Apr. 18-23, 2015, Seoul, Republic of Korea. (10 pages).
Wilson et al., Perception of Ultrasonic Haptic Feedback on the Hand: Localisation and Apparent Motion, CHI 2014, Apr. 26-May 1, 2014, Toronto, Ontario, Canada. (10 pages).
Phys.org, Touchable Hologram Becomes Reality, Aug. 6, 2009, by Lisa Zyga (2 pages).
Iwamoto et al., Airborne Ultrasound Tactile Display: Supplement, The University of Tokyo 2008 (2 pages).
Hoshi, T., Development of Aerial-Input and Aerial-Tactile-Feedback System, IEEE World Haptics Conference 2011, p. 569-573.
EPSRC Grant summary EP/J004448/1 (dated 2011) (1 page).
Hoshi, T., Handwriting Transmission System Using Noncontact Tactile Display, IEEE Haptics Symposium 2012 pp. 399-401.
Takahashi, M. et al., Large Aperture Airborne Ultrasound Tactile Display Using Distributed Array Units, SICE Annual Conference 2010 p. 359-362.

(56) References Cited

OTHER PUBLICATIONS

Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Tom Nelligan and Dan Kass, Intro to Ultrasonic Phased Array (date unknown) (8 pages).
Light, E.D., Progress in Two Dimensional Arrays for Real Time Volumetric Imaging, 1998 (17 pages).
Casper et al., Realtime Control of Multiple-focus Phased Array Heating Patterns Based on Noninvasive Ultrasound Thermography, IEEE Trans Biomed Eng. Jan. 2012; 59(1): 95-105.
Hoshi, T., Touchable Holography, SIGGRAPH 2009, New Orleans, Louisiana, Aug. 3-7, 2009. (1 page).
Sylvia Gebhardt, Ultrasonic Transducer Arrays for Particle Manipulation (date unknown) (2 pages).
Search report and Written Opinion of ISA for PCT/GB2015/050417 dated Jul. 8, 2016 (20 pages).
Search report and Written Opinion of ISA for PCT/GB2015/050421 dated Jul. 8, 2016 (15 pages).
Search report and Written Opinion of ISA for PCT/GB2017/050012 dated Jun. 8, 2017.
Oscar Martínez-Graullera et al, "2D array design based on Fermat spiral for ultrasound imaging", Ultrasonics, (Feb. 1, 2010), vol. 50, No. 2, ISSN 0041-624X, pp. 280-289, XP055210119.
Search Report for PCT/GB2017/052332 dated Oct. 10, 2017 (12 pages).
A. Sand, Head-Mounted Display with Mid-Air Tactile Feedback, Proceedings of the 21st ACM Symposium on Virtual Reality Software and Technology, Nov. 13-15, 2015 (8 pages).
E. Bok, Metasurface for Water-to-Air Sound Transmission, Physical Review Letters 120, 044302 (2018) (6 pages).
K. Jia, Dynamic properties of micro-particles in ultrasonic transportation using phase-controlled standing waves, J. Applied Physics 116, n. 16 (2014) (12 pages).
Marco A B Andrade et al, "Matrix method for acoustic levitation simulation", IEEE Transactions on Ultrasonics, Ferroelectrics and Frequency Control, IEEE, US, (Aug. 1, 2011), vol. 58, No. 8, ISSN 0885-3010, pp. 1674-1683.
M. Barmatz et al, "Acoustic radiation potential on a sphere in plane, cylindrical, and spherical standing wave fields", The Journal of the Acoustical Society of America, New York, NY, US, (Mar. 1, 1985), vol. 77, No. 3, pp. 928-945, XP055389249.
M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).
Search Report for PCT/GB/2017/053729 dated Mar. 15, 2018 (16 pages).
Search Report for PCT/GB/2017/053880 dated Mar. 21, 2018. (13 pages).
Xin Cheng et al, "Computation of the acoustic radiation force on a sphere based on the 3-D FDTD method", Piezoelectricity, Acoustic Waves and Device Applications (SPAWDA), 2010 Symposium on, IEEE, (Dec. 10, 2010), ISBN 978-1-4244-9822-2, pp. 236-239.
Yang Ling et al, "Phase-coded approach for controllable generation of acoustical vortices", Journal of Applied Physics, American Institute of Physics, US, vol. 113, No. 15, ISSN 0021-8979, (Apr. 21, 2013), pp. 154904-154904.
International Preliminary Report on Patentability and Written Opinion issued in corresponding PCT/US2017/035009, dated Dec. 4, 2018, 8 pages.
Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Péter Tamás Kovács et al, "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Search report for PCT/US2018/028966 dated Jul. 13, 2018 (43 pages).
Search report for PCT/GB2018/051061 dated Sep. 26, 2018 (17 pages).
EPO Office Action for EP16708440.9 dated Sep. 12, 2018 (7 pages).
Notice of Allowance dated Dec. 19, 2018 for U.S. Appl. No. 15/665,629 (pp. 1-9).
Notice of Allowance dated Dec. 21, 2018 for U.S. Appl. No. 15/983,864 (pp. 1-7).
Ex Parte Quayle Action dated Dec. 28, 2018 for U.S. Appl. No. 15/966,213 (pp. 1-7).
Notice of Allowance dated Feb. 7, 2019 for U.S. Appl. No. 15/851,214 (pp. 1-7).
Office Action dated Feb. 20, 2019 for U.S. Appl. No. 15/623,516 (pp. 1-8).
"Welcome to Project Soli" video, https://atap.google.com/#project-soli Accessed Nov. 30, 2018, 2 pages.
Sixth Sense webpage, http://www.pranavmistry.com/projects/sixthsense/Accessed Nov. 30, 2018, 7 pages.
Damn Geeky, "Virtual projection keyboard technology with haptic feedback on palm of your hand," May 30, 2013, 4 pages.
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
PCT Partial International Search Report for Application No. PCT/GB2018/053404 dated Feb. 25, 2019, 13 pages.
Corrected Notice of Allowability dated Oct. 31, 2019 for U.S. Appl. No. 15/623,516 (pp. 1-2).
Extended European Search Report for Application No. EP19169929.7, dated Aug. 6, 2019, 7 pages.
International Search Report and Written Opinion for Application No. PCT/GB2019/050969, dated Jun. 13, 2019, 15 pages.
Office Action dated Aug. 22, 2019 for U.S. Appl. No. 16/160,862 (pp. 1-5).
Office Action dated Oct. 17, 2019 for U.S. Appl. No. 15/897,804 (pp. 1-10).
Office Action dated Oct. 31, 2019 for U.S. Appl. No. 15/671,107 (pp. 1-6).
Office Action dated Oct. 7, 2019 for U.S. Appl. No. 15/396,851 (pp. 1-9).
Ashish Shrivastava et al., Learning from Simulated and Unsupervised Images through Adversarial Training, Jul. 19, 2017, pp. 1-16.
Canada Application 2,909,804 Office Action dated Oct. 18, 2019, 4 pages.
Christoper M. Bishop, Pattern Recognition and Machine Learning, 2006, pp. 1-758.
David Joseph Tan et al., Fits like a Glove: Rapid and Reliable Hand Shape Personalization, 2016 IEEE Conference on Computer Vision and Pattern Recognition, pp. 5610-5619.
Diederik P. Kingma et al., Adam: A Method for Stochastic Optimization, Jan. 30, 2017, pp. 1-15.
Eric Tzeng et al., Adversarial Discriminative Domain Adaptation, Feb. 17, 2017, pp. 1-10.
European Office Action for Application No. EP16750992.6, dated Oct. 2, 2019, 3 pages.
GitHub—danfis/libccd: Library for collision detection between two convex shapes, Mar. 26, 2020, pp. 1-6.
GitHub—IntelRealSense/hand_tracking_samples: researc codebase for depth-based hand pose estimation using dynamics based tracking and CNNs, Mar. 26, 2020, 3 pages.
Hilleges et al. Interactions in the air: adding further depth to interactive tabletops, UIST '09: Proceedings of the 22nd annual ACM symposium on User interface software and technologyOct. 2009 pp. 139-148.
Hua J, Qin H., Haptics-based dynamic implicit solid modeling, IEEE Trans Vis Comput Graph. Sep.-Oct. 2004;10(5):574-86.
International Search Report and Written Opinion for Application No. PCT/GB2018/053738, dated Apr. 11, 2019, 14 pages.
International Search Report and Written Opinion for Application No. PCT/GB2019/051223, dated Aug. 8, 2019, 15 pages.

(56) References Cited

OTHER PUBLICATIONS

International Search Report and Written Opinion for Application No. PCT/GB2019/052510, dated Jan. 14, 2020, 25 pages.
Jager et al., "Air-Coupled 40-KHZ Ultrasonic 2D-Phased Array Based on a 3D-Printed Waveguide Structure", 2017 IEEE, 4 pages.
Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.
Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.
Jonathan Tompson et al., Real-Time Continuous Pose Recovery of Human Hands Using Convolutional Networks, ACM Trans. Graph. 33, 5, Article 169, Aug. 2014, pp. 1-10.
Kaiming He et al., Deep Residual Learning for Image Recognition, http://image-net.org/challenges/LSVRC/2015/ and http://mscoco.org/dataset/#detections-challenge2015, Dec. 10, 2015, pp. 1-12.
Konstantinos Bousmalis et al., Domain Separation Networks, 29th Conference on Neural Information Processing Sysgtems (NIPS 2016), Barcelona, Spain. Aug. 22, 2016, pp. 1-15.
Mahdi Rad et al., Feature Mapping for Learning Fast and Accurate 3D Pose Inference from Synthetic Images, Mar. 26, 2018, pp. 1-14.
Marin, About LibHand, LibHand—A Hand Articulation Library, www.libhand.org/index.html, Mar. 26, 2020, pp. 1-2; www.libhand.org/download.html, 1 page; www.libhand.org/examples.html, pp. 1-2.
Markus Oberweger et al., DeepPrior++: Improving Fast and Accurate 3D Hand Pose Estimation, Aug. 28, 2017, pp. 1-10.
Markus Oberweger et al., Hands Deep in Deep Learning for Hand Pose Estimation, Dec. 2, 2016, pp. 1-10.
Nina Gaissert, Christian Wallraven, and Heinrich H. Bulthoff, "Visual and Haptic Perceptual Spaces Show High Similarity in Humans", published to Journal of Vision in 2010, available at http://www.journalofvision.org/content/10/11/2 and retrieved on Apr. 22, 2020 ( Year: 2010), 20 pages.
Notice of Allowance dated Apr. 22, 2020 for U.S. Appl. No. 15/671,107 (pp. 1-5).
Notice of Allowance dated Feb. 10, 2020, for U.S. Appl. No. 16/160,862 (pp. 1-9).
Notice of Allowance dated Jun. 17, 2020 for U.S. Appl. No. 15/210,661 (pp. 1-9).
Notice of Allowance in U.S. Appl. No. 15/210,661 dated Jun. 17, 2020 (22 pages).
Office Action dated Apr. 8, 2020, for U.S. Appl. No. 16/198,959 (pp. 1-17).
Office Action dated Apr. 16, 2020 for U.S. Appl. No. 15/839,184 (pp. 1-8).
Office Action dated Apr. 17, 2020 for U.S. Appl. No. 16/401,148 (pp. 1-15).
Office Action dated Apr. 28, 2020 for U.S. Appl. No. 15/396,851 (pp. 1-12).
Office Action dated Apr. 29, 2020 for U.S. Appl. No. 16/374,301 (pp. 1-18).
Office Action dated Dec. 11, 2019 for U.S. Appl. No. 15/959,266 (pp. 1-15).
Office Action dated Feb. 25, 2020 for U.S. Appl. No. 15/960,113 (pp. 1-7).
Office Action dated Feb. 7, 2020 for U.S. Appl. No. 16/159,695 (pp. 1-8).
Office Action dated Jan. 10, 2020 for U.S. Appl. No. 16/228,767 (pp. 1-6).
Office Action dated Jan. 29, 2020 for U.S. Appl. No. 16/198,959 (p. 1-6).
Office Action dated Mar. 20, 2020 for U.S. Appl. No. 15/210,661 (pp. 1-10).
Office Action dated May 18, 2020 for U.S. Appl. No. 15/960,113 (pp. 1-21).
OGRECave/ogre—GitHub: ogre/Samples/Media/materials at 7de80a7483f20b50f2b10d7ac6de9d9c6c87d364, Mar. 26, 2020, 1 page.
Optimal regularisation for acoustic source reconstruction by inverse methods, Y. Kim, P.A. Nelson, Institute of Sound and Vibration Research, University of Southampton, Southampton, SO17 1BJ, UK 25 pages.
Partial International Search Report for Application No. PCT/GB2018/053735, dated Apr. 12, 2019, 14 pages.
Partial ISR for Application No. PCT/GB2020/050013 dated May 19, 2020 (16 pages).
Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, DOI: 10.1145/2047196.2047233, ISBN: 978-1-4503-0716-1.
Search report for PCT/GB2015/052507 dated Mar. 11, 2020 (19 pages).
Search report for PCT/GB2015/052916 dated Feb. 26, 2020 (18 pages).
Sergey Ioffe et al., Batch Normalization: Accelerating Deep Network Training by Reducing Internal Covariat Shift, Mar. 2, 2015, pp. 1-11.
Shanxin Yuan et al., BigHand2.2M Bechmark: Hand Pose Dataset and State of the Art Analysis, Dec. 9, 2017, pp. 1-9.
Shome Subhra Das, Detectioin of Self Intersection in Synthetic Hand Pose Generators, 2017 Fifteenth IAPR International Conference on Machine Vision Applications (MVA), Nagoya University, Nagoya, Japan, May 8-12, 2017, pp. 354-357.
Stan Melax et al., Dynamics Based 3D Skeletal Hand Tracking, May 22, 2017, pp. 1-8.
Takahashi et al., "Noncontact Tactile Display Based on Radiation Pressure of Airborne Ultrasound" IEEE Transactions on Haptics vol. 3, No. 3, p. 165 (2010).
Toby Sharp et al., Accurate, Robust, and Flexible Real-time Hand Tracking, CHI '15, Apr. 18-23, 2015, Seoul, Republic of Korea, ACM 978-1-4503-3145-6/15/04, pp. 1-10.
Vincent Lepetit et al., Model Based Augmentation and Testing of an Annotated Hand Pose Dataset, ResearchGate, https://www.researchgate.net/publication/307910344, Sep. 2016, 13 pages.
Wooh et al., "Optimum beam steering of linear phased arays," Wave Motion 29 (1999) pp. 245-265, 21 pages.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, NY, USA, 2016, JMLR: W&Cp vol. 48.
Yaroslav Ganin et al., Domain-Adversarial Training of Neural Networks, Journal of Machine Learning Research 17 (2016) 1-35, submitted May 2015; published Apr. 2016.
Yaroslav Ganin et al., Unsupervised Domain Adaptataion by Backpropagation, Skolkovo Institute of Science and Technology (Skoltech), Moscow Region, Russia, Proceedings of the 32nd International Conference on Machine Learning, Lille, France, 2015, JMLR: W&Cp vol. 37, copyright 2015 by the author(s), 11 pages.
Bożena Smagowska & Małgorzata Pawlaczyk-Łuszczyńska (2013) Effects of Ultrasonic Noise on the Human Body—A Bibliographic Review, International Journal of Occupational Safety and Ergonomics, 19:2, 195-202.
Georgiou et al., Haptic in-Vehicle Gesture Controls, Adjunct Proceedings of the 9th International ACM Conference on Automotive User Interfaces and Interactive Vehicular Applications (AutomotiveUI '17), Sep. 24-27, 2017 (6 pages).
Imaginary Phone: Learning Imaginary Interfaces by Transferring Spatial Memory From a Familiar Device Sean Gustafson, Christian Holz and Patrick Baudisch. UIST 2011. (10 pages).
ISR and WO for PCT/GB2020/050013 (dated Jul. 13, 2020) (20 pages).
ISR and WO for PCT/GB2020/050926 (dated Jun. 2, 2020) (16 pages).
Large et al.,Feel the noise: Mid-air ultrasound haptics as a novel human-vehicle interaction paradigm, Applied Ergonomics (2019) (10 pages).

(56) References Cited

OTHER PUBLICATIONS

Mueller, GANerated Hands for Real-Time 3D Hand Tracking from Monocular RGB, Eye in-Painting with Exemplar Generative Adverserial Networks, pp. 49-59 (Jun. 1, 2018).
Notice of Allowance dated Oct. 16, 2020 for U.S. Appl. No. 16/159,695 (pp. 1-7).
Notice of Allowance dated Oct. 30, 2020 for U.S. Appl. No. 15/839,184 (pp. 1-9).
Notice of Allowance dated Oct. 6, 2020 for U.S. Appl. No. 16/699,629 (pp. 1-8).
Notice of Allowance dated Sep. 30, 2020 for U.S. Appl. No. 16/401,148 (pp. 1-10).
Notice of Allowances dated Oct. 1, 2020 for U.S. Appl. No. 15/897,804 (pp. 1-9).
Office Action dated Jun. 19, 2020 for U.S. Appl. No. 16/699,629 (pp. 1-12).
Office Action dated Jun. 25, 2020 for U.S. Appl. No. 16/228,767 (pp. 1-27).
Office Action dated Sep. 18, 2020 for U.S. Appl. No. 15/396,851 (pp. 1-14).
Office Action dated Sep. 21, 2020 for U.S. Appl. No. 16/198,959 (pp. 1-17).
Rocchesso et al.,Accessing and Selecting Menu Items by in-Air Touch, ACM CHItaly' 19, Sep. 23-25, 2019, Padova, Italy (9 pages).
Seungryul, Pushing the Envelope for RGB-based Dense 3D Hand Pose Estimation for RGB-based Desne 3D Hand Pose Estimation via Neural Rendering, arXiv:1904.04196v2 [cs.CV] Apr. 9, 2019 (5 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Teixeira, et al., "A brief introduction to Microsoft's Kinect Sensor," Kinect, 26 pages, retrieved Nov. 2018.
Aoki et al., Sound location of stero reproduction with parametric loudspeakers, Applied Acoustics 73 (2012) 1289-1295 (7 pages).
Bajard et al., BKM: A New Hardware Algorithm for Complex Elementary Functions, 8092 IEEE Transactions on Computers 43 (1994) (9 pages).
Bajard et al., Evaluation of Complex Elementary Functions / A New Version of BKM, SPIE Conference on Advanced Signal Processing, Jul. 1999 (8 pages).
Bortoff et al., Pseudolinearization of the Acrobot using Spline Functions, IEEE Proceedings of the 31st Conference on Decision and Control, Sep. 10, 1992 (6 pages).
Corrected Notice of Allowability dated Jan. 14, 2021 for U.S. Appl. No. 15/897,804 (pp. 1-2).
ISR and WO for PCT/GB2020/052544 (dated Dec. 18, 2020) (14 pages).
ISR and WO for PCT/GB2020/052545 (dated Jan. 27, 2021) (14 pages).
ISR and WO for PCT/GB2020/052829 (dated Feb. 1, 2021) (15 pages).
Office Action dated Dec. 7, 2020 for U.S. Appl. No. 16/563,608 (pp. 1-8).
Office Action dated Mar. 11, 2021 for U.S. Appl. No. 16/228,767 (pp. 1-23).
Search Report by EPO for EP 17748466 dated Jan. 13, 2021 (16 pages).
Wang et al., Device-Free Gesture Tracking Using Acoustic Signals, ACM MobiCom '16, pp. 82-94 (13 pages).
Anonymous: "How does Ultrahaptics technology work?—Ultrahaptics Developer Information", Jul. 31, 2018 (Jul. 31, 2018), XP055839320, Retrieved from the Internet: URL:https://developer.ultrahaptics.com/knowledgebase/haptics-overview/ [retrieved on Sep. 8, 2021].
Corrected Notice of Allowability dated Nov. 24, 2021 for U.S. Appl. No. 16/600,500 (pp. 1-5).
EPO 21186570.4 Extended Search Report dated Oct. 29, 2021.
EPO Application 18 725 358.8 Examination Report dated Sep. 22, 2021.
EPO Examination Search Report 17 702 910.5 (dated Jun. 23, 2021).
International Search Report and Written Opinion for App. No. PCT/GB2021/051590, dated Nov. 11, 2021, 20 pages.
Notice of Allowance dated Nov. 5, 2021 for U.S. Appl. No. 16/899,720 (pp. 1-9).
Office Action (Non-Final Rejection) dated Dec. 20, 2021 for U.S. Appl. No. 17/195,795 (pp. 1-7).
Office Action (Notice of Allowance and Fees Due (PTOL-85)) dated Dec. 14, 2021 for U.S. Appl. No. 17/170,841 (pp. 1-8).
Office Action dated Oct. 29, 2021 for U.S. Appl. No. 16/198,959 (pp. 1-7).
Hoshi et al.,Tactile Presentation by Airborne Ultrasonic Oscillator Array, Proceedings of Robotics and Mechatronics Lecture 2009, Japan Society of Mechanical Engineers; May 24, 2009 (5 pages).
ISR & WO for PCT/GB2020/052545 (dated Jan. 27, 2021) 14 pages.
ISR for PCT/GB2020/052546 (dated Feb. 23, 2021) (14 pages).
ISR for PCT/GB2020/053373 (dated Mar. 26, 2021) (16 pages).
Notice of Allowance dated Apr. 20, 2021 for U.S. Appl. No. 16/563,608 (pp. 1-5).
Notice of Allowance dated Jun. 10, 2021 for U.S. Appl. No. 17/092,333 (pp. 1-9).
Notice of Allowance dated Jun. 25, 2021 for U.S. Appl. No. 15/396,851 (pp. 1-10).
Office Action dated Jun. 25, 2021 for U.S. Appl. No. 16/899,720 (pp. 1-5).
Office Action dated May 13, 2021 for U.S. Appl. No. 16/600,500 (pp. 1-9).
Office Action dated May 14, 2021 for U.S. Appl. No. 16/198,959 (pp. 1-6).
A. B. Vallbo, Receptive field characteristics of tactile units with myelinated afferents in hairy skin of human subjects, Journal of Physiology (1995), 483.3, pp. 783-795.
Amanda Zimmerman, The gentle touch receptors of mammalian skin, Science, Nov. 21, 2014, vol. 346 Issue 6212, p. 950.
Corrected Notice of Allowability dated Aug. 9, 2021 for U.S. Appl. No. 15/396,851 (pp. 1-6).
Henrik Bruus, Acoustofluidics 2: Perturbation theory and ultrasound resonance modes, Lab Chip, 2012, 12, 20-28.
Hyunjae Gil, Whiskers: Exploring the Use of Ultrasonic Haptic Cues on the Face, CHI 2018, Apr. 21-26, 2018, Montréal, QC, Canada.
India Morrison, The skin as a social organ, Exp Brain Res (2010) 204:305-314.
Jonaschatel-Goldman, Touch increases autonomic coupling between romantic partners, Frontiers in Behavioral Neuroscience Mar. 2014, vol. 8, Article 95.
Kai Tsumoto, Presentation of Tactile Pleasantness Using Airborne Ultrasound, 2021 IEEE World Haptics Conference (WHC) Jul. 6-9, 2021. Montreal, Canada.
Keisuke Hasegawa, Electronically steerable ultrasound-driven long narrow air stream, Applied Physics Letters 111, 064104 (2017).
Keisuke Hasegawa, Midair Ultrasound Fragrance Rendering, IEEE Transactions on Visualization and Computer Graphics, vol. 24, No. 4, Apr. 2018 1477.
Keisuke Hasegawa,,Curved acceleration path of ultrasound-driven airflow, J. Appl. Phys. 125, 054902 (2019).
Line S Loken, Coding of pleasant touch by unmyelinated afferents in humans, Nature Neuroscience vol. 12 [ No. 5 [ May 2009 547.
Mariana von Mohr, The soothing function of touch: affective touch reduces feelings of social exclusion, Scientific Reports, 7: 13516, Oct. 18, 2017.
Mitsuru Nakajima, Remotely Displaying Cooling Sensation via Ultrasound-Driven Air Flow, Haptics Symposium 2018, San Francisco, USA p. 340.
Mohamed Yacine Tsalamlal, Affective Communication through Air Jet Stimulation: Evidence from Event-Related Potentials, International Journal of Human-Computer Interaction 2018.
Notice of Allowance dated Jul. 22, 2021 for U.S. Appl. No. 16/600,500 (pp. 1-9).

(56) References Cited

OTHER PUBLICATIONS

Office Action dated Aug. 10, 2021 for U.S. Appl. No. 16/564,016 (pp. 1-14).
Office Action dated Aug. 19, 2021 for U.S. Appl. No. 17/170,841 (pp. 1-9).
Office Action dated Aug. 9, 2021 for U.S. Appl. No. 17/068,825 (pp. 1-9).
Office Action dated Sep. 16, 2021 for U.S. Appl. No. 16/600,496 (pp. 1-8).
Office Action dated Sep. 24, 2021 for U.S. Appl. No. 17/080,840 (pp. 1-9).
Rochelle Ackerley, Human C-Tactile Afferents are Tuned to the Temperature of a Skin-Stroking Caress, J. Neurosci., Feb. 19, 2014, 34(8):2879-2883.
Ryoko Takahashi, Tactile Stimulation by Repetitive Lateral Movement of Midair Ultrasound Focus, Journal of Latex Class Files, vol. 14, No. 8, Aug. 2015.
Stanley J. Bolanowski, Hairy Skin: Psychophysical Channels and Their Physiological Substrates, Somatosensory and Motor Research, vol. 11. No. 3, 1994, pp. 279-290.
Stefan G. Lechner, Hairy Sensation, Physiology 28: 142-150, 2013.
Supplemental Notice of Allowability dated Jul. 28, 2021 for U.S. Appl. No. 16/563,608 (pp. 1-2).
Supplemental Notice of Allowability dated Jul. 28, 2021 for U.S. Appl. No. 17/092,333 (pp. 1-2).
Takaaki Kamigaki, Noncontact Thermal and Vibrotactile Display Using Focused Airborne Ultrasound, EuroHaptics 2020, LNCS 12272, pp. 271-278, 2020.
Tomoo Kamakura, Acoustic streaming induced in focused Gaussian beams, J. Acoust. Soc. Am. 97 (5), Pt. 1, May 1995 p. 2740.
Uta Sailer, How Sensory and Affective Attributes Describe Touch Targeting C-Tactile Fibers, Experimental Psychology (2020), 67(4), 224-236.

\* cited by examiner

TRACKING IN HAPTIC SYSTEMS

RELATED APPLICATION

This application claims the benefit of seven U.S. Provisional Patent Applications, each of which is incorporated by reference in its entirety:
1) Ser. No. 62/609,576, filed on Dec. 22, 2017;
2) Ser. No. 62/776,209, filed on Dec. 6, 2018;
3) Ser. No. 62/776,274, filed on Dec. 6, 2018;
4) Ser. No. 62/776,439, filed on Dec. 6, 2018;
5) Ser. No. 62/776,449, filed on Dec. 6, 2018;
6) Ser. No. 62/776,457, filed on Dec. 6, 2018; and
7) Ser. No. 62/776,554, filed on Dec. 7, 2018.

FIELD OF THE DISCLOSURE

The present disclosure relates generally to improved techniques for tracking objects and human body parts, such as hands, in haptic systems.

BACKGROUND

A continuous distribution of sound energy, which will be referred to as an "acoustic field", can be used for a range of applications, including parametric audio, haptic feedback in mid-air and the levitation of objects. By defining one or more control points in space, the acoustic field can be controlled. Each point can be assigned a value equating to a desired amplitude at the control point. A physical set of transducers can then be controlled to create an acoustic field exhibiting the desired amplitude at the control points.

By changing the amplitude and/or the phase angle at the control points, a variety of different effects can be produced to create haptic feedback, levitate objects or produce audible sound. Consider a haptic feedback system as an example scenario. Haptic feedback is generated by an array of transducers, and a user's gesture is recognized by means of an optical camera. By recognizing the user's gesture, an action is performed, and a different haptic feedback is provided as a response.

An effective and elegant way of performing the hand tracking and the gesture recognition, while providing a haptic feedback to the user (or in general producing an acoustic field), can be achieved exclusively using sound energy. This technique makes use of a transducer output obtained as an interpolation of the transducers' state between a plane-wave state and a focused-wave state. With this solution, for half of the time the transducers move towards a plane wave state, when the hand tracking is performed exploiting the modulated feature of the reflected signals, and a focused-wave state, when the haptic feedback is generated in mid-air. The tracking signal may be implemented in practice as modulation by amplitude, phase and frequency. The tracking waveform should be distinct in frequency components and/or a signal made up of suitably orthogonal functions so that it may be picked out of the mix of frequencies expressed at the control point. These signals would be reflected from objects in the field allowing existing echo processing techniques to perform tracking.

Further, by controlling the amplitude and phase angle of an acoustic field, a variety of different effects can be produced (e.g. creating haptics feedback, levitate objects, produce audible sound, tractor beaming objects). The generation of effective haptic feedback, on top of keeping the audible noise low, as well as any other further requirements at once, is not trivial even with complete control over these and therefore techniques and methods that can achieve this are valuable.

Further, phase singularities may be introduced into a largely monochromatic ultrasonic wave in order to determine the time-of-flight (ToF) by detecting a reflection of the phase change and thus calculating when and where the phase singularity originated. This has previously been shown by focusing a phase singularity to coincide at a point and then measuring the reflected response from this location to determine a distance from a flat array.

Further, accurate and fast 3D scene analysis and hand gesture recognition are essential tasks for many applications in computer graphics, ranging from human-machine interaction for gaming and entertainment and virtual and augmented reality, to industrial and healthcare, automotive, object tracking and robotics applications. As example scenarios, 3D geometrical information of real environment could be used to remotely control the full movements of a humanized robot, or to receive haptic feedbacks onto the bare skin, as it happens with haptic feedback systems.

This challenge is typically tackled by the computer vision community, exploiting the propagation of electromagnetic waves in the range of 400-1000 nm (i.e. both the visible and invisible infrared spectra) by means of optical systems.

Further, by changing the amplitude and/or the phase angle at the control points, a variety of different effects can be produced to create haptic feedback, levitate objects or produce audible sound. Consider a haptic feedback system as an example scenario. Haptic feedback is generated by focused ultrasonic waves, and a user's gesture is recognized by means of an optical camera. By recognizing the user's gesture, an action is performed, and a different haptic feedback is provided as a response.

An effective and elegant way of performing the hand tracking, while providing a haptic feedback to the user (or in general producing the desired acoustic field), can be achieved exclusively using sound energy. The generated acoustic field may consist of phase modulated spherical wave-fronts. Inserting phase shifts in the in-phase carrier frequency of each transducers of a 2D array, in such a manner to make them collide at a focus, yields the generation of spherical wave-fronts with different phases, within a multitude of different amplitude modulated wave-fronts. The tracking system exploits the benefit of having a spherical spreading wave-front, as opposed to acoustic amplitude and phase beaming. The tracking waveform should be a signal made up of suitably orthogonal functions so that it may be picked at receivers' locations. These signals would be reflected from objects in the field allowing existing echo processing techniques such as multilateration to perform tracking.

A different, existing solution to the stated problem of producing an acoustic field with known features and simultaneously using tracking systems was introduced in the US Application patent US/2017 0193768A1 "Calibration and Detection Techniques in Haptic Systems", section IV, where the concept of "virtual acoustic point source" was described for the first time. The "virtual acoustic point source" is generated by beaming amplitude and phase inversions at a focus. In fact, quoting literally: "These sources would be reflected from objects in the field allowing existing sonar, range-finding and acoustic imaging techniques to function by applying a filter to received signals such that only the tracking signals are recovered. These tracking signals may be implemented in practice as modulation by amplitude, phase, frequency or quadrature, so long as this achieves a resulting modulation that substantially fits within bands of acoustic frequencies above the range of human hearing. Alternatively, the tracking signal may be audible, but designed to be unobtrusive in audible frequencies, which could be achieved by designing it to have similar properties to a random noise function. The tracking waveform associated with each control point should be distinct in frequency components and/or a signal made up of suitably orthogonal functions so that it may be picked out of the mix of frequencies expressed at the control point. Using further frequencies on top of each control point allows the tracking to continue to function even during periods of device activity."

Another attempt to address the problem of tracking and producing haptics at the same time is where the signal emitted from the transducers array would be a combination of a plane-wave state, in which a tracking signal could be encoded, and of a focused state, in which the acoustic field is controlled in the wanted manner to produce the haptic sensation. The concept of state interpolation is extended even further to include the possibility to interpolate between "n" states.

Further, a machine may be made to respond or react appropriately to a user's commands expressed as dynamic gestures of the hand, or else as static gestures such as placing one's hand in specific locations within a volume. An essential component of this capability is for the machine to be able to locate and track an object within the same volume.

Specifically, one example scenario of human-computer interface would be the use of a haptic feedback system, in which an acoustic field generates haptic sensations as a way to communicate information to a user. Furthermore, the system also tracks the user's hand and interprets the movements as gestures to communicate information from the user to the computer.

Furthermore, tracking a user's hand while also providing reasonable haptic sensations to the same hand using an acoustic field and without interruption adds to the challenge; conventional ranging techniques are deemed unsuitable as they would require significant interruption to the haptic sensations.

Given that the system is providing haptic sensations using an acoustic field, then using technologies other than acoustic excitation and reception for the location and tracking of the user's hand in the volume adds to the cost and complexity of the final implementation. A low cost and reliable technique is sought for locating a user's hand within a volume.

The location of an object may be determined in a number of ways using acoustic fields. One such method includes generation of an acoustic field that is transient in nature, for example where an acoustic pulse is transmitted into a volume and the reflection monitored. The time taken for the reflection to arrive from the transmission time determines the distance of the object within the volume. Multiple transmissions and multiple receivers could be utilized to determine the location of the object in three dimensions. The use of transient pulses implies that the measurements can be made only at quantized time intervals that are spaced out in time to allow the excitation to travel from the emitter, to the object and then back again. This fundamentally limits the maximum update rate of the system to be the ratio of the distance between emitter and reflector to the relatively slow speed of sound.

A further restriction is that while generating haptic sensations, it is undesirable to interrupt the haptic sensation generation in order to transmit and receive a ranging pulse as this would likely interfere with or diminish the haptic sensations.

In order to avoid disruption of the haptic experience, it is advantageous to use a method for ranging or location that is orthogonal to the haptic generation features. One such example is to encode the ranging pulse into the phase of the generated acoustic phase. A phase step applied to all or some of the emitting transducers does not interfere with the haptics, and the phase step can be demodulated after receiving the reflected pulse in order to determine the distance of the reflector. Multiple transmitters and receivers may be utilized to determine the location in three dimensions. Once again, this is based on a transient ranging technique and is thus significantly limited in the maximum update rate due to the time taken for sound to complete the journey.

It is important in such transient techniques to allow separation in time between adjacent ranging pulses to complete the journey, otherwise the receiver is unable to differentiate between them and therefore cannot determine the location of the reflector unambiguously.

Avoiding the use of transient features in the acoustic field, one could consider comparing the phase of the received acoustic wave with that of the transmitted wave. The frequency of the acoustic wave used should be outside of the audible range in order for it to be used with comfort, and so this means using either subsonic frequencies, for example around 1 Hz, or else ultrasonic frequencies, for example greater than 30 kHz.

Using subsonic frequencies means that the sensitivity of the system would be low, requiring disproportionate cost to implement with sufficiently high fidelity as to resolve small changes in phase of a subsonic wavelength for reasonable changes in physical displacement of a reflector. In real systems, the natural noise in the implementation is likely to be a significant challenge to attain the fidelity, or signal-to-noise ratio, required to estimate small changes in distance accurately.

Using ultrasonic frequencies can be equally challenging in different areas. For example, the system becomes too sensitive, delivering a high rate of change of phase difference for small changes in physical displacement. This is due to the short wavelength. For example, for an acoustic wavelength of 1 cm, then the phase comparison would wrap around the 2 Pi limit when the reflector moves 0.5 cm since the wave must travel to the reflector and then back again to the receiver. Given this, it becomes difficult, if not impossible, to locate a reflector that is more than half a wavelength away from transmitter and receiver. Furthermore, if a reflector moves more than half a wavelength between adjacent measurements then the system cannot determine the location without ambiguity and without significant cost and complexity of implementation. The practical utility of comparing the phase of the received wave to that of the wave being transmitted diminishes rapidly with increasing acoustic wave frequency and thus the systems is ultimately less reliable and less accurate.

Further, a 3D depth sensor system may operate based on brightness optimization collected with one single optical camera. The brightness of tracking objects is related to its range via an optimization algorithm, which is constantly calibrated exploiting the ground truth obtained with ultrasonic, time-of-flight measurements.

SUMMARY

Controlling an acoustic field while performing tracking of an object is often needed in many applications, like in haptic feedback systems.

Tracking signal can be implemented in practice by modulation of amplitude, phase and frequency, so to be distinct in frequency components and/or made up of suitably orthogonal functions. The signal emitted from the transducer would be a combination of a plane wave state, in which the tracking signal would be encoded, and of a focused state, in which the acoustic field is controlled in the wanted manner. The tracking signals would be reflected from objects in the field allowing existing echo processing techniques to perform tracking.

Further, by controlling the amplitude and phase angle of an acoustic field, a variety of different effects can be produced. The generation of effective haptic feedback, on top of keeping the audible noise low, as well as any other further requirements at once is not trivial even with complete control over these and therefore techniques and methods that can achieve this are valuable. Various modulation techniques are suitable for generating the desired acoustic field by controlling phase and amplitude, while keeping the audible noise low or performing other tasks, like tracking of objects.

Further, by electrically monitoring the transducer and through foreknowledge of the transducer transient response, the output pushed through the circuitry may be deconvolved and subtracted from the electrical behavior, leaving only the interactions of the reflected waves with the transducers.

Further, a time-of-flight sensor fusion system for depth and range sensing of objects is achieved with the integration of multiple data coming from embedded acoustic and optical sensors. The expenses required to process the acoustic and optical data is intended to be very low and to happen on-chip, in order to intelligently eliminate as much of the expensive bandwidth that common tracking cameras share. The integration and fusion of different data eventually define a tracking and gesture recognition system with fast response time, low latency, medium range, low power consumption, mm-level accuracy and low build cost.

Further, tracking signal can be implemented in practice by modulation of phase, so to be made up of suitably orthogonal functions. Inserting phase shifts in the in-phase carrier frequency of each transducers of a 2D array, in such a manner to make them collide at a focus, yields the generation of spherical phase modulated wave-fronts, within different (focused, spherical and in-phase) amplitude modulated wave-front. The tracking system described herein exploits the benefit of having a spherical spreading wave-front, as opposed to beamforming techniques. The tracking signals of the spherical wave-front would be reflected from objects in the field allowing existing echo processing techniques such as multilateration to perform tracking.

Further, a system of locating and tracking an object using an acoustic field from a transducer array is presented here. The system or method is orthogonal to the method used to generate haptic sensations. Therefore, the location and tracking proceeds while also providing uninterrupted haptic sensations from the same transducer array. The system allows for variable sensitivity to physical displacement, does not generate audible sound and allows location and tracking at a high rate which is independent of the range and speed of sound. Utilizing a long wavelength also allows a sparse receiver population in the transducer array, which both reduces cost of the location implementation and also maintains a high density of emitter transducers which is important for field generation for haptic feedback. Augmentations to the basic system are possible, for example varying the sensitivity to physical displacement in real time or spatial coding to use different sensitivities for different regions of the array and doing so in real time to respond to the environment, the object's position or speed. The system may be integrated into the same system that is used to generate the haptic sensations if required for reduced implementation complexity and cost. The sensitivity of the system to physical displacement may be calibrated or tuned to requirements through adjustment of the wavelength, or wavelengths in the case of spatial coding. An algorithm, data path architecture and implementation of such a technique are presented.

Further, a 3D depth sensor system based on brightness optimization collected with one single optical camera is presented. The brightness of tracking objects is related to its range via an optimization algorithm, which is constantly calibrated exploiting the ground truth obtained with ultrasonic, time-of-flight measurements.

BRIEF DESCRIPTION OF THE FIGURES

The accompanying figures, where like reference numerals refer to identical or functionally similar elements throughout the separate views, together with the detailed description below, are incorporated in and form part of the specification, serve to further illustrate embodiments of concepts that include the claimed invention and explain various principles and advantages of those embodiments.

Figure 1A:
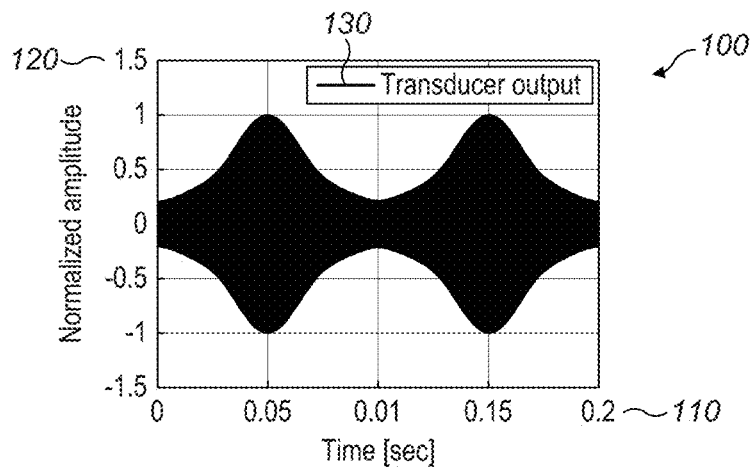
FIGS. 1A, 1B and 1C are graphs of transducer output.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION (1). Two-State Transducer Interpolation in Acoustic Phased-Arrays I. Two-State Transducer Interpolation with Phase Modulation As previously disclosed, one way of tracking a user's hand is by means of an optical camera. Introducing a phase modulation of the sinusoidal continuous waves enables the tracking of an object in mid-air by time-of-flight estimations.

In the following example, a message is encoded in the sinusoidal transmitted signal in the form of many abrupt phase shifts at known instants in time. A received signal is recorded and demodulated at some remote locations by means of receiving transducers. Introducing a phase modulation into the transducers' signal allows receiving transducers or microphones to synchronize on the reflected signal, yielding the ability to detect the distance of an object, such as the hand, from the array.

Ideally the transducers state would switch between a focused state, which as to control point activation, $U_f(t)$:

$$U_f(t) = A \sin(2\pi f_c t + \theta + \phi)) \quad (1)$$

and a plane state, which as to plane wave activation, $U_p(t)$:

$$U_p(t) = A \sin(2\pi f_c t + \phi)) \quad (2)$$

wherein A is the signal amplitude, $f_c$ is the centre frequency, $\theta$ is the phase delay added to the signal to activate the control point, and $\phi$ is the phase shift modulation applied to the signal to achieve tracking.

But since output transducers have frequency dependent amplitude behavior due to their frequency response curves, the amplitude output from the transducer fluctuates when a phase shift is encoded into the signal when phase modulation is applied. This sudden change in the output amplitude, which is usually in the form of a sharp attenuation, creates substantial audible noise from the array of transmitting transducers.

One way to remove this substantial source of noise is to use the variation in the signal; finding points in the amplitude modulation so that the sudden change in amplitude induced by the phase change coincides with the amplitude minimum. This would cause the signals generated by a transducer in the focused state $U_f(t)$ and in the plane state $U_p(t)$, to be of the form:

$$U_f(t) = A \sin(2\pi f_c t + \theta + \phi)) \cdot [1 - \cos(2\pi f_m t)] \cdot M + (1-M) \quad (3)$$

and:

$$U_p(t) = A \sin(2\pi f_c t + \phi)) \cdot [1 - \cos(2\pi f_m t)] \cdot M + (1-M) \quad (4)$$

wherein M is the modulation index and $f_m$, is the modulation frequency.

Finally, the interpolation between the two different states is achieved as follows:

$$U(t) = [1 - \cos(2\pi f_m t)] \cdot \frac{U_f(t)}{2} + [1 - 1 + \cos(2\pi f_m t)] \cdot \frac{U_p(t)}{2} \quad (5)$$

FIG. 1A shows an example of a transducer's output obtained as an interpolation between the control point activation state and the plane wave activation state. Specifically, FIG. 1A shows transducer output U(t) as obtained from the analytical model described from equation (5), with A=1, M=80%, $f_c$=40 kHz, $f_m$=10 Hz, $\theta=3\pi/2$ and $\phi=\pi$. A graph 100 has an x-axis 110 of time in seconds and a y-axis 120 of normalized amplitude. The plot shows the transducer output 130.

Figure 1B:
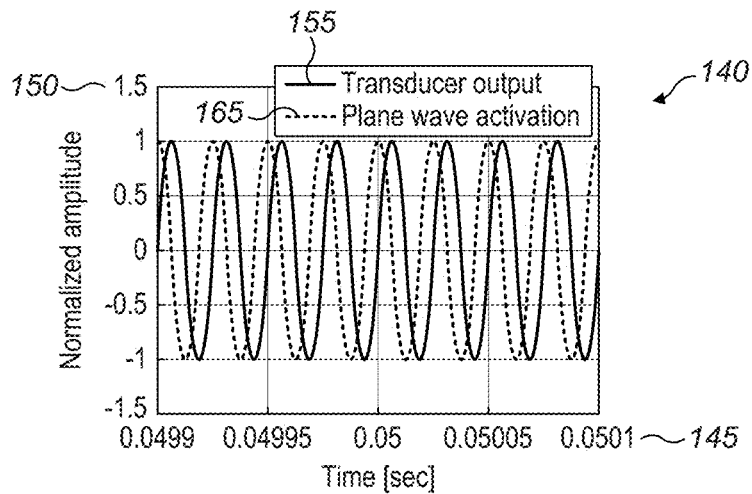

Shown in FIG. 1B is the output of the transducer matches that of the control point activation state at maxima, being totally uncorrelated to that of the plane wave activation state. A graph 140 has an x-axis 145 of time in seconds and a y-axis 150 of normalized amplitude. The plot shows the transducer output 155 and plane wave activation 165.

Figure 1C:
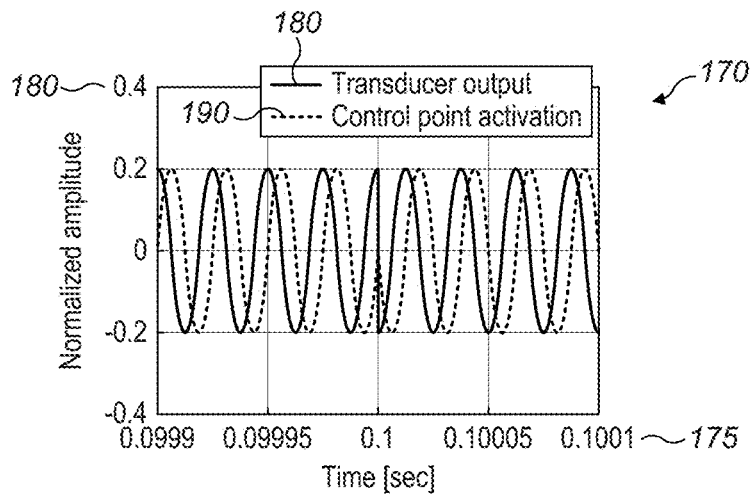

In the same way, FIG. 1C shows the matches that of the plane wave activation state at minima (where the phase shift happen) are totally uncorrelated to that of the control point activation state. A graph 170 has an x-axis 175 of time in seconds and a y-axis 180 of normalized amplitude. The plot shows the transducer output 185 and control point activation 190.

II. Arbitrary Waveforms Including Phase Modulation

Given an arbitrary waveform, n envelope detectors may be employed to find the maxima and minima of an amplitude modulated waveform. By monitoring where the minima, the zero-crossings of the waveform signal lie, phase shifts may be generated in these locations. Given an upper limit to the frequency of the phase shifts employed, which effectively can be a minimum delay criterion, the last n phase shift events may be retained. Matching against this is then a matter of maintaining n comparators, each contributing the likelihood of the hypothesis that the reflection of a phase shift is received at any given point in time. By maintaining these comparators, an arbitrary signal may be used to conduct this time-of-flight detection. This may be implemented such that the phase shift is encoded within an envelope of an ultrasonic carrier modulated with a signal intended to be parametric audio. In this and the general case, the phase shifts can then be added without materially modifying the resulting signal.

III. Two-State Transducer Interpolation with Frequency Modulation

A similar way of simultaneously tracking an object in mid-air and producing an amplitude modulated control point can be achieved by introducing a frequency modulation of the plane wave state. In fact, a small pulsed signal or chirp with distinct frequency components than the control point activation state can be used to perform tracking, so that it may be picked out of the mix of frequencies expressed at the control point. The received signals are recorded at remote locations and the time-of-flight recovered by means of standard cross-correlation algorithms. Introducing a frequency modulation into the transducers' signal allows receiving transducers or microphones to synchronize on the reflected signal, yielding the ability to detect the distance of an object, such as the hand, from the array.

Ideally the transducers state would switch between a focused state, which as to control point activation, $U_f(t)$:

$$U_f(t) = A \sin(2\pi f_c t + \theta) \quad (6)$$

and a plane state, which as to plane wave activation, $U_p(t)$:

$$U_p(t) = A \sin(2\pi f_r t) \quad (7)$$

wherein A is the signal amplitude, $f_c$ is the centre frequency of the control point activation state, $f_r$ is the centre frequency of the plane state and $\theta$ is the phase delay added to the signal to activate the control point.

The aim is to interpolate the two different states such that for half the time the device is moving towards a plane wave state and for the other half toward a focused state. One way to achieve this result is to use the variation in the signal; finding points in the amplitude modulation so that the amplitude maximum of plane wave state coincides with the amplitude minimum of the control point state. This would cause the signals generated by a transducer in the control point state $U_f(t)$ and in the plane state $U_p(t)$, to be of the form:

$$U_f(t) = A \sin(2\pi f_c t + \theta) \cdot [1 - \cos(2\pi f_m t)] \cdot M + (1-M) \quad (8)$$

and:

$$U_p(t) = A \sin(2\pi f_r t) \cdot [1 - \cos(2\pi f_m t + \pi)] \cdot M + (1-M) \quad (9)$$

wherein M is the modulation index and $f_m$, is the modulation frequency.

Finally, the interpolation between the two different states is achieved as follows:

$$U(t) = [1 - \cos(2\pi f_m t + \pi)] \cdot \frac{U_f(t)}{2} + [1 + \cos(2\pi f_m t + \pi)] \cdot \frac{U_p(t)}{2} \quad (10)$$

As a result, the output of the transducer contributes to the formation of a control point for half the time, while projecting in-phase pulsed signals or chirps for the other half of the time. Nonetheless, frequency modulation could produce audible noise. Keeping the audible noise low can be achieved by reducing the amplitude of the plane wave state activation at a minimum detectable value, or dynamically adapt amplitude and frequency of the modulation to match the tracker's requirements.

Figure 2:
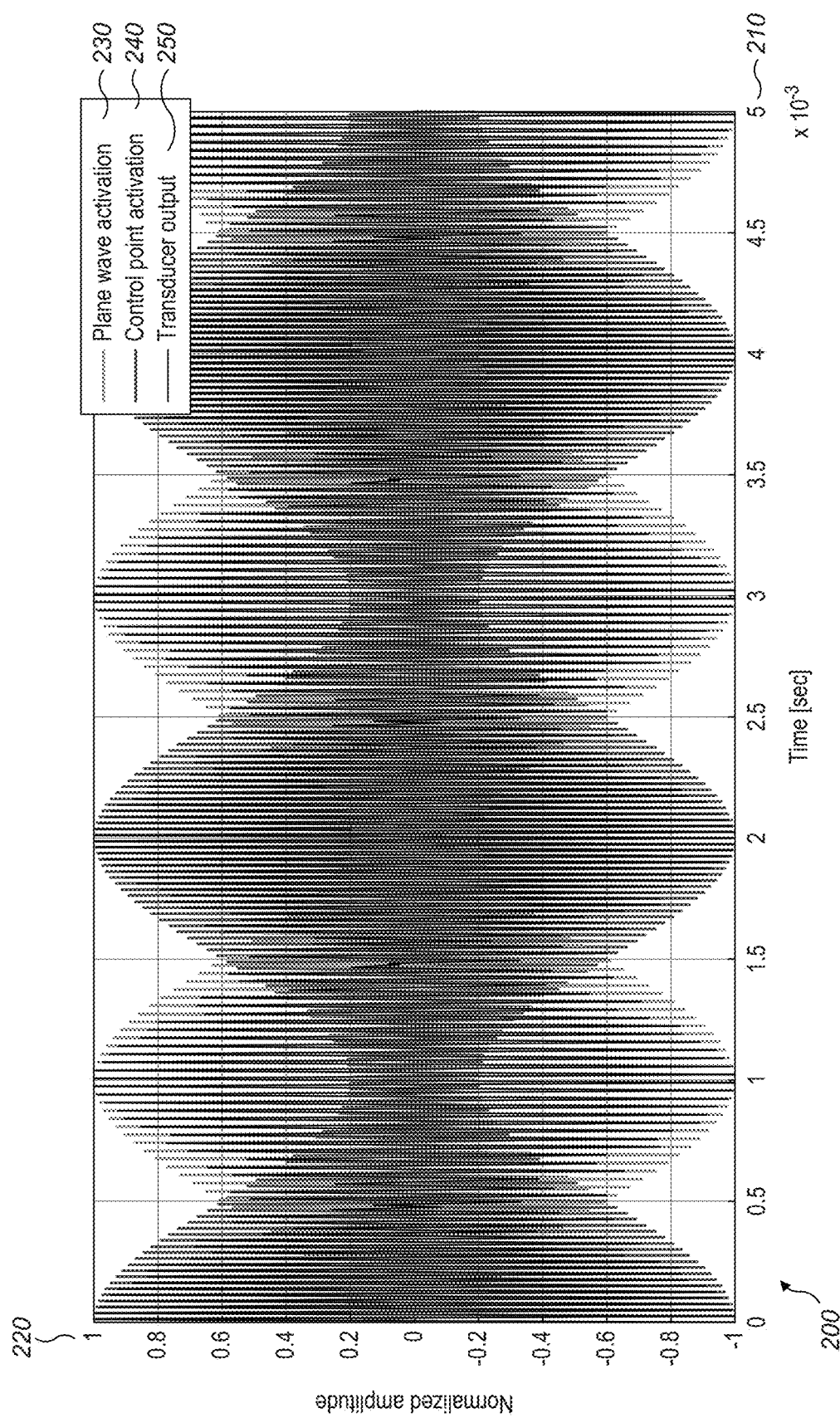
FIG. 2 is a graph of transducer output.

FIG. 2 shows an example of a transducer's output obtained as an interpolation between the control point activation state and the plane wave activation state, following equation (10). Specifically, FIG. 2 shows a transducer output $U(t)$ as obtained from the analytical model described by equation (10), with A=1, M=80%, $f_r$=30 kHz, $f_c$=40 kHz, $f_m$=500 Hz, $\theta$=2.711$\pi$, superimposed to the corresponding control point state $U_f(t)$ as obtained from equation (8), and the plane state $U_p(t)$ as obtained from equation (9). A graph 200 has an x-axis 210 of time in seconds and a y-axis 220 of normalized amplitude. The plot shows the plane wave activation 230, control point activation 240 and transducer output 250.

Figure 3A:
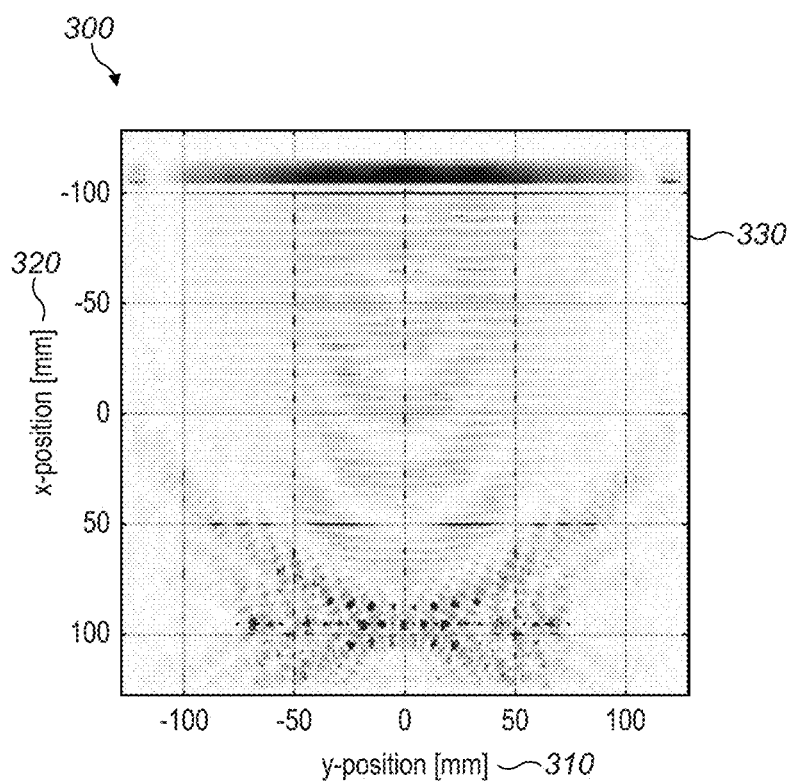
FIGS. 3A and 3B are video snapshots of a numerical simulation.
Figure 3B:
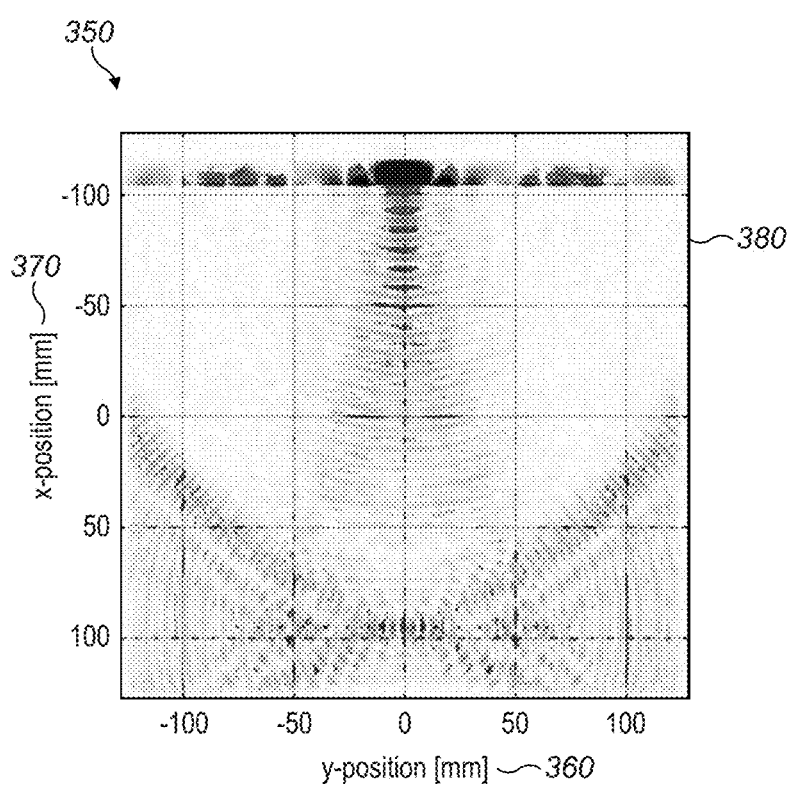

FIGS. 3A and 3B show two snapshots from a video of a two-dimensional numerical simulation accomplished with a two-state frequency modulated transducer interpolation, with the parameters described for FIG. 2. FIG. 3A is a simulation 300 with an x-axis of y-position in mm 310 and a y-axis of x-position in mm 320 with a snapshot 330. FIG. 3B is a simulation 350 with an x-axis of y-position in mm 360 and a y-axis of x-position in mm 370 with a snapshot 380. Specifically, the figures are snapshots from the video of a numerical simulation accomplished with a two-state frequency modulated transducer interpolation, showing the acoustic pressure wavefield for the plane wave activation state (FIG. 3A) and for the control point activation state (FIG. 3B). A total of 16 transducers were used in the simulation to create a central control point at 0.20 m, a horizontal reflector being positioned at the same distance from the array.

IV. Arbitrary Waveforms Tracked Via Autocorrelation

An arbitrary waveform, if delayed in time on a per transducer basis, may be made to arrive simultaneously at the focus. By employing auto-correlation with the amplitude modulation at each receiver, the time of flight may be recovered. The amplitude modulation may be formed by using an interpolation between a focused state, representing a high point in the modulated signal at the focus, and a plane wave that generates a low root-mean-squared pressure at the focus. In this way, an arbitrary waveform may be used to track the object in space, without modifying the amplitude modulated signal at the focus.

V. Tracking of the Object

As previously discussed, the introduction of phase and/or frequency modulation into the transducers' signal yields the ability to detect the distance of an object, such as the hand, from the array and control point. Each receiver yields an estimation of the distance of the object. In case phase modulation is adopted, the signal that arrives at the receiving location is a complicated analog waveform that needs to be demodulated in order to recover the original message. The demodulation is accomplished through a standard process called 'carrier recovery' which consists of figuring out both the frequency and phase of the modulating sinusoid.

In case frequency modulation is adopted, the time-of-flight is estimated by adopting standard cross-correlation algorithms.

The phase/frequency modulation can be dynamically tailored to match the sensing objective and the environment.

The presence, location and distance of the reflector in space is revealed once the time-of-flight is recovered. Moreover, if the reflector does not have a predominant dimension, a trilateration/multilateration process would reveal its approximate position in the tri-dimensional space. At contrary, if the reflector has a predominant dimension, it could be possible to trilaterate the equation of the plane of best approximation relative to an arbitrary coordinate reference system in the tri-dimensional space.

VI. Additional Disclosure

Additional disclosures is set forth as follows:

1. A technique to interpolate two different transducer states to control acoustic field and track objects.

1a. A method of paragraph 1 in which phase and amplitude are used to modulate the tracking signal.

1b. A method of paragraph 1 in which amplitude and frequency are used to modulate the tracking signal.

1c. A method of paragraph 1 in which the modulation parameters can be dynamically tailored to match the sensing objective and the environment.

1d. A method of paragraph 1 in which arbitrary waveforms are modulated by interpolating between a focused state and a plane wave state in such a way to constantly maximize amplitude at focus.

2. A technique in which arbitrary waveforms (e.g. intended to be parametric audio AM carrier wave) can be used to amplitude modulate the signal, and phase shifts can be added at the minima of the amplitude modulated signal.

(2). Modulation Techniques in Acoustic Phased-Arrays

I. Combining Amplitude and Phase Modulation

As previously disclosed, one way of creating haptic feedback is to amplitude modulate the carrier wave with an amplitude modulating signal. Introducing a phase modulation into the control point allows receiving transducers or microphones to synchronize on the reflected signal, yielding the ability to detect the distance of an obstacle, such as the hand, from the array and control point. However, since output transducers have frequency dependent amplitude behavior due to their frequency response curves, the amplitude output from the transducer fluctuates when a phase shift is encoded into the signal when phase modulation is applied. This sudden change in the output amplitude, which is usually in the form of a sharp attenuation, creates substantial audible noise from the array of transmitting transducers.

One way to remove this substantial source of noise is to use the variation in the signal; finding points in the amplitude modulation so that the sudden change in amplitude induced by the phase change mimics a portion of the already intended modulation signal. While again because of the nature of the transducer frequency response there should be a minimum time between shifts placed into the signal so that they may be detected separately, these may be otherwise placed anywhere the signal. In some cases, traditional amplitude modulation may be replaced or augmented by the addition of such phase shifts. In the case of a simple sine wave modulation and a transducer frequency response that causes an amplitude fall on the induced frequency shift, this can be simply finding the minimum portion of the signal and placing the phase shift directly before it, causing the amplitude drop to coincide with the amplitude minimum. Microphone recordings of such an inserted phase shift and comparisons to examples of a phase shift in a continuous carrier signal and a plain amplitude modulation are shown in FIGS. 4A-4F.

Figure 4A:
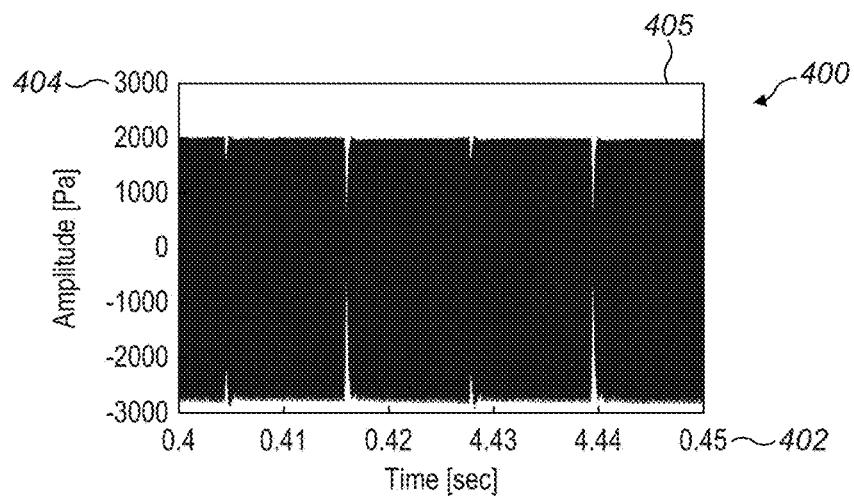
FIGS. 4A, 4B, 4C, 4D, 4E and 4F are comparisons modulations on a control point.
Figure 4B:
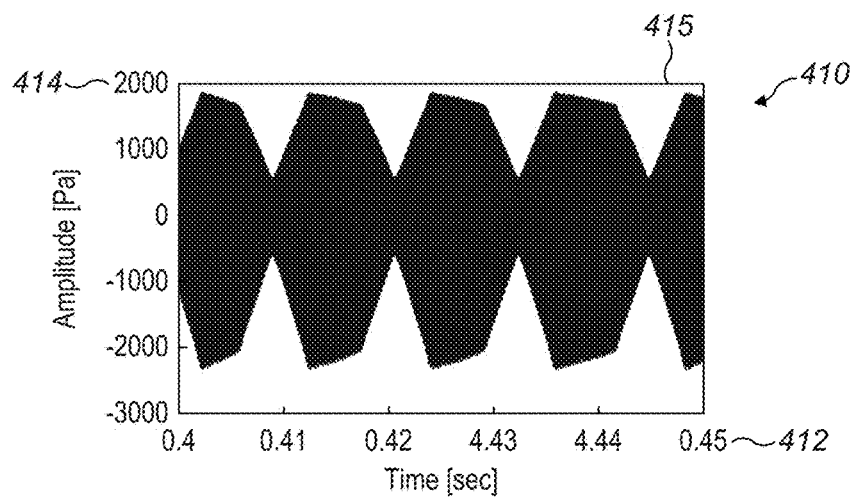
Figure 4C:
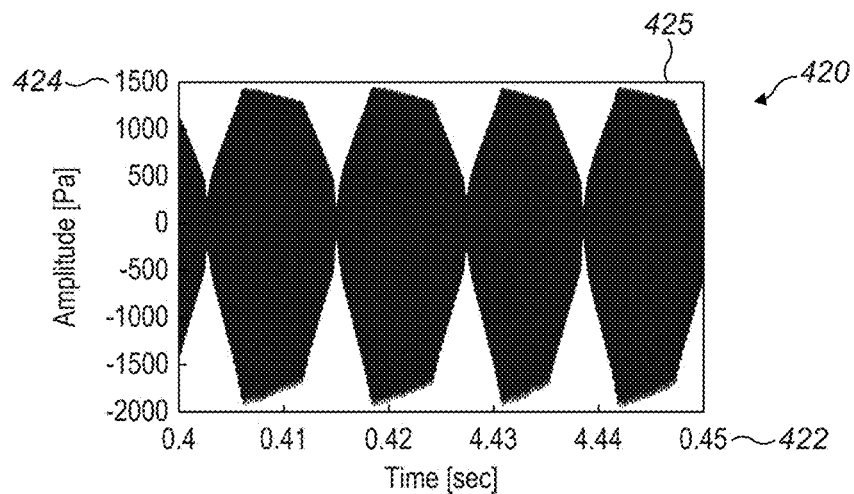
Figure 4D:
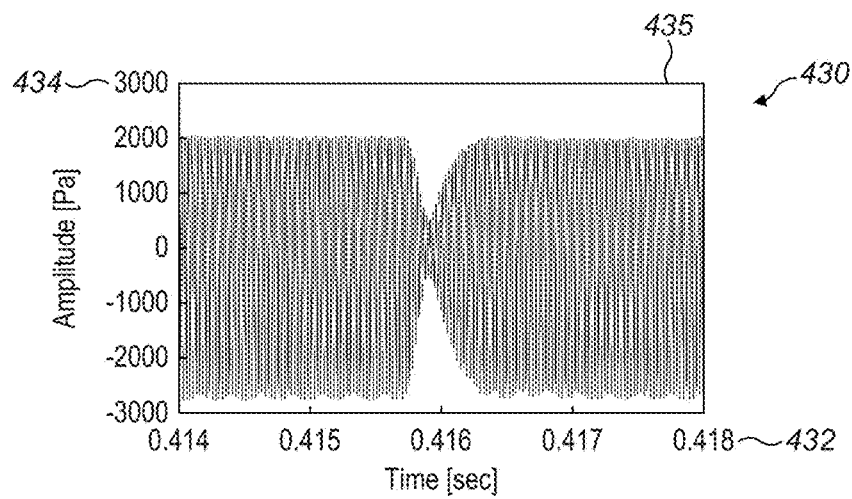
Figure 4E:
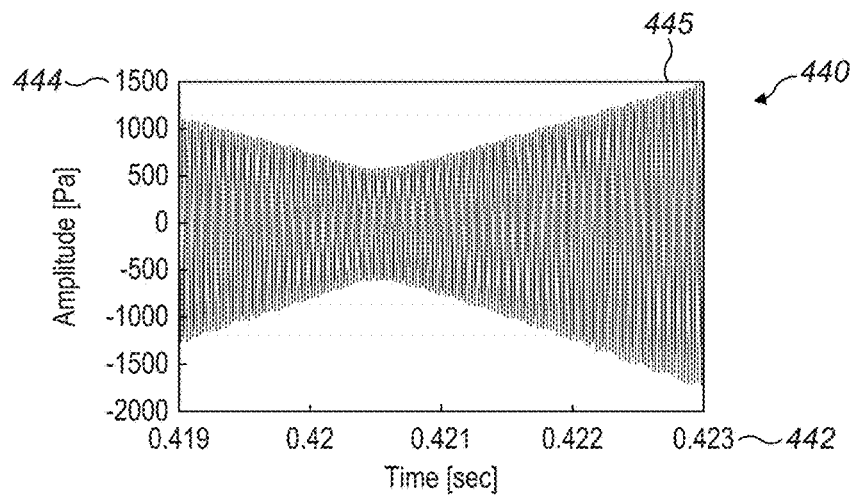
Figure 4F:
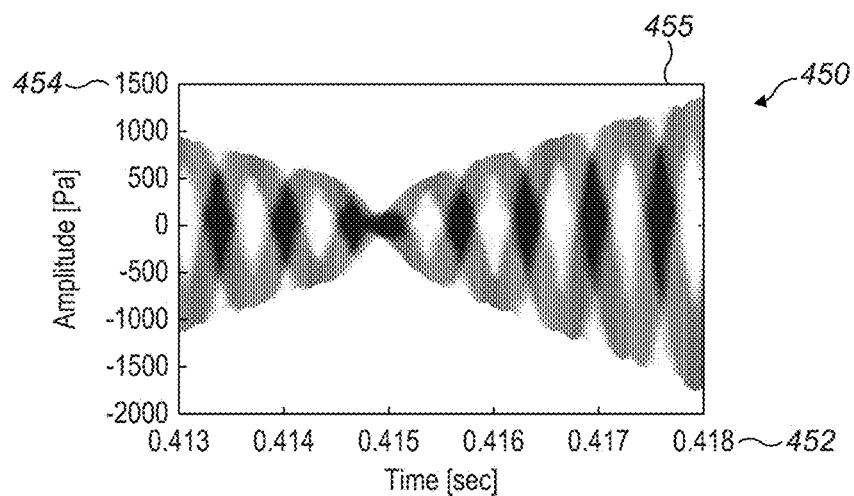

FIG. 4A shows a simulation 400 with an x-axis 402 of time in seconds and a y-axis 404 of amplitude in Pascals with a graph 405. FIG. 4B shows a simulation 410 with an x-axis 412 of time in seconds and a y-axis 414 of amplitude in Pascals with a graph 415. FIG. 4C shows a simulation 420 with an x-axis 422 of time in seconds and a y-axis 424 of amplitude in Pascals with a graph 425. FIG. 4D shows a simulation 430 with an x-axis 432 of time in seconds and a y-axis 434 of amplitude in Pascals with a graph 435. FIG. 4E shows a simulation 440 with an x-axis 442 of time in seconds and a y-axis 444 of amplitude in Pascals with a graph 445. FIG. 4F shows a simulation 450 with an x-axis 452 of time in seconds and a y-axis 454 of amplitude in Pascals with a graph 455.

FIGS. 4A-4F are comparison of different 200 Hz modulations on a control point above a transducer array recorded by a microphone. FIGS. 4A, 4B, 4C show the output of the modulated signal over 50 milliseconds, while FIGS. 4D, 4E, 4F show details of the transition over a window of 5 milliseconds. FIG. 4A, 4D show the result of introducing phase modulation to a flat carrier wave signal. The sharp changes in amplitude make this approach produce considerable audible noise. FIGS. 4B, 4E shows an amplitude modulated signal with a modulation index of 80%. FIGS. 4C, 4F show the same amplitude modulated signal with the phase shift occupying the minimum amplitude point on the periodically repeating amplitude modulation. As the decrease is much shallower compared with the case shown on the top row, the amount of audible noise generated is greatly reduced.

II. 'Haptic Chirp'—Frequency Modulation

A modulation at a single haptic frequency does not necessarily provide the most effective haptics for a control point. To convey roughness, a variety of different frequencies may be required. Potentially, a 'haptic chirp', a frequency modulation composed of different frequencies that are in the band of frequencies that are detectable by skin, can be presented by the mid-air haptic device. A simple way to modulate the modulation frequency is to use the canonical frequency modulation equation:

$$g(t) = A \cos\left(2\pi f_c t + \frac{f_\Delta}{f_m} \sin(2\pi f_m t)\right) \tag{11}$$

wherein A is the signal amplitude, $f_c$ is the centre frequency, $f_\Delta$ is the amplitude of the change in frequency and $f_m$ is the frequency at which the frequency modulation occurs. By applying phase shifts to the frequency modulations, several different frequency modulations can be applied at once as:

$$g(t) = \sum_{p=1}^{n} A_p \cos\left(2\pi f_{c,p} t + \frac{f_{\Delta,p}}{f_{m,p}} \sin(2\pi f_{m,p} t + \phi_p) + \phi_p\right) \tag{12}$$

yield the combination of multiple frequency modulation modulations. Further, to produce a feeling describable as "rough" a random continuous signal h(t) may be produced to fill in for the sine in the frequency modulation equation as:

$$g(t) = \sum_{p=1}^{n} A_p \cos(2\pi f_{c,p} t + f_{\Delta,p} h(t) + \phi_p) \tag{13}$$

while ensuring that the frequency of modulation does not increase or decrease beyond $f_{\Delta,p}$ by ensuring that the derivative of h(t) does not in absolute value exceed unity.

III. Direction of Particle Motion Modulation

When the system is solved for a directional particle speed, it is possible to modify the direction of the particle speed optimized for in time. This generates a further class of modulation scheme that can be used to vary the direction of the acoustic radiation force generated, as it functions by changing the direction of the force vector. Changing the direction of the force vector implies that when the force is generated across an unchanging, static normal vector, a changing force is produced with respect to a static or slowly moving object, such as a hand. This modulation scheme, due to generating force changes in the air, may also be used to generate audible sound waves.

This technique may also be further used to stabilize or otherwise modify trajectories of levitating particles by dynamically changing the direction of the force. Further, by solving the optimization many thousands of times a second and using the results to apply the force vectors obtained to an object or objects whose levitation is desired, these may be held in place without the traditional trapping mechanism of a potential field. This has the advantage that less power is required as the force is local, and instabilities can be corrected for, although a further mechanism is required to track the positions and momenta of the levitating objects in this case.

IV. "n"-Sided Modulation

Interpolating between a zero state and a state corresponding to a multiple valid control points that are amplitude modulated is inefficient, as for half of the time the device is moving towards the zero state in which nothing is output. As previously disclosed, because of this, using two states, one corresponding to one point and the other corresponding to the other, are used alternatingly.

However, in the case that three control points are created, using two states yields a set wherein two points share the resources provided by the array, while the other has one point that can monopolies the array. This means that in situations in which the system is resource constrained and three points are presented as equal, two of the control points are noticeably weaker, leading to a haptic effect that is not as effective. To counter this, a three- or "n"-stage system is created. As a result, the number of control points per state is more equal, yielding and equal distribution of array power. This can be achieved by combining sine waves exhibited by each control point or by cosine interpolation between control point states. Further, this does not have to produce an equal number of control points in each state, it is merely more equal, so it is possible to halt at some "n" and not have the control points be entirely equal.

In the limit, this means some m control points are factored into n states. To choose which control points go into which states, control points are selected close to each other so that they can take advantage of constructive interference. Also, states with control points next to each other should be next to each other in time. To achieve the splitting of the control point system, determine the spatial component with the least variation in control point position. Then, using this axis as a normal vector, count angle from an arbitrary starting point in either direction, assigning control points with increasing angle to the first state, filling each with an appropriate integer number before moving onto the next, making each as close to evenly distributed as possible. In this way, spatial closeness can be achieved when cycling the actuated states in numerical order.

Another advantage of this approach wherein multiple states are interpolated between in sequence is that these states may be limited to only one control point. In this case, the calculation required to create the state is limited to not require the linear system solution needed when multiple points occupy the same state. In this manner, a device with greatly reduced computational requirements may be produced to lower cost and create a more competitive device.

V. Focused Amplitude Modulation in Phased-Arrays

Consider a haptic feedback system as an example scenario. When generating the haptic effects, a focused control point in space is modulated with a low frequency vibration, usually consisting of one or more frequencies ranging from 0 Hz up to 500 Hz order to provide haptic feedback in the case of an amplitude modulated point. The phase and amplitude of the modulation frequency is usually not controlled. This causes the amplitude at control point to slightly blur and not being optimized. Nonetheless, this effect is negligible for the haptic feedback to be perceived by humans when the length of the phased-array is smaller than half the wavelength of the amplitude modulation frequency. Introducing a focused amplitude modulation to create virtual acoustic point sources in mid-air and to optimize the amplitude of control points regardless of the size of the device, can be achieved.

These sources would be reflected from objects in the field allowing existing sonar, range-finding and acoustic imaging techniques to function by applying a filter to received signals such that only the tracking signals are recovered. Specifically, an amplitude demodulation technique such as an envelope detector, could be used to determine ToF, i.e. the time that it takes for an object, particle or acoustic, electromagnetic or other wave to travel a distance through a medium. Also, necessary to determine ToF is to monitor the delta time from emission to the moment of focusing in order to correctly find when the tracking signal is 'emitted' from the virtual source in the control point. From that point, the virtual source position, timings and emitted waves are known, and so traditional techniques for determining the position of virtual sources to one or many receivers may be used to triangulate reflections and image the space. The amplitude modulation can be dynamically tailored to match the sensing objective and the environment.

Figure 5:
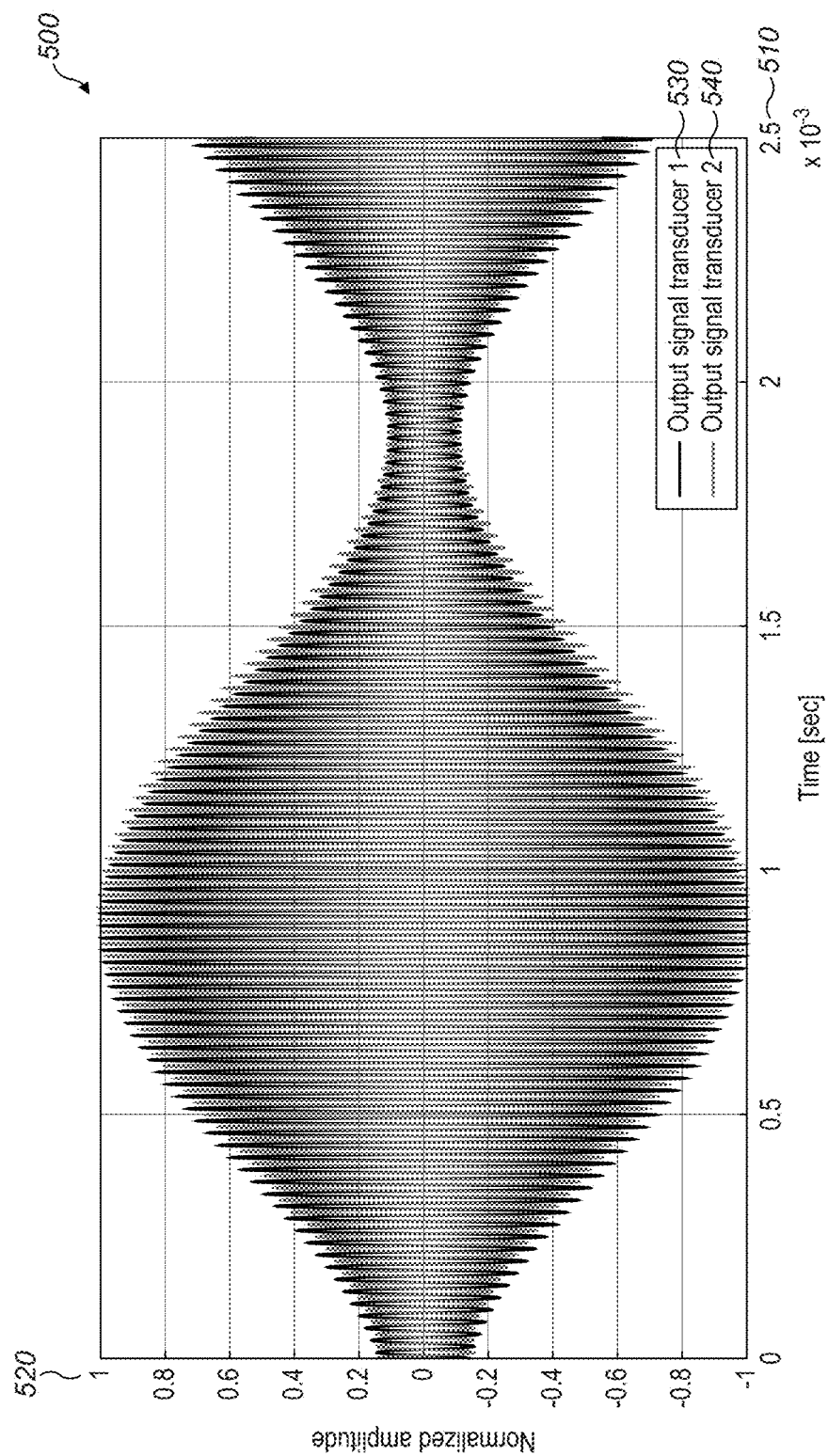
FIG. 5 is an output signal of two transducers.

The results of a two-dimensional numerical simulation showed that it is possible to use a virtual acoustic point source created with amplitude modulation, to track the distance of a horizontal reflector positioned at 0.20 m. FIG. 5 is the output signal of two transducers belonging to a 2-D phased array of 16 transducers spaced 0.01 m each other, from numerical simulation. The carrier frequency was a 40 kHz sine wave, the modulating frequency was a 500 Hz sine wave and the modulation index was 0.8.

FIG. 5 shows an output signal graph 500 having an x-axis of time in seconds 510, a y-axis of normalized amplitude 520, a plot showing the output signal of transducer 1 530 and a plot showing the output signal of transducer 8 540. As can be perceived from the figure, the phases and amplitudes of the both carrier and the modulating frequencies were controlled to produce a central control point at 0.20 m.

Figure 6:
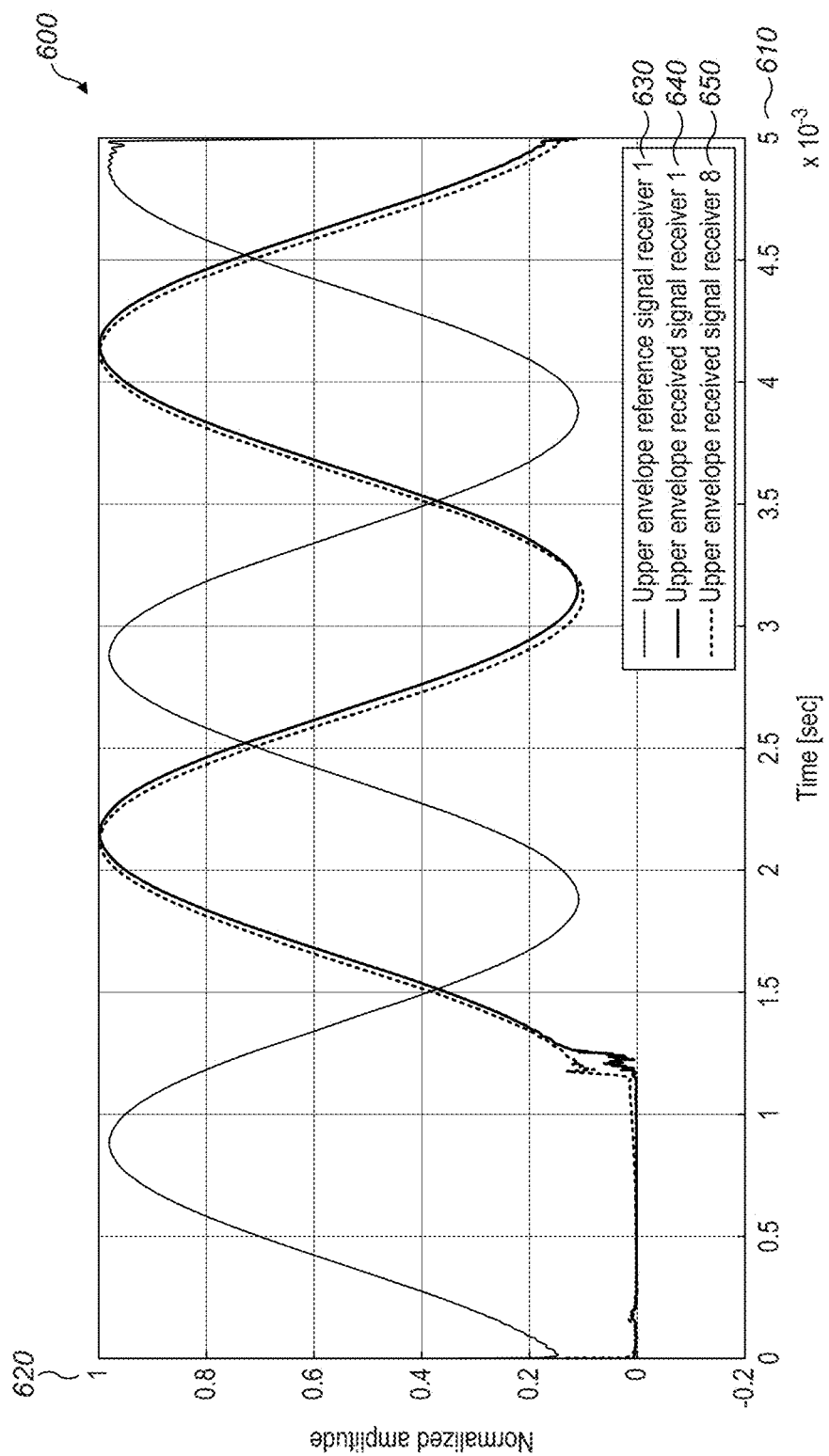
FIG. 6 is an output signal of upper envelope signals.

Reflected signal recorded at remote locations yields the ability to detect the distance of the reflector. The ToF may be determined with an envelope detector technique. An example of the upper envelope of the reference signal and of two signals received at different transducers positions is shown in FIG. 6, which shows the upper envelope of the reference signal and of two signals received at different transducers positions from numerical simulation. FIG. 6 shows an output signal graph 600 having an x-axis of time in seconds 510, a y-axis of normalized amplitude 520, a plot showing the upper envelope reference signal for receiver 1 630, a plot showing the upper envelope receiver signal for receiver 1 640 and a plot showing the upper envelope receiver signal for receiver 8 650.

Figure 7A:
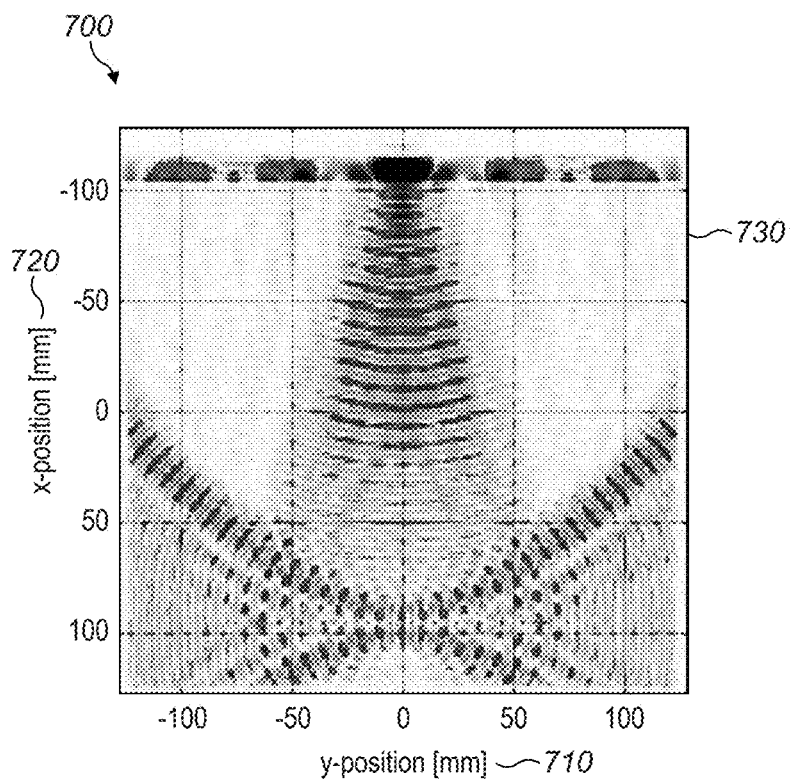
FIGS. 7A and 7B are video snapshots of a numerical simulation.
Figure 7B:
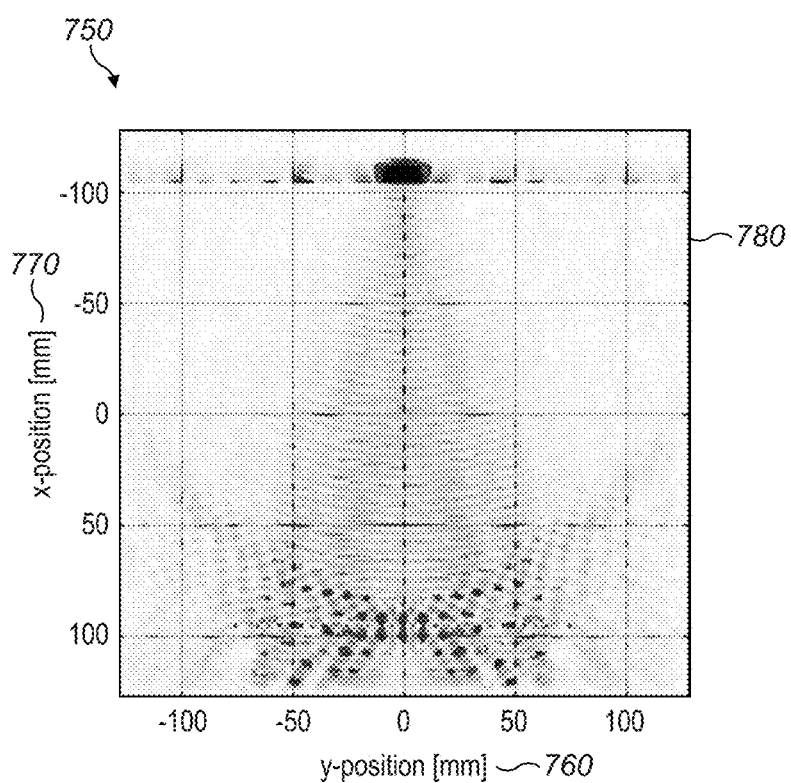

ToF can be estimated from the maxima or minima of the envelopes. FIGS. 7A and 7B show the acoustic pressure field as obtained from a two-dimensional numerical simulation. FIG. 7A is a simulation 700 with an x-axis of y-position in mm 710 and a y-axis of x-position in mm 720 with a snapshot 730. FIG. 7B is a simulation 750 with an x-axis of y-position in mm 760 and a y-axis of x-position in mm 770 with a snapshot 780. This shows the acoustic wavefield when the maxima (FIG. 7A) and the minima (FIG. 7B) of the amplitude modulated waveforms collide at the focal point.

VI. Additional Disclosure

A method to combine amplitude and phase modulation such that phase shifts are added at the minima of the amplitude modulated signal to minimize audible noise.

A method to generate haptic chirps.

A "n"-stage system in which multiple states are interpolated between in sequence.

A method to focus the amplitude modulation for optimization and tracking purposes.

A method to dynamically change the direction of the force vector.

(3). Method for Fast Acoustic Full Matrix Capture During the Presentation of Haptic Effects Full Matrix Capture (FMC) can be used to reconstruct completely an acoustic image of a three-dimensional scene by sending pulses (Dirac delta functions) from a series of transducers and using the same set of transducers to receive each individual pulse. To use the technique however, the transducers must be inactive to create a pulse. Further, in a naïve experimental set up, transducers may not send and receive at the same time.

However, by electrically monitoring the transducer and through foreknowledge of the transducer transient response, the output pushed through the circuitry may be deconvolved and subtracted from the electrical behavior, leaving only the interactions of the reflected waves with the transducers. This is a standard method in acoustic imaging techniques to obtain results for the full matrix when the initially pulsed transducer may continue to ring as the reflected wave interacts with it.

Abstracting this further, a continuously actuated transducer may be used to receive, assuming some history and the current output signal is known. This is useful in the case of haptics especially, as if haptics is produced simultaneously, there is no break in the output in which to insert a pulse.

A Gold code, or any auto-correlation maximization function (such as a de Bruijn sequence) may be used to track a n-ary sequence of output symbols (although this may be restricted to binary). In wave multilateration technologies, such as the global positioning system and others this may be used to guarantee knowledge of the receiver's position in the input sequence in time.

A Dirac delta function may be reconstructed in the reflected time series by taking a known input signal and deconvolving it from the received signal. Since support is required through all frequencies and the transducers are largely monochromatic in nature, the optimal approach must have a similar frequency spectrum spread to the Dirac delta to aid for example, a Wiener filter.

A phase singularity fulfils this requirement, as the phase shift spreads energy across all frequencies in a way that is similar in behavior to the Dirac delta. In the creation of haptic effects, phase jumps may be incorporated into some of the transducers in the basis functions of the haptic region and/or point sets. In order to create equivalent waves to the Dirac deltas involved in the Full Matrix Capture technique.

The main problem with this approach is that introducing a phase singularity into each transducer causes it to work against the other transducers contributing to the focusing or control region behavior that has been prescribed to create the haptic effects. To ameliorate this issue, the concept of restitution must be introduced. Each transducer is moved instantly by a large phase shift to generate the singularity pulse that is recovered by the Full Matrix Capture method. Afterwards a restitution effect is applied to slowly pull the transducer back into line with the other transducers in the system by moving the phase back slowly to the phase shift that it expressed before the singularity was introduced. As the number of transducers is large, over enough transducers in the system this would allow the phase shifting incurred to be negligible.

The other issue with the system so far described is that it is slow in time. In the traditional approach, the waves must be allowed to completely traverse the system before the next singularity or Dirac delta may be applied. To speed this up, a sequence of auto-correlation maximization symbols are encoded into the transducer phase shift singularities to track them in both time and space. This may be as simple as assigning a symbol from the sequence uniquely to each transducer. In this way, a Hilbert curve or other locality maximizing/space minimizing path may be used. This allows the bonding of the time between symbols and enables the use of a continuous set of symbols with a relatively small number of wave periods separation. Equally, if a de Bruijn sequence is used, a known minimum number of successful consecutive symbol detections may be obtained before the location in the space-time sequence is known. This is especially useful if many of the symbols are missing due to the signals being too weak to detect and thus use. The locality is also useful as it is known that the signal strength depends on space, meaning that groups of nearby symbols are more likely to be received correctly if the sequence of transducers where singularities are introduced are close to each other.

By adding the phase shifts to the basis functions directly and following Hilbert curves to send the phase inversion pulses with encoded symbols in phase shift keying, it is possible to create haptics which are minimally changed (as the effect of the phase shifts are known beforehand) while at the same time supporting the creation and detection of pulses which amount to a real-time implementation of Full Matrix Capture. It is intended that with an example set of two hundred transducers, with an inter-symbol distance of four wavelengths apart, at 40 kHz, may receive and potentially process a full acoustic image from the scene in air at 50 Hz. This allows such a system to be competitive with other imaging techniques at the resolution denoted by the wavelength in air. The technique would scale equivalently to different frequencies with potentially different number of transducers. It should also be noted that multiple transducers at higher frequencies or in higher numbers in the array may be grouped to produce a phase inversions in tandem.

It should also be noted that some symbols may be missed due to weakness. In this case, the matrix entries in the Full Matrix Capture technique may be zeroed.

It should also be noted that the symbols may be redistributed in the case that transducers are found to be inoperable.

(4). Time-of-Flight Depth Sensor Fusion System

There are several camera-based techniques in the literature to measure range and depth. These include triangulation systems (such as stereo-vision), interferometry and time-of-flight systems.

Triangulation systems measure the distance of objects by analyzing the geometrical features of triangles obtained by the projection of light rays. In fact, given a point on the surface of the target, triangulation determines the angles $\alpha 1$ and $\alpha 2$ formed by the projection rays between the surface point and the projection on the optical system. By knowing the baseline, trigonometry yields the distance between the baseline itself and the surface point.

Figure 8:
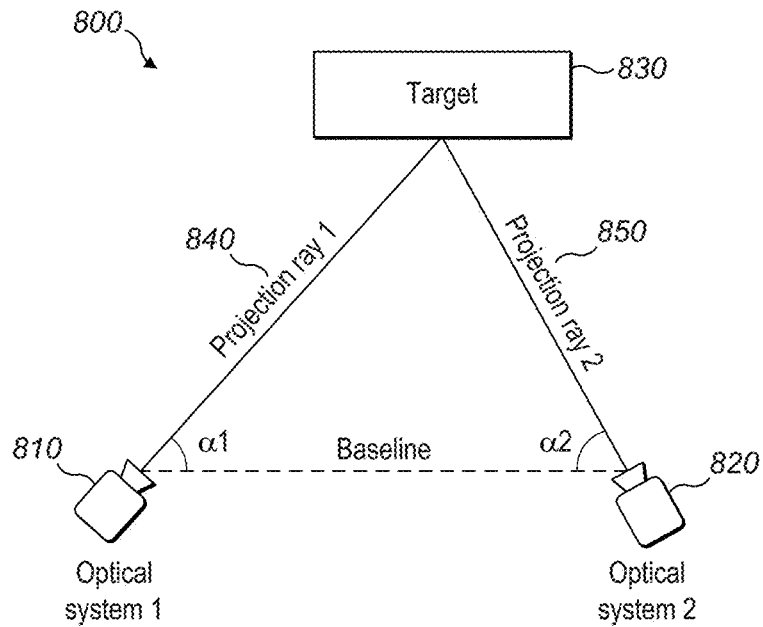
FIG. 8 is a schematic of a stereo-vision method.

FIG. 8 shows a schematic 800 of a stereo-vision method of triangulation. Optical system 1 810 having a projection ray 1 840 and optical system 820 having a projection ray 2 850 are positioned on a baseline. Both projection ray 1 840 and projection ray 2 850 are aimed a target 830.

Triangulation can be passive and active. In passive triangulation, the same point is observed by two different optical components with known baseline distance. It is often recalled with the name stereo-vision, or stereo-triangulation, due to the use of two cameras. A full 3D realization with stereo-vision is possible by solving the correspondence problem, in which features in both images are found and compared, typically using 2D cross-correlation. Off-the-shelf systems like "Leap Motion", belong to this category.

Active triangulation consists in a structured light emitter and an optical system. To apply triangulation, the light emitter should be well differentiated from other objects and ambient light. This is achieved by projecting different coding schemes onto the 3D scene, typically colored, temporal (lines), spatial (random texture) and modulated schemes. Particularly, Kinect uses an infra-red laser that passes through a diffraction grating, to create a structured random pattern. This way, the matching between the infrared image and the projection on the optical camera becomes straightforward.

Interferometry exploits the principle of superposition to combine monochromatic waves, resulting in another monochromatic wave that has some meaningful properties. Typically, a single beam of light is split into two identical beams by a beam splitter: while one ray is projected to a mirror with a constant path length, the other beam is targeted on an object with variable path length. Both beams are then reflected to the beam splitter and projected onto an integrating detector. By looking at the intensity of the incoming wave it is possible to figure out the distance of the target object, as the two split beams would interact constructively or destructively. Interferometry is usually applied for high-accuracy measurements.

Time-of-flight systems are based on the measurements of the time that a light pulse requires to travel the distance from the target to the detector. There are two main approaches currently utilized in ToF technology: intensity modulation and optical shutter technology. Off-the-shelf optical systems by former "Canesta", former "MESA imaging" (now "Heptagon"), "Texas Instruments" and "PMDTec/Ifm", are all based on intensity modulation ToF. Its principle is based on the computation of the phase between the transmitted amplitude modulated, or pulse modulated, optical signal and the incident optical signal, using samples of the correlation function at selective temporal positions, usually obtained by integration. Phase is then translated to distance. Computation of time-of-flight happens at the CMOS pixel array level, but material and build cost increase with respect to stereo-vision systems. Optical shutter technology, used by former "Zcam" in the early 2000s, is based on fast switching off the illumination, obtained with light-emitting diodes (LEDs), and on gating the intensity of the received signal with a fast shutter, blocking the incoming light. The collected light, at each pixel level, is inversely proportional to the depth.

While all the aforementioned techniques achieve a full real time 3D tracking of objects with various degrees of depth accuracy and interaction areas, they often require expensive processing to happen on external processor, requiring the shuttle of big bandwidth of data. Also, software complexity and build and material cost is often high.

A time-of-flight depth sensor fusion system, which consists in the combinatory use of electromagnetic (visible and non-visible light spectrum) and acoustic waves to perform the complete 3D characterization of a moving target, may be used. While a physical set of transducers (up to potentially only one) can be controlled to create an acoustic field with desired phase and amplitude, and the depth of the target estimated via time-of-flight techniques, one or more optical cameras perform the 2D tracking with respect to his projected plane, in the spatially perpendicular degrees of freedom. Ideally, this would yield a set of locations, each of which is expressed in terms of (x, y, z) coordinates with respect to an arbitrarily chosen reference system, corresponding to relevant features of the tracked target. In haptic feedback systems, this enables feedback to be projected to targetable locations.

The described tracking system would compete with other off-the-shelf, time-of-flight and depth cameras, as the tracking system is intended to be included in a cheap embedded system, hence bringing down costs. In fact, off-the-shelf existing systems shuttle the relatively large video data to be processed externally. Bringing the processing on-chip would maintain software complexity low, while maintaining low build cost, low latency and high accuracy of tracking.

Section I introduces the principle and techniques to estimate the position of a target with time-of-flight, acoustic techniques, with a focus on hand detection. Section II introduces the optical tracking system for hand detection. Finally, section III draws some conclusion on the fusion system and its applications.

I. Acoustic Tracking System

The acoustic tracking is based on the measurement of ToF, i.e. the time that an acoustic signal requires to travel the distance that separates the target from the receiver.

The acoustic tracking system consists of a set of transducers (up to possibly only one). They could be part of integrated haptic feedback, parametric audio, levitation systems, or a stand-alone tracking system supporting other applications. They could work simultaneously as emitters/receivers, or have independent, fixed tasks.

Usually, the emitted signal is a monochromatic, sinusoidal or square wave, modulated with amplitude, frequency or phase modulation or a combination of those. In case a modulation of some kind is adopted, the signal that arrives at the receiving location is a complicated analog waveform that needs to be demodulated in order to extract the ToF information. This is accomplished through a standard process called 'carrier recovery', which consists of figuring out both the frequency and phase of the modulating sinusoid. The ToF information is then usually recovered by clever integration. Spatial modulation and temporal modulation could coexist to scan portion of the 3D space at time. Spatial modulation can be achieved in much the same way temporal modulation is applied: different portion of the 2D array would project signal modulated differently.

Alternatively, the emitted signal can be broadband, containing more than one frequency component. The ToF is usually recovered using narrowband methods on broadband signals, using Fast Fourier Transform (FFT), extracting the phase and amplitude of different sinusoids, or by means of the cross-correlation function.

On a 2D array of transducer, in which each of the transducers have the ability to both transmit and receive, ToF technique can be applied in much the same way it is applied for ToF cameras, where each transducer is the analogous of each pixel, to obtain a full acoustic image of range. If only a limited number of receivers in the 3D space is available, a full acoustic imaging of the target is impossible. The latter can be treated as a virtual source of reflected waves, allowing techniques like trilateration, multilateration or methods based on hyperbolic position location estimators, to estimate the position of the virtual source. Moreover, methods based on the parametric and non-parametric estimation of the direction of arrival (DoA), like conventional beamforming techniques, the Capon's method and the MUSIC algorithm, can be used to further constrain the position of the target since they give information about the bearing of the source.

In a haptic feedback system, a physical set of transducers can be controlled to create an acoustic field exhibiting the desired amplitude at the control points. Acoustic tracking of the bare hand can be performed while providing haptic feedback. An elegant way of doing it is achieved with the adoption of virtual acoustic point sources. In fact, quoting literally: "These sources would be reflected from objects in the field allowing existing sonar, range-finding and acoustic imaging techniques to function by applying a filter to received signals such that only the tracking signals are recovered. These tracking signals may be implemented in practice as modulation by amplitude, phase, frequency or quadrature, so long as this achieves a resulting modulation that substantially fits within bands of acoustic frequencies above the range of human hearing. Alternatively, the tracking signal may be audible, but designed to be unobtrusive in audible frequencies, which could be achieved by designing it to have similar properties to a random noise function. The tracking waveform associated with each control point should be distinct in frequency components and/or a signal made up of suitably orthogonal functions so that it may be picked out of the mix of frequencies expressed at the control point. Using further frequencies on top of each control point allows the tracking to continue to function even during periods of device activity."

These techniques yield the estimation of the range of the center of mass of the target (i.e. the palm of the bare hand) with respect to the array of transducer, and possibly its location in the spatially perpendicular degrees of freedom.

Section A describes the processing necessary to recover ToF from a phase modulated, acoustic signal. Section B introduces some methods utilized for source location estimation from ToF measurements. Finally, section C introduces some direction of arrival ("DoA") techniques that can be used to further constrain the source location.

A. Modulation and Demodulation

Phase Shift Keying (PSK) is a digital modulation technique which conveys data by changing the phase of the carrier wave. Binary Phase Shift Keying technique (BPSK) is a type of digital phase modulation technique which conveys data by changing the phase of the carrier wave by 180 degrees. Quadrature Phase Shift Keying (QPSK) is another type of digital phase modulation in which the modulation occurs by varying the phase of two orthogonal basis functions, which are eventually superimposed resulting in the phase modulated signal.

Figure 9:
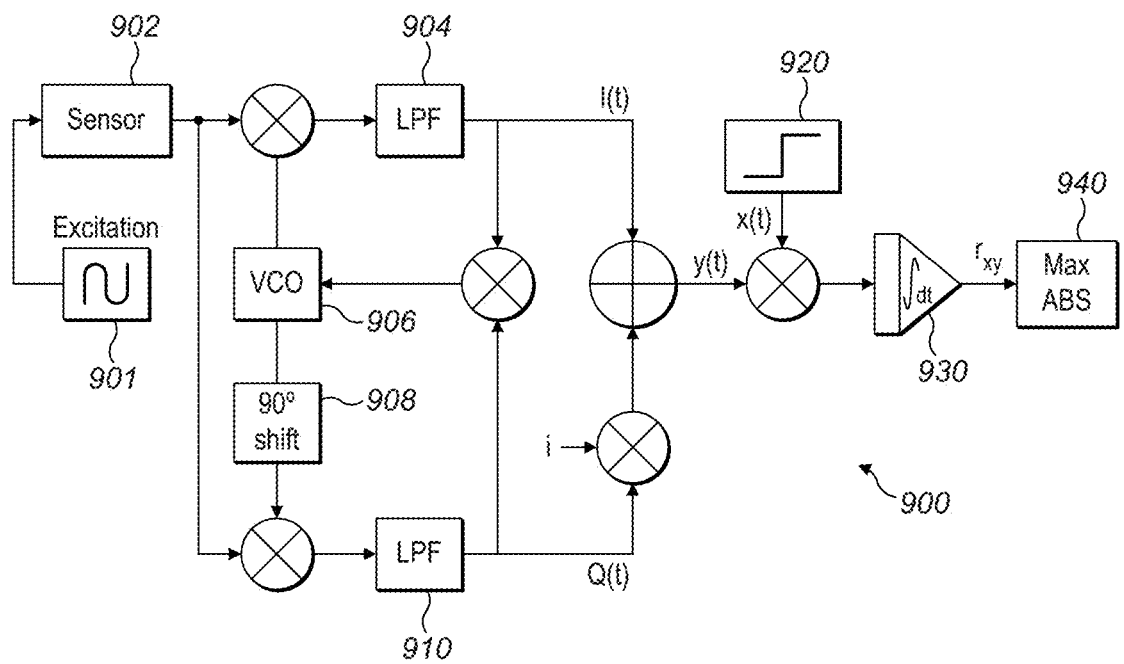
FIG. 9 is a block diagram of a synchronous demodulator.

Considering BPSK as an example scenario, a complex synchronous demodulator is used to recover data in noisy environments. FIG. 9 shows the signal processing that one receiving channel is expected to perform for a BPSK signal in the form of a block diagram 900. Shown is an excitation function module 901, a sensor 902, a Voltage Control Oscillator (VCO) 906, a 90 degree shift module 908, low pass filters 904, 910, a step function module 920, an integrator module 930 and a maximum absolute value (MAX ABS) output 940.

The demodulation process can be divided into three major steps. Firstly, the signal undergoes a process called 'carrier recovery', in which a phased locked loop (e.g. a Costas loop) recovers the frequency and the phase of the modulated signal. In its classical implementation, a VCO 906 adjusts the phase of the product detectors to be synchronous with the carrier wave and a low pass filter (LPF) 904, 910 is applied to both sides to suppress the upper harmonics.

The baseband signal obtained as the complex summation of the in-phase (I(t)) and the quadrature (Q(t)) components of the input carries the information of the phase φ between the reference/source signal and the input signal. In fact:

$$\phi = \tan^{-1}\left(\frac{Q(t)}{I(t)}\right) \quad (14)$$

and:

$$y(t) = I(t) + iQ(t) \quad (15)$$

The second stage consists in scanning the baseband signal with an appropriate matching filter, computing the absolute value of the following product:

$$r_{xy}(t) = \left\|\sum_{\tau=0}^{N} x(t) \cdot y(t-\tau)\right\| \quad (16)$$

where $r_{xy}(t)$ is the cross-correlation, x(t) is the chosen matching filter, y(t) is the baseband signal, and the parameter τ is any integer. For BPSK modulation, x(t consists of a −1 and a +1. The adoption of a BPSK scheme reduces the second stage to a simple multiplication for +1 and −1, making the processing on chip computationally efficient.

In the third and last stage, the peaks of the cross-correlation signal are extracted, as they are proportional to the ToF. In fact, a maximum of the absolute value of cross-correlation corresponds to a perfect match between the complex demodulated signal and the matching filter, and hence to the instant of time at which the change in the phase appears in the received signal.

B. Source Location Estimation

If only a limited number of receivers in the 3D space, and hence only a limited number of ToF estimations, is available, the target can be treated as a virtual source of reflected waves, allowing geometrical techniques, such as triangulation, multilateration and methods based on hyperbolic source location estimation, to estimate the position of the virtual source. They are introduced in the following section. Moreover, knowing the direction of arrival of wave-front in the far field, can help to constrain the location of the source even further. The problem of DoA estimation is important since it gives vital information about the bearing of the source.

1. Trilateration

Trilateration is the process of determining absolute or relative locations of points by measurement of distances, using the geometry of circles, spheres or triangles. Trilateration has practical applications in surveying and navigation (GPS) and does not include the measurement of angles.

In two-dimensional geometry, it is known that if a point lies on two circles, then the circle centers and the two radii provide sufficient information to narrow the possible locations down to two.

In three-dimensional geometry, when it is known that a point lies on the surfaces of three spheres, then the centers of the three spheres along with their radii provide sufficient information to narrow the possible locations down to no more than two (unless the centers lie on a straight line). Additional information may narrow the possibilities down to one unique location. In haptic feedback systems, triangulation can be used to get the coordinates (x, y, z) of the virtual source in air (or of its center of mass). Its position lies in the intersections of the surfaces of three (or more) spheres.

Figure 10:
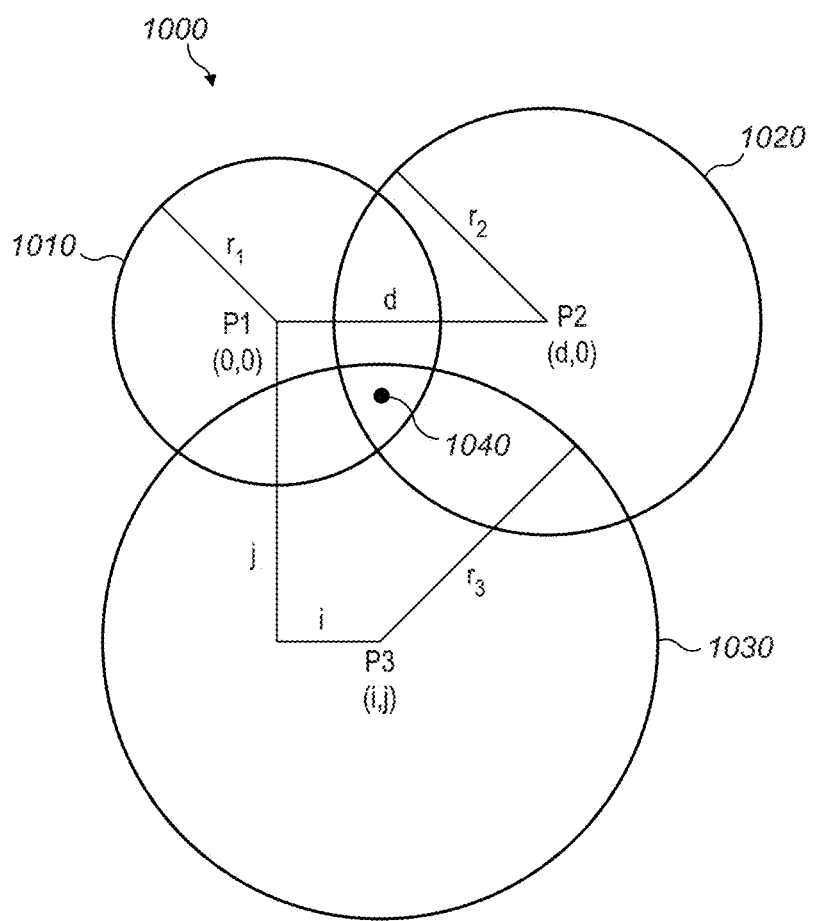
FIG. 10 is a trilateration schematic.

Consider the trilateration problem shown in FIG. 10, which shows a schematic 1000 where P1 1010, P2 1020 and P3 1030 are the position of three receiving transducers. The intersections 1040 of the surfaces of three spheres is found by formulating the equations for the three sphere surfaces and then solving the three equations for the three unknowns, x, y, and z. The formulation is such that one transducer's position is at the origin of the reference system and one other is on the x-axis.

$$\begin{cases} r_1^2 = x^2 + y^2 + z^2 \\ r_2^2 = (x-d)^2 + y^2 + z^2 \\ r_3^2 = (x-i)^2 + (y-j)^2 + z^2 \end{cases} \quad (17)$$

where d is the x coordinate of point P2 (receiver no. 2), i and j are the x and y coordinates of the point P3 (receiver no. 3) with respect to the chosen reference system, and $r_1$, $r_2$, $r_3$ are the time-of-flights at the three receivers' positions.

It is necessary to find a point located at (x, y, z) that satisfies all three equations.

The next step is to use $r_1$ and $r_2$ to eliminate y and z and solve for x, as follows:

$$r_1^2 = x^2 + y^2 + z^2 \quad (18)$$
$$r_2^2 = (x-d)^2 + y^2 + z^2$$
$$r_1^2 - r_2^2 = x^2 - (x-d)^2$$
$$r_1^2 - r_2^2 = x^2 - (x^2 - 2xd + d^2)$$
$$r_1^2 - r_2^2 = 2xd - d^2$$
$$r_1^2 - r_2^2 + d^2 = 2xd$$
$$x = \frac{r_1^2 - r_2^2 + d^2}{2d}$$

Substituting $z^2 = r_1^2 - x^2 - y^2$ into the formula for the third sphere and solving for y, yields to:

$$y = \frac{r_1^2 - r_3^2 - x^2 + (x-i)^2 + j^2}{2j} \quad (19)$$

Now that the x and y coordinates of the solution point are found; the formula can be rearranged for the first sphere to find the z coordinate:

$$z = \sqrt{r_1^2 - x^2 - y^2} \quad (20)$$

2. Multilateration

Multilateration (MLAT) is a surveillance technique based on the measurement of the difference in distance to two stations at known locations by broadcast signals at known time. Multilateration relies on multiple measurements to estimate the location of an object. For the purposes of this document, the objective consists of adjusting the parameters of a model function to best fit a data set. A suitable model function has the following form:

$$f(r) = (x_i - x_s)^2 + (y_i - y_s)^2 + (z_i - z_s)^2 - (T_i \cdot c)^2 \quad (21)$$

where $r = (x_s, y_s, z_s)$ is the vector of coordinates of the imaginary source and $x_i, y_i, z_i$ are the coordinates of the i-th receiving transducer. The least squares method finds its optimum when the sum S of squared residual is a minimum:

$$S = \sum_{i=1}^{n} w_i \cdot (f(r))^2 \quad (22)$$

where $w_i$ is a weight assigned at each measurement for each n transducer.

The vector gradient $$\nabla f = \left( \frac{df}{dx}, \frac{df}{dy}, \frac{df}{dz} \right)$$

is expressed as it follows:

$$\nabla f = \begin{bmatrix} \sum_{i=1}^{5} -w_i \cdot 4 \cdot f(r) \cdot (x_i - x_s) \\ \sum_{i=1}^{5} -w_i \cdot 4 \cdot f(r) \cdot (y_i - y_s) \\ \sum_{i=1}^{5} -w_i \cdot 4 \cdot f(r) \cdot (z_i - z_s) \end{bmatrix} \quad (23)$$

Then, a loop of N iterations updates the parameters of the model functions, in a gradient descent way, according to the following expression:

$$r^* = r - \varepsilon \cdot \nabla f \quad (24)$$

where r* is the updated vector of coordinates and ε is an arbitrarily chosen constant. The vector gradient is updated N times until it becomes reasonably small. The weights $w_i$ are set to be proportional to the time-of-flight, as the following expression:

$$w_i = (T_i \cdot c)^\alpha \quad (25)$$

where $T_i$ is the time-of-flight at the i-th receiver, c is the speed of sound and α is arbitrarily chosen (usually varying between 1 and 2).

Another alternative, suitable model function has the following form:

$$S = \sum_{j}^{n} \sum_{i}^{n} (A[i,j] - CC[i,j])^2 \quad (26)$$

where A is the matrix of the difference of time of arrival (DToA) between all the possible combination of sensor pairs, and CC is the generalized cross-correlation matrix of DToA.

3. Hyperbolic and Trigonometric Methods

The position of the virtual source, given the delay between two or more sensors, can be estimated finding the intersection of multiple hyperbolae. In fact, it can be assumed receivers' pairs to lay on the foci of one hyperbola. Hence, the interception of multiple hyperbolae, each one corresponding to multiple receivers' pairs, lead to a crude, but computationally efficient, estimation of the source location, range and bearing.

C. Direction of Arrival Estimation

DoA estimators are classified in two main categories, namely spectral-based (non-parametric) approaches and eigen-based (parametric) approaches. They are all based on the assumption of far-field conditions, i.e. the radius of propagation is so large (compared to the size of the array of transducers) that the wave-front propagates as a flat plane of constant phase. They estimate the direction of arrival of the wave-front given a set of receivers usually arranged in a linear or circular array geometry.

Spectral-based methods are based on the adoption of a model of the received narrowband, plane wave-front, and on the construction of a spectrum-like function of the parameter of interest (DoA). Conventional beamformer and the Capon's method are two examples of spectral-based estimators. They are based on the idea of 'steering' the array of receivers in one direction at time, and to measure the output power. The DoA estimates are associated with the steering locations with maximum power. Eigen-based algorithms are based on an eigen decomposition and on the extraction of a portion of the subspace. For example, the MUSIC algorithm only considers the eigenvectors associated to the smallest eigenvalues, exploiting their feature to be orthogonal to the steering vectors.

Since DoA estimators are bound by the analogue of the Nyquist' sampling criterion in space, the sensor spacing, d, should always be smaller than half the wavelength of interest, λ, as follows:

$$\frac{d}{\lambda} < 0.5 \tag{27}$$

They can be applied to the amplitude/frequency/phase modulation sinusoids in such cases where the carrier's wavelength fails to fall within Nyquist's. DoA estimators can be used to further constrain the virtual source position, estimated with geometrical methods and gradient descent methods.

II. Optical Tracking System

A single optical camera would integrate and complement the object tracking performed with acoustic methods, by constraining the two coordinates of its projection plane.

In the case of haptic feedback systems, while the acoustic range finding and plane solving system constrains the plane of the hand in angles and distance above the device, a single optical camera can be used to further constrain the hand detection in the spatially perpendicular degrees of freedom. Ideally, this would then yield targetable locations for the haptics, while as a side effect the optical camera can provide input to a gesture detection system.

As introduced in section I, camera tracking systems invite privacy concerns and are bandwidth heavy because they transport video data around. An optical tracking system intended to be included in a cheap embedded system must endeavor to intelligently eliminate as much of this expensive bandwidth as quickly and simply as possible while retaining all the necessary tracking data. Such a system has a low latency and can respond and track quickly, and importantly also has a low build cost.

As the detection of depth and plane angles have been effectively solved prior to this by the ultrasonic tracking system, a single optical/electromagnetic camera can be used to achieve further spatial constraints to fix the hand position in three dimensions. Such a camera system has previously demonstrated to be low cost, but not so with the associated processing and computer vision, as these existing systems shuttle the relatively large video data to be processed externally.

Bringing together the two concepts of minimizing the bandwidth cross-section of the exported data and bringing the initial processing on-chip leads to considering a series of computer vision algorithms to whittle down later processing requirements. Further, this must also maintain the fidelity derived from the initial video data to finally enable accurate haptic feedback to be projected onto the hand. To achieve this, a pipeline is effectively created that transforms greyscale video images into a skeleton: a representation of the interactive part of the scene as a hierarchical set of medial lines.

Alternatively, more than one camera can be used at the same time to obtain the coordinates of the tracked object in the tri-dimensional space with conventional methods (time-of-flight, stereo vision or interferometry), while continuously refining and calibrating the range with ultrasonic measurements.

A. Computer Vision Video Pipeline

The pipeline of data for recognizing a hand and achieving tracking involves taking an image as input and outputting the location and topology of the hand. To achieve this, algorithms are applied to produce a topological skeleton while bearing in mind that the bandwidth and compute is to be minimized. An algorithm that eschews floating-point arithmetic would also be much more amenable to hardware implementation, so given this the following pipeline seems to achieve our given aims.

1. Reduction to a Binary Image

The first step of the image processing is to take the raw input 'greyscale' image from the camera sensor to a binary silhouette of the objects to be detected. This is generally achieved through standard background subtraction algorithms, the most effective of which is the mixed Gaussian model, wherein for each pixel a mixture of Gaussians describing the distribution of pixel values is maintained. The Gaussian(s) with the most power represent the background of the image, while any pixel falling outside of a given sigma range are labelled foreground. A median nearest-neighbor filter is used to reject spurious misclassifications and the background and foreground are then used to construct the binary image.

2. Meijster Distance Transform Squared

From the binary image, the distance transform is computed. This can be described as replacing the pixel values at each location in the foreground with a value representing the shortest distance to any background pixel. To begin with, the work by Meijster et al. (A. Meijster, J. B. Roerdink, and W. H. Hesselink, "A general algorithm for computing distance transforms in linear time," in *Mathematical Morphology and its applications to image and signal processing*: Springer, 2002, pp. 331-340) is considered. This method is then altered by considering a formulation that both omits the expensive final square root and as a result allows the entire squared distance field to be expressed using exact integer arithmetic. This removes error introduced by rounding and allows this algorithm to use the minimum possible amount of arithmetic. The Meijster algorithm involves one parallel 1D distance pass followed by a second pass using a parallel stack machine on each column. At the same time, the point with the largest square distance is recorded as the root node of the skeleton.

3. Stationary Point Detection

On the square distance transformed binary image, a stationary point detection is applied (at first, Laplacian type edge detection was posited instead but it was ultimately not sufficiently robust). This effectively is a pass that highlights only points which are local maxima. This is achieved by picking out foreground points for whom points to the left are strictly smaller squared distances and points to the right are smaller or equal squared distances along both vertical and horizontal directions. The small number of points for whom this is true are added onto a specialized priority queue for further processing.

4. Point Queue

When points are added onto the priority queue, the square root of distance transform and so the final step of the Meijster distance transform is taken. A novel warped distance measure is then obtained by computing the real spatial distance from the root of the hierarchy and subtracting from it the Meijster distance value. This warped distance measure is then the priority of the node placed in the priority queue with the coordinate pair of this point attached.

5. Modified Prim's Algorithm—Constructing a Warped Minimum Spanning Tree

The final minimum spanning tree is found by keeping a list of boundary nodes and a list of already connected nodes. To begin with the root node is on both lists. As each node is de-queued it is connected to an existing node that minimizes the warped distance measure, which is again the spatial distance between the de-queued node and the existing node, with the difference in the Meijster distance transform value between the de-queued node and the existing node subtracted. This step is intended to minimize circuitousness in the links between the chosen nodes. Each newly attached node is added to the boundary node list which is searched for small distance points that could be added cheaply first, resulting in a replacement of the matched node in the boundary node list with the de-queued node on the event of a successful match. As the warped distance measure is necessarily positive (which means that more expensive minimum spanning tree algorithms which are compatible with negative arc weights need not be considered), a full iteration of Prim's minimum spanning tree algorithm can be engaged when the boundary point list fails to find an obvious choice of tree extension, resulting in a new node on the boundary node list. This must occur at least on every tree bifurcation.

6. Gesture Detection

Gesture detection can now be achieved by taking this set of points arranged into a minimum spanning tree (which will be termed a medial line model) and using machine learning or other classification systems to attach semantic meaning to the spatial node hierarchy. As the root node is always the first in the list of points and relationships given, the center of mass of the hand is known, so the haptic feedback can be projected effectively in a way that is directed in the other dimensions that are not as well determined by the ultrasonic range finding based tracking system.

B. Trial Run of Video Rate Detection

Video rate hand tracking using the algorithms developed above involved taking a camera, infrared bandpass filter, infrared LED illumination source and piping the data through a video subsystem on a PC. Capturing and detecting the hand to verify the pipeline in a real-time video setting was achieved and verified by overlaying the detected hand data with the video input in real-time. Background subtraction was achieved with a simple, but unreliable heuristic that this test showed could use improvement, which is why in this document it is replaced with the mixture of Gaussians technique.

Figure 11:
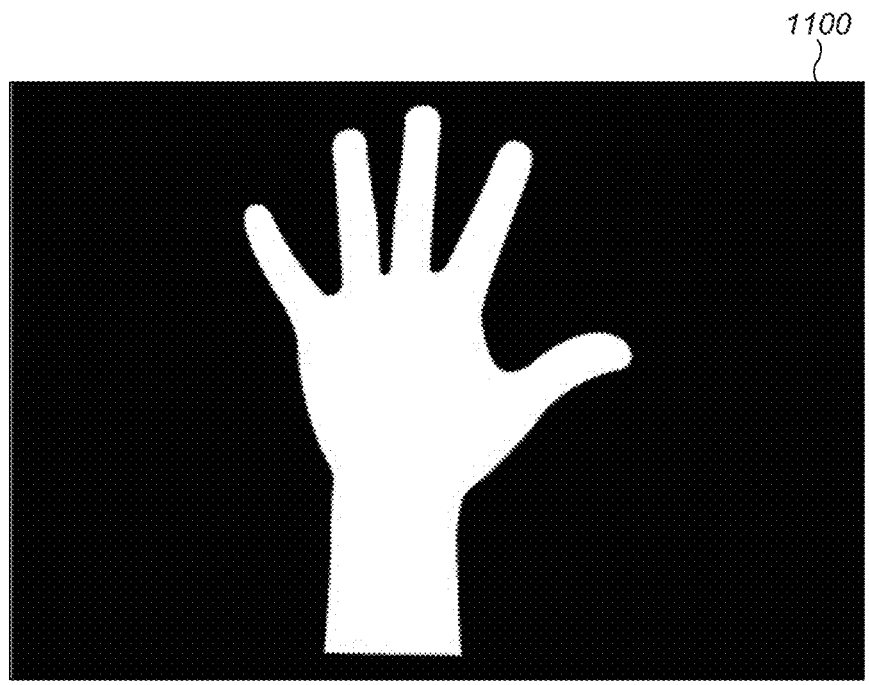
FIGS. 11, 12, 13, 14 and 15 are video rate hand tracking images.

FIG. 11 shows a binary image 1100 depicting a hand wherein white is the foreground and black the background.

Figure 12:
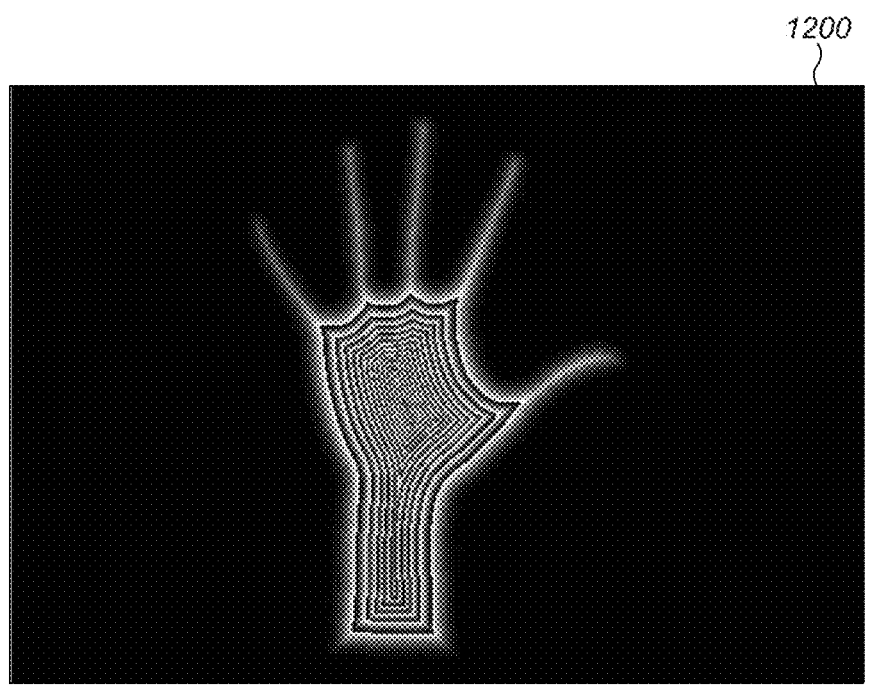

FIG. 12 shows the binary image 1200 after the square Meijster distance transform has been applied. Multiples of 256 create the bands of greyscale shown here, highlighting the quadratic, non-linear nature of the distance measure.

Figure 13:
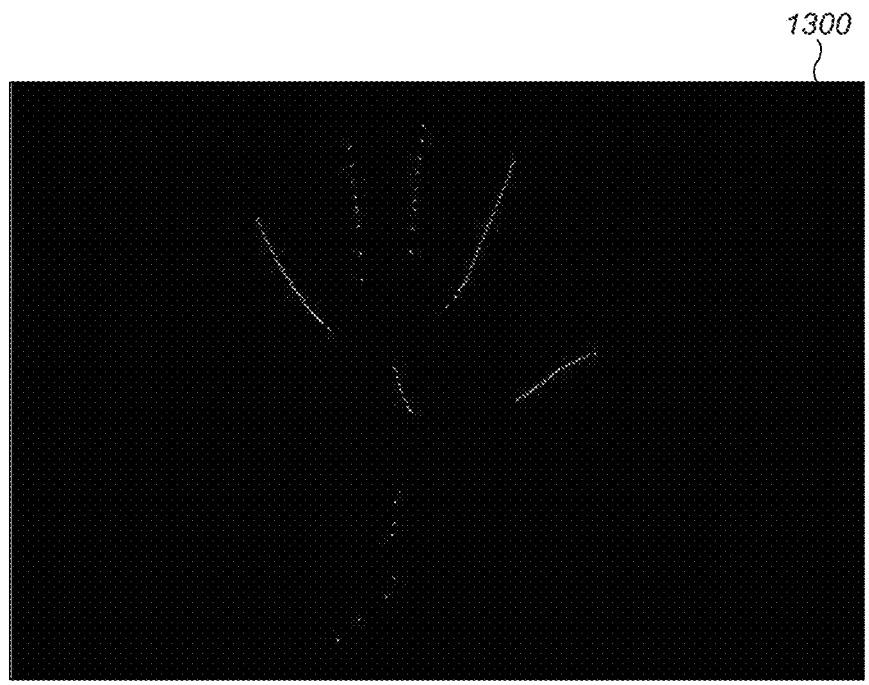

FIG. 13 shows the image 1300 after the detection of the stationary local maxima points, shown here in white.

Figure 14:
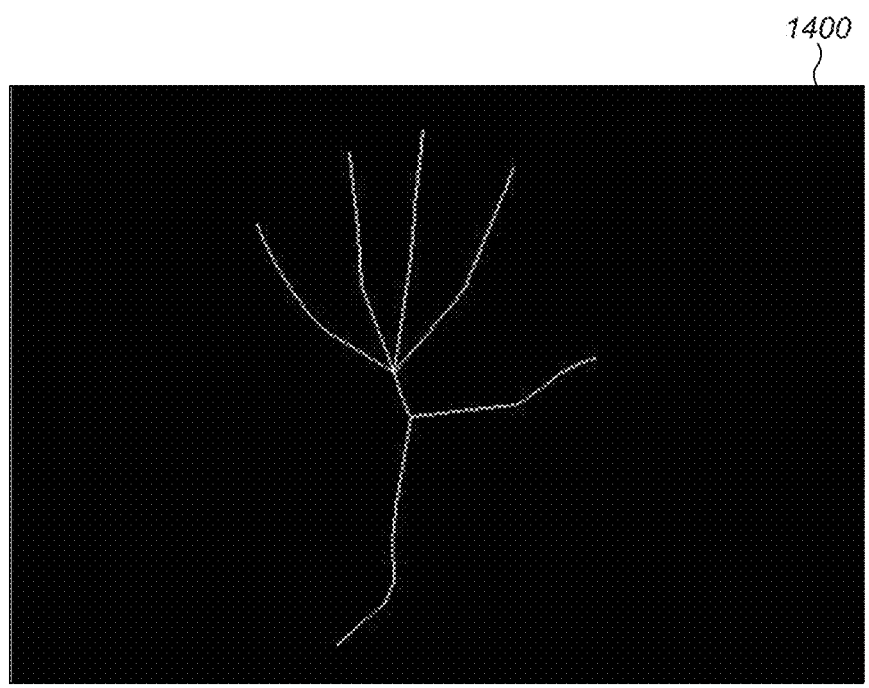

FIG. 14 shows the final skeletonized result 1400 from the image in FIG. 13, with only the medial lines of the region in white.

Figure 15:
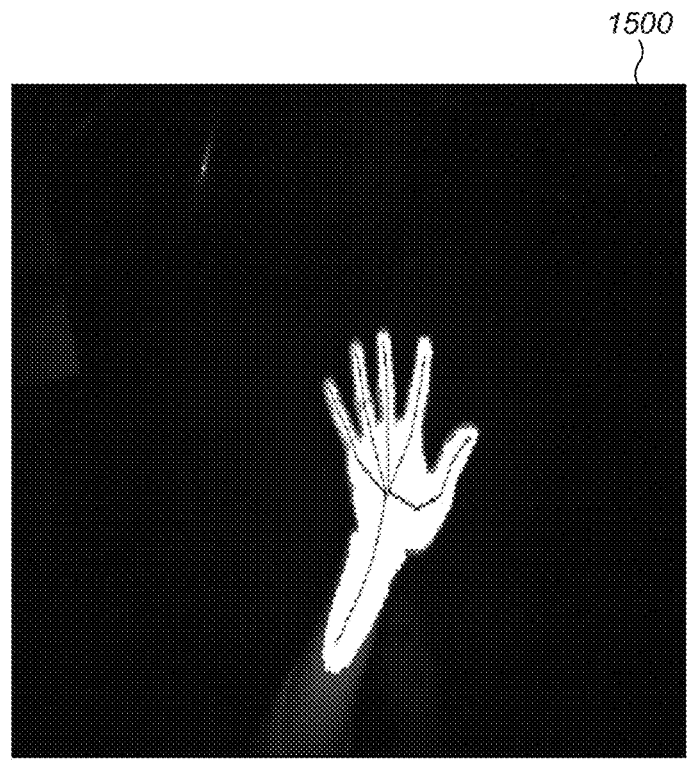

Finally, FIG. 15 shows a single camera infrared hand tracking 1500 to be viable in a real-time setting.

C. Evaluation of Hand Detection

The method as presented above also has some drawbacks. To be able to detect multiple objects, some segmentation of the original binary image must be applied to detect separate nodes on separate trees that have separate root nodes. Otherwise, the method will try to combine multiple hands into one hierarchy, regardless of whether they are physically connected.

Simple heuristics are useful here, for instance when segmenting the binary image to work on each detected object separately it is useful to take the largest in area n groups of pixels belonging to detected objects and only perform work on these. This helps to ensure that the hardware has sufficient time to compute the necessary medial line model hierarchies for each segmented object group. It may also be of interest to use simple thresholding in combination with median filtering to obtain the initial binary silhouette, whose smoothness is key due to the use of the.

There are also improvements to be had in the construction of the minimum spanning tree wherein nodes that are repeated and do not add significant extra data can be dropped to remove complexity and save bandwidth when storing the minimum spanning tree. This can be achieved by using Euclidean distance or reusing the warped distance metric—when the difference in straight line distance is close enough to the sum of the distances to nodes at increasingly large distances away, then intervening nodes may be dropped. This could help to keep the spanning tree down to a fixed size for the purposes of ensuring that memory and bandwidth limits are respected. This step may also be necessary to convert the spanning tree constructed of medial lines into a skeletal model.

It is also not clear to what extent the mixture of Gaussians technique is necessary for background subtraction and segmentation as due to their complexity and storage requirements it would be helpful to avoid using a per-pixel statistical model to segment the background. However, the initial production of a high quality binary image is of paramount importance to the algorithm, and so if no other effective background subtraction algorithm can be found, the mixture of Gaussians seems to be the gold standard approach although potentially complicated with a high level of resource usage from the standpoint of an embedded approach.

III. Sensor Fusion and Applications

With the integration of multiple data coming from the two different principles (acoustic and optical) in a cheap embedded system, it is possible to achieve the complete tracking of an object floating in mid-air. The expenses required to process the acoustic and optical data is intended to be very low and to happen on-chip, in order to intelligently eliminate as much of the expensive bandwidth (that common ToF cameras share) as quickly and simply as possible, while retaining all the necessary tracking data. This is so that such a system has a low latency and can respond and track quickly, but importantly also have a low build cost.

Gesture applications aim at remotely control home appliances, automotive dashboards, smart televisions or portable devices, by translating human movements into actions and directives. Since fast response time, low latency, medium range, low power consumption and centimeter-level accuracy are usually a requirement, the sensor fusion system is naturally targeted for these applications. Gesture detection can be achieved by taking different features corresponding to relevant features of the tracked target and using machine learning or other classification systems to attach semantic meaning.

Figure 16:
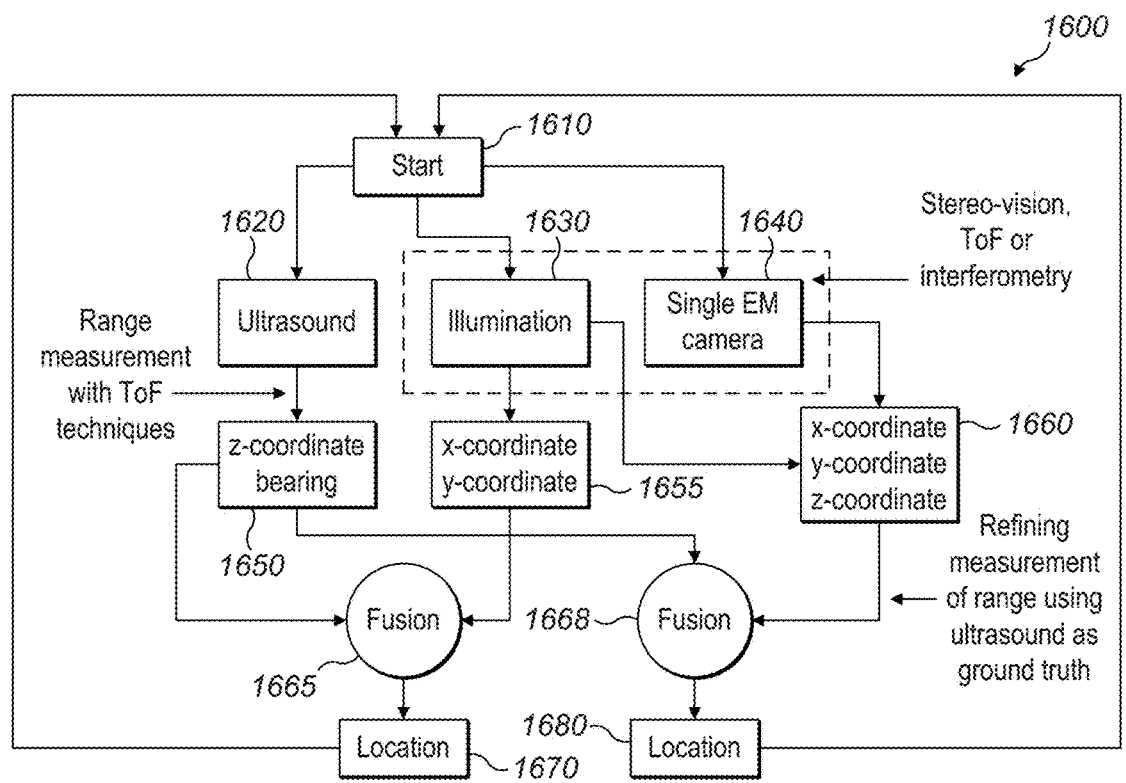
FIG. 16 is a flowchart of a sensor fusion systems.

FIG. 16 depicts the flowchart 1600 of the sensor fusion systems described herein. Location data 1670, 1680 is fed into a start module 1610, when then associates with an ultrasound 1620 and 2 single EM cameras 1630, 1640. The ultrasound 1620 then associates with a z-coordinate bearing 1650 via range measurement with ToF techniques. The first single EM camera 1630 associates with an x-coordinate, y-coordinate bearing 1655 and/or an x-coordinate, y-coordinate, z-coordinate bearing 1660. The second single EM camera 1640 associates with the x-coordinate, y-coordinate, z-coordinate bearing 1660. The EM cameras 1630, 1640 may use stereo-vision, ToF or interferometry.

A first fusion module 1665 gathers data from the z-coordinate bearing 1650 and the x-coordinate, y-coordinate bearing 1655 to calculate a first location 1670. A second fusion module 1668 gathers data from the z-coordinate bearing 1650 and the x-coordinate, y-coordinate, z-coordinate bearing 1660 to calculate a second location 1680. Both of these processes refine measurement of range using ultrasound as ground truth.

IV. Additional Disclosure

1. A time-of-flight sensor fusion system for depth and range sensing of objects which integrates multiple data coming from embedded acoustic and one optical camera.

A system of paragraph 1, which uses amplitude, frequency, phase modulation or a combination of those, to modulate the emitted acoustic signal A system of paragraph 1, which uses a combination of temporal and spatio-temporal acoustic modulation techniques A system of paragraph 1, which uses narrowband signal as an emitted acoustic signal A system of paragraph 1, which uses a broadband signal as an emitted acoustic signal A system of paragraph 1, which uses virtual acoustic point sources as a method to perform tracking while producing a haptic feedback A system of paragraph 1, in which a pipeline of EM/infrared data is able to recognize a hand and output the location and topology of the hand in its projection plane A system of paragraph 1, which uses trilateration based on time of arrival, to estimate the position of the center of mass of the tracking object with respect to the array of acoustic sensors A system of paragraph 1, which uses multilateration based on time of arrival or on difference of time of arrival (DToA), to estimate the position of the center of mass of the tracking object with respect to the array of acoustic sensors A system of paragraph 1, which uses hyperbolic and trigonometric methods based on time of arrival, to estimate the position of the center of mass of the tracking object with respect to the array of acoustic sensors A system of paragraph 1, which uses one or more methods to estimate the direction of arrival, to further constrain the position of the target 2. A time-of-flight sensor fusion system for depth and range sensing of objects which integrates multiple data coming from embedded acoustic and multiple optical camera.

A system of paragraph 2, which uses amplitude, frequency, phase modulation or a combination of those, to modulate the emitted acoustic signal A system of paragraph 2, which uses a combination of temporal and spatio-temporal acoustic modulation techniques A system of paragraph 2, which uses narrowband signal as an emitted acoustic signal A system of paragraph 2, which uses a broadband signal as an emitted acoustic signal A system of paragraph 2, which uses virtual acoustic point sources as a method to perform tracking while producing a haptic feedback A system of paragraph 2, in which a pipeline of EM/infrared data is able to recognize a hand and output the location and topology of the hand in its projection plane A system of paragraph 2, which uses trilateration based on time of arrival, to estimate the position of the center of mass of the tracking object with respect to the array of acoustic sensors A system of paragraph 2, which uses multilateration based on time of arrival or on difference of time of arrival (DToA), to estimate the position of the center of mass of the tracking object with respect to the array of acoustic sensors A system of paragraph 2, which uses hyperbolic and trigonometric methods based on time of arrival, to estimate the position of the center of mass of the tracking object with respect to the array of acoustic sensors A system of paragraph 2, which uses one or more methods to estimate the direction of arrival, to further constrain the position of the target 3. A single camera optical system for detecting object pose wherein;
the input camera image is reduced to a binary image wherein each pixel either does or does not belong to a detected object;
a squared signed distance transform is performed on each pixel to detect the square of the two-dimensional Euclidean distance to the object boundary.

A system of paragraph 3, wherein stationary points are detected and used to build a medial line model.

A system of paragraph 3, wherein the root node of the medial line model is chosen to be the node with maximum squared distance from the boundary.

A system of paragraph 3, wherein stationary points making up potential nodes for a medial line model may be culled using a squared spatial distance metric.

A system of paragraph 3, wherein the square root of the squared distance from the boundary is computed only for potential nodes of a medial line model.

A system of paragraph 3, wherein a warped distance metric is computed for each potential node in a medial line model which is the spatial distance to the root node with the distance to the boundary subtracted from it.

A system of paragraph 3, wherein the edges of the medial line model are constructed by applying a hybrid of a greedy algorithm and a classical minimum spanning tree algorithm to a priority queue of potential nodes.

(5). Phase Modulated Spherical Wave-Fronts in Acoustic Phased-Arrays

I. Phase Modulated Spherical Wave-Fronts in Acoustic Phased-Arrays

As previously disclosed, one way of tracking a user's hand is by means of an optical camera. Introducing a phase modulation of the sinusoidal continuous waves enables the tracking of an object in mid-air by time-of-flight estimations.

In the following example, a message is encoded in the sinusoidal transmitted signal in the form of many sharp flips of phase at known instants in time. A received signal is recorded and demodulated at some remote locations by means of receiving transducers. Introducing a phase modulation into the transducers' signal allows receiving transducers or microphones to synchronize on the transmitted signal, yielding the ability to detect the distance of an object, such as the hand, from the array.

Inserting phase flips in the in-phase carrier frequency of each transducers of a 2D array, in such a manner to make them collide at a focus, yields the generation of spherical wave-fronts with different phases, within, for example, an in-phase wave-front. The tracking system described herein exploits the benefit of having a spherical spreading wave-front, as opposed to focusing techniques. In fact, the spherical-spreading feature increases the spatial resolution of the acoustic tracking system by spreading the acoustic power over bigger volumes, especially if compared to the beamforming techniques mentioned above. The tracking waveform should be a signal made up of suitably orthogonal functions so that it may be picked at receivers' locations. They could be a known sequence of encoded phase shifts. These signals would be reflected from objects in the field allowing existing echo processing techniques, such as multilateration, to perform tracking.

The concept of spherical phased modulated wave-front is antithetical to beamforming. In fact, the wave-front can be generated assuming a focus located at negative heights with respect to the position of the phased array, which can be called anti-focus. It is effectively the center of the generated sphere. In this case, acoustic waves combine to produce a spherical wave that appears to come from behind the emitters. The position of the anti-focus effectively determines the radius and the steering of the sphere, and hence its ability to spread over smaller or bigger volumes of the medium.

Figure 17:
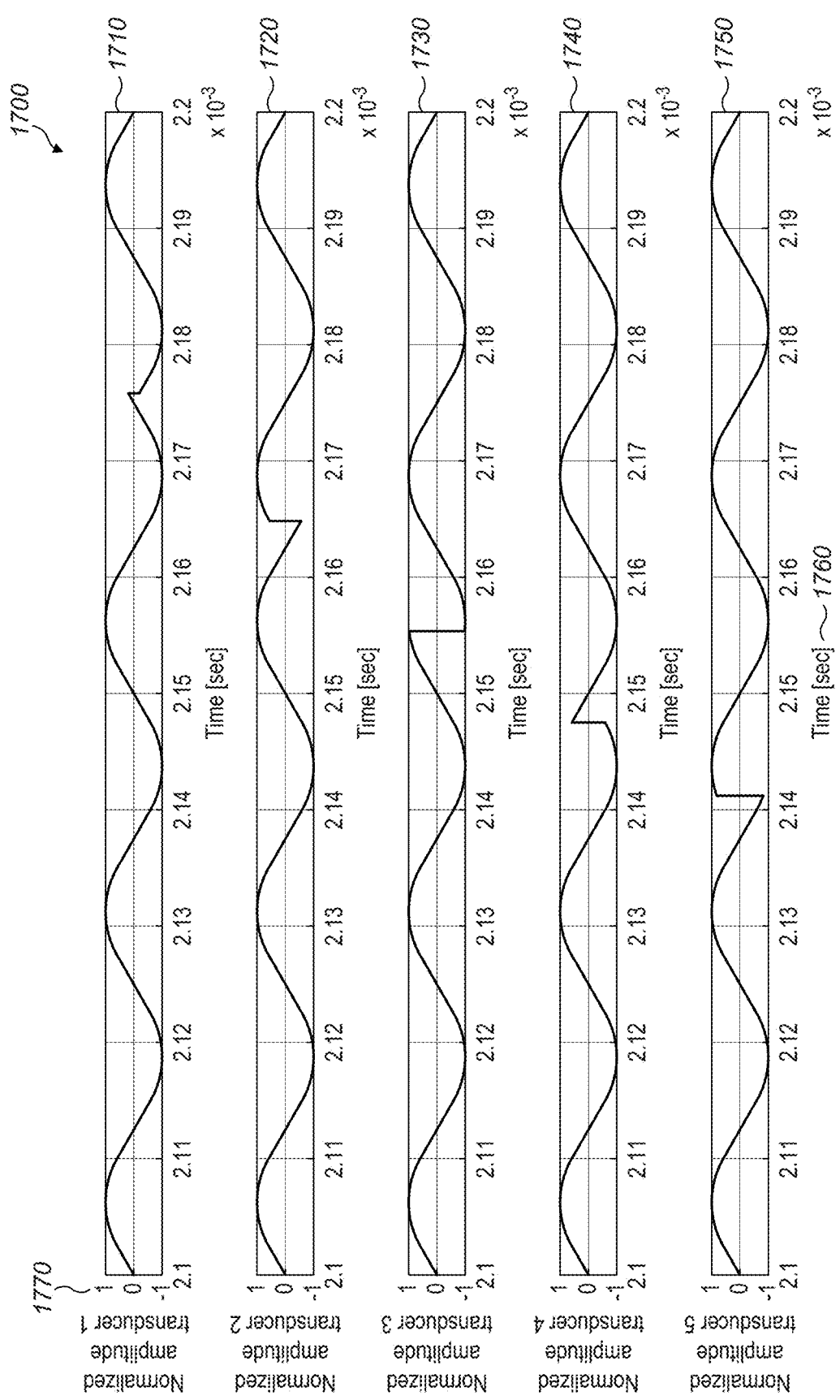
FIG. 17 is a set of graphs that show signals emitted by 5 transducers.

FIG. 17 is a set of graphs 1700 showing the signal emitted by the first 5 transducers of a 1D array of 16 transducers in order to produce a phase modulated wave-front with phase equal to $\pi$, with an anti-focus at negative 0.16 m at a central position, a carrier frequency of 40 kHz and an in-phase amplitude modulated wave-front. Each signal graph 1710, 1720, 1730, 1740, 1750 has an x-axis 1760 of time in seconds and a y-axis 1770 of normalized amplitude. FIG. 17 shows that the carrier wave for each individual transducer is in-phase, whilst the phase discontinuity is introduced at different instances in time.

Figure 18A:
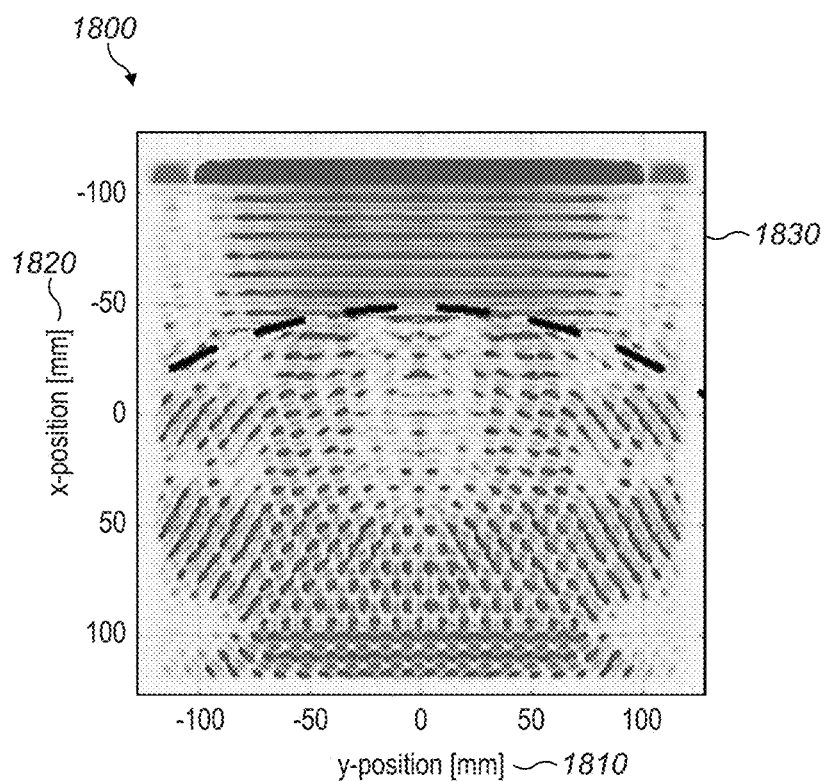
FIGS. 18A and 18B are video snapshots of a numerical simulation.
Figure 18B:
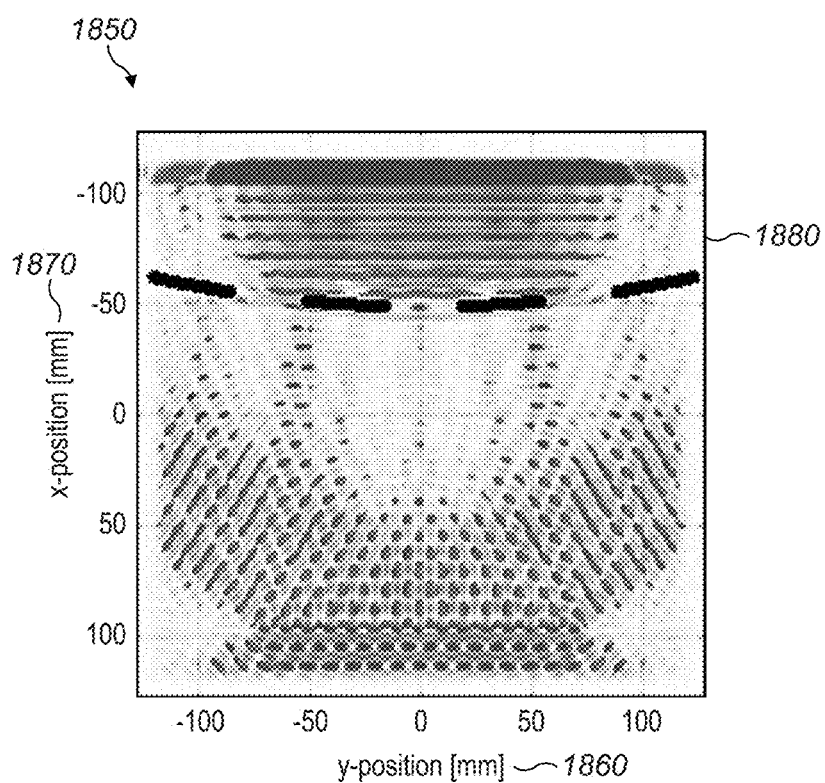

FIGS. 18A and 18B show two snapshots 1800, 1850 from the video of a numerical simulation, showing the acoustic pressure wavefield in the case of an anti-focus at negative 0.16 m above the array and centrally located, with a flat horizontal obstacle placed at 0.2 m. FIG. 18A is a simulation 1800 with an x-axis of y-position in mm 1810 and a y-axis of x-position in mm 1820 with a snapshot 1830. FIG. 15B is a simulation 1850 with an x-axis of y-position in mm 1860 and a y-axis of x-position in mm 1870 with a snapshot 1880.

In the simulation, the transducers are considered to be omnidirectional point sources, and equally spaced by 0.01 m. The spherical phase wave-front generated from the array is visible at a height of approximately −50 mm in both plots. The spherical phase wave-front generated is moving upwards, toward the reflector in FIG. 18A, while moving back after being reflected off the surfaces of the obstacle in FIG. 18B. The black dotted lines show the positions.

II. Tracking of the Object

As previously discussed, the introduction of phase and/or frequency modulation into the transducers' signal yields the ability to detect the distance of an object, such as the hand, from the array and control point. Each receiver yields an estimation of the distance of the object. In case phase modulation is adopted, the signal that arrives at the receiving location is a complicated analog waveform that needs to be demodulated in order to recover the original message. The demodulation is accomplished through a standard process called 'carrier recovery' which consists of figuring out both the frequency and phase of the modulating sinusoid, or by locking the phase with respect to a reference clock, when possible.

The phase modulation and the frequency at which phase inversions are encoded in the signals can be dynamically tailored to match the sensing objective and the environment.

The presence, location and distance of the reflector in space is revealed once the time-of-flight is recovered. Moreover, if the reflector does not have a predominant dimension, a trilateration/multilateration process would reveal its approximate position in the tri-dimensional space. At contrary, if the reflector has a predominant dimension, it could be possible to trilaterate the equation of the plane of best approximation relative to an arbitrary coordinate reference system in the tri-dimensional space.

III. Additional Disclosure

1. An acoustic technique in which phase modulation is used to generate spherical phase wave-fronts within a multitude of different amplitude modulated wave-fronts.

A method of paragraph 1, which is used for object tracking.

A method of paragraph 1, which is used for haptics and object tracking simultaneously.

A method of paragraph 1, which is interpolated with some focused states to create focused regions of acoustic power (for example to produce haptic sensation) and track objects simultaneously.

A method of paragraph 1, in which the modulation parameters can be dynamically tailored to match the sensing objective and the environment.

(6). Long Wavelength Phase Modulation of Acoustic Field for Location and Tracking of an Object I. Introduction The description relates to the algorithm, data path architecture, IP and implementation of a technique by which the location of an object within an acoustic field may be determined. More specifically, the field has a characteristic of a phase modulation added to the otherwise natural phase of the acoustic field. Furthermore, the modulation is a long wavelength sinusoidal modulation in a specific example, but not limited to such an example.

The description applies specifically to location in a volume of air in the presence, or using, an acoustic field. The approach is the basis of a large number of more sophisticated algorithms, approaches and capabilities that would effectively use the fundamental distance and location information provided by the base layers of the process. For example, triangulation to locate the reflector within the volume, or multilateration techniques to apply more sophisticated and more capable processing to the base data in order to extract higher levels of conclusions.

The use of a long modulation wavelength allows one to distinguish a wider range of physical displacements without ambiguity in the signal's phase, and also improves the forgiveness of the overall system to the small perturbations that would be considered irrelevant, or even noise, in the system. The use of a slowly changing sinusoidal modulation reduces the undesirable effects of audible noise that may result from transient approaches with the transducer arrays.

Spatial Nyquist requirements mean that sensors need to be separated by less than half the wavelength of the field to be sensed. For short wavelength fields, this would mean a high density of small sensors would be required. The use of a long wavelength further allows sensors to be placed relatively far apart, for example to span the dimensions of a transducer array, while still maintaining the spatial Nyquist requirements. This reduces the costs of implementation and makes it possible to build various configurations of array that include transducers for emission and sensors arranged optimally with reasonable sized sensors and transducers.

The long wavelength phase modulation technique may be used concurrently with a haptics field without the need for a specific time slot in which to stop the haptics and generate a field specifically for the tracking. In order to recover the phase modulation, knowledge of the haptics phase is required, and this could be made available by the solver which determines the transducers' relative phase trajectories in the first place. Alternatively, rather than seeking knowledge of the phases of the emitters in order to remove from the sensed field, it is conceivable that the phases of the emitters are changing sufficiently rapidly relative to the long wavelength modulation that they may be simply filtered off as part of the phase demodulation. Noting that the long wavelength modulation may be configured with different wavelengths, then it is further possible to use a wavelength which is known to be sufficiently different from the emission phases such that recovery of the wanted signal is facilitated, and to make this choice for each variant of the emitted field.

This technique may use continuous modulation, and hence continuous sensing of location. This enables a high update rate for the calculated location of the object, not limited by physical fundamentals such as the speed of sound or the range of the location and tracking. The update rate would be limited only by the rate at which the electronics is able to process the relevant data, which then gives the product designer flexibility to tradeoff between cost and performance. This then yields an enhanced tracking capability through higher resolution of the location and also smoother tracking trajectories. Tracking an object in a volume as the object moves is made possible and enhanced. Gesture recognition using simple signal processing becomes possible with the real-time tracking of reflectors.

The key parameters of the modulation may be modified, or manipulated in real time, to enable further capabilities.

One example is to vary the modulation index (for SNR in the demodulated phase, for example), or the modulation wavelength depending on requirements, or array geometries and distance involved for example when the reflector is moving.

Another example is to partition the array spatially, for example into quadrants, and apply a phase modulation of different wavelengths to the emitters in each quadrant. This way the sensed signals' phase modulations may be used to determine not only the location of the reflector, but also the orientation of the reflector from the relative powers of the different wavelengths sensed.

This approach is scalable to higher levels of sophistications, to varieties of sensors, be they transducers of omnidirectional MEMS microphones, and to geometries/applications.

It is conceivable that the emitters and sensors be at different locations around a volume, for example around the cabin of a vehicle, as long as their relative positions are known or can be discovered by the system.

II. Phase Modulation of Fields

A phase is considered modulated if the phase, or timing, of the signal is altered in a manner that is known or may be determined. If the phase modulation conforms to certain bounding criteria, then the phase modulation may be considered to be a form of coding of information into the signal. Recovering the phase modulation allows one to effectively decode the information and determine key features that the coding was intended to convey, for example the time of flight.

The phase modulation may be the only active component in the field, for example in an otherwise planar acoustic field with no specific phase activity. In this scenario the plane wave is assumed to have all transducers in an array at the same carrier phase as each other. The phase modulation is added to the natural phase of all of the transducers, and thus the whole field's phase is modulated relative to the carrier.

Additionally, the phase modulation may be added to the otherwise natural phase of any acoustic field. For example, a field generated to steer or focus energy within a volume requires that the relative phases of the transducers be specified, coordinated and controlled. Therefore, the natural phase of such a field is unlikely to be planar and may also be changing with time. In this scenario, the phase modulation is added in a synchronized fashion to all transducers, and thus create a modulated phase baseline upon which the steering and/haptic field may be built. This means that this approach can be used concurrently with haptics.

III. Range of Wave Shapes

It is conceivable, and advantageous in certain circumstances, to generate acoustic fields with different characteristics. For example, a convex or concave phase wave front where the phase modulation either spreads out in the volume or becomes focused in the volume respectively.

Further alternatives would include a scanning focal point of phase within the volume, or a scanning wall of modulated phase. These latter options offer the opportunities to also locate the boundaries of the reflector.

IV. Sensing Reflections and Location

A generated field reflects off objects within the volume of the field. The reflected waves are sensed, generating electrical signals representing the waves sensed by the sensors, and the signals may be digitized for further digital processing. The phase modulation recovered from the sensed signals and is compared to the reference phase to determine the distance travelled by the wave. A distance may be calculated for each sensor, and thus knowing the arrangement of sensors allows one to calculate the location of the reflector.

With a sufficient number of sensors (e.g. three or more) it is possible to determine the 3D location when the sensors are all located in a plane. More sensors yield improved precision and accuracy.

Sensors are used to sense the pressure waves in the volume and to generate electrical signals that represent the sensed pressure levels. The phase modulation of a reflected wave is recovered from the electrical signal and this recovered phase is compared to the reference phase to determine the effective time of flight of the sensed wave, or equivalently the distance from emitter, to reflector, then to sensor. The reference modulation phase is known to the system, either a priori or else through sensing the modulated emissions directly. It requires knowledge of the unmodulated carrier, the modulated carrier and the sensor signals. These can all be sampled from an operational array. The overhead of the carriers' waveforms is shared among all the sensors.

Figure 19:
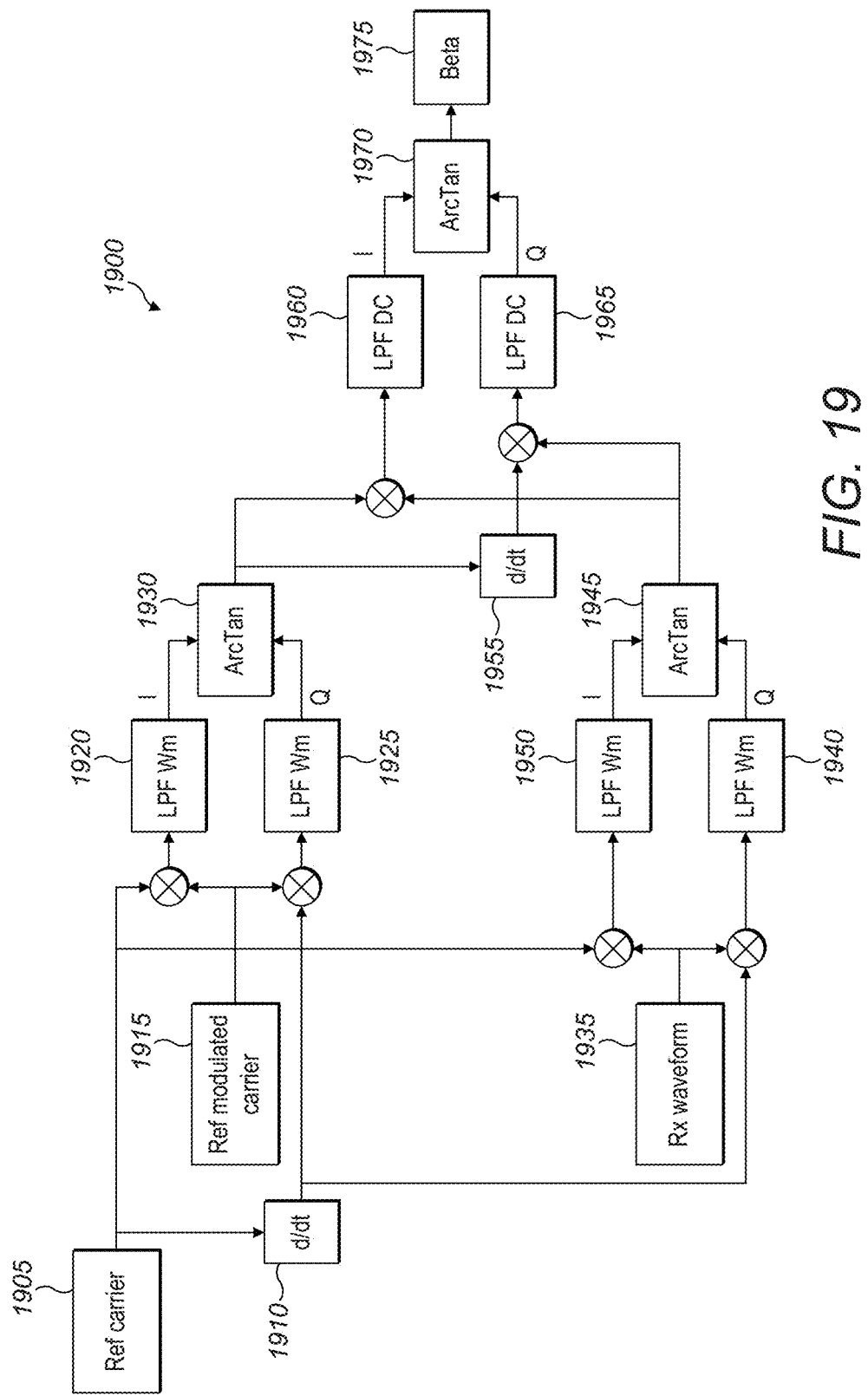
FIG. 19 is a data path schematic.

FIG. 19 shows a data path schematic 1900 that can be used to determine the distance of a reflector from one sensor. A reference carrier 1905 interfaces with a reference modulated carrier 1950 and then with a first low-pass filter 1920 before being processed by a first arctangent module 1930. The reference carrier 1905 is also processed by a first differentiator 1910 and then: (i) interfaces with a reference modulated carrier 1950 and then with a second low-pass filter 1925 before being processed by the first arctangent module 1930; and (ii) interfaces with the receiver waveform 1935 before being processed by a third and fourth low-pass filters 1950, 1940 before being processed by a second arctangent module 1945. The results of the foregoing are: (i) fed into a fifth low pass filter 1960 and then processed by a third arctangent module 1970; and (ii) processed by a second differentiator 1955 and then fed into a sixth low pass filter 19605 and then processed by a third arctangent module 1970. The output of the third arctangent module 1970 is fed to produce the temporal signal beta (β) 1975.

Two banks of low pass filters are used. The filters with label "LPF Wm" 1920, 1925, 1950, 1940 indicate filters with corner frequency to allow the modulation frequency to pass through largely unaffected, and attenuating components outside that band. The filters with label "LPF DC" 1960, 1965 indicate filters with corner frequency to allow only the very low frequencies through largely unaffected, and attenuating components at other frequencies.

The blocks with labels "d/dt" 1910, 1955 indicate a differentiation, or subtraction of adjacent sample values. An alternative approach for deriving the quadrature component of the reference modulation would be to apply a delay in the signal path at that node, equivalent to shifting the waveform by one quarter of a cycle.

Figure 20:
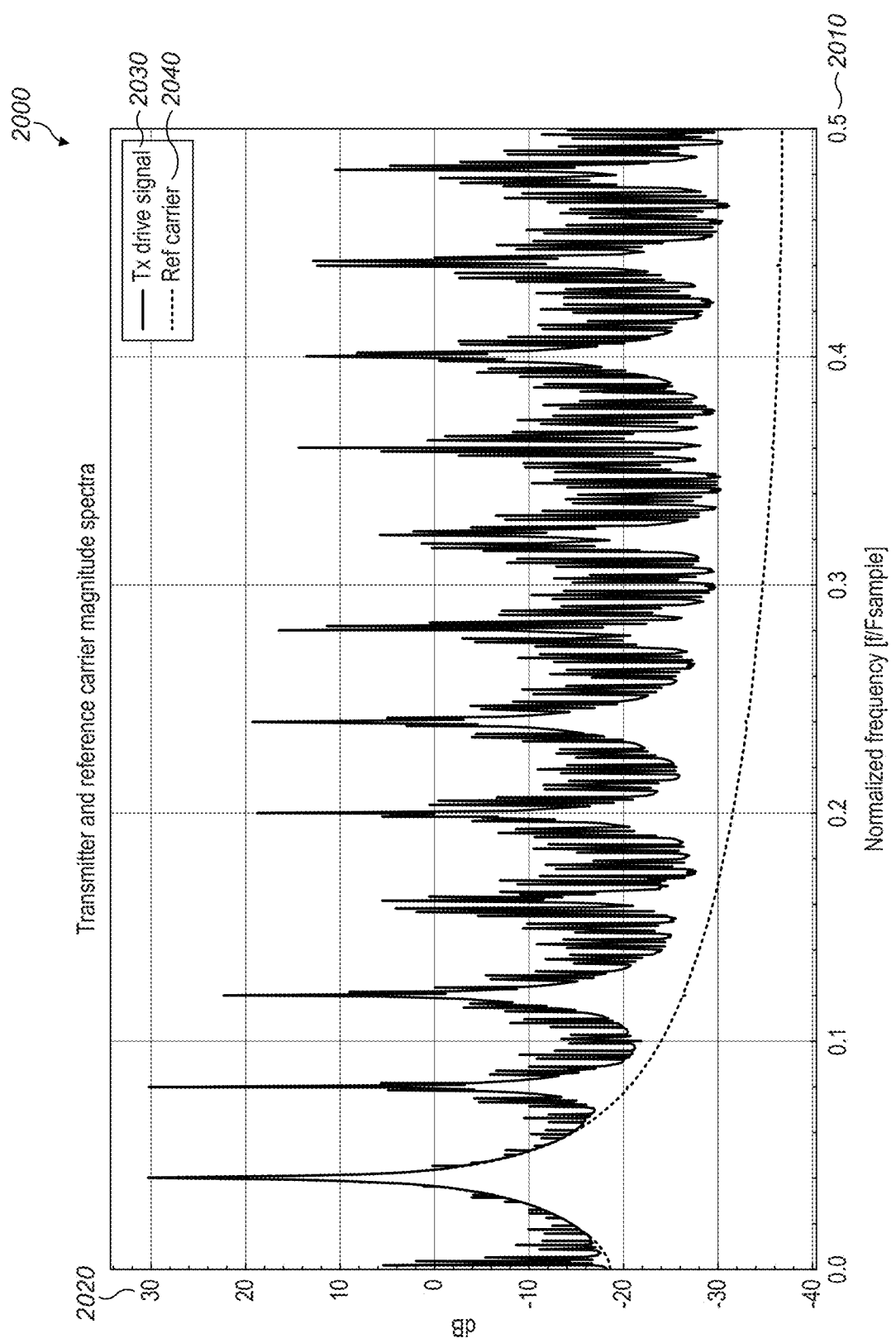
FIG. 20 is a graph showing the magnitude spectra of two signals.

FIG. 20 is a graph 2000 having an x-axis 2010 of normalized frequency and a y-axis 2020 of dB showing the magnitude spectra of two signals: (i) the digitized signal representing the digital drive signal of the carrier 2030; and (ii) the digital signal derived from the drive signal to represent the fundamental frequency of the carrier 2040. This is performed by filtering out the undesirable harmonics and components in the first signal. In other words, FIG. 20 shows the frequency magnitude spectrum of the transmitter drive signal, and the frequency magnitude spectrum of the reference carrier recovered from the drive signal.

A similar approach may be used to extract the modulated carrier from an equivalent digitized signal driving a phase modulated transmitter, for example.

The reference modulation is extracted from the reference modulated carrier by mixing with the reference carrier. The following plots show the phase modulation in the recovered reference carrier, that is the inline (I) and quadrature (Q) components of the reference phase modulation.

Figure 21:
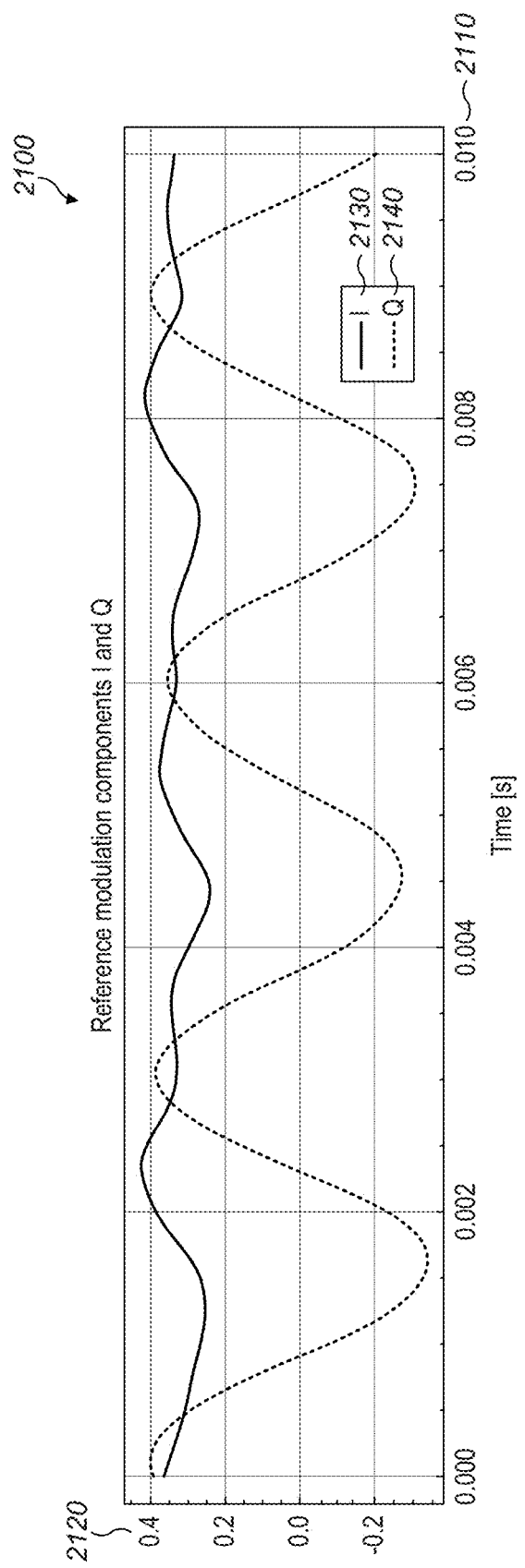
FIGS. 21, 22 and 23 are graphs showing reference modulation components.

FIG. 21 is a graph 2100 with an x-axis 2110 of time in seconds, a y-axis 2120 of output in radians, a plot for I 2130 and a plot for Q 2140.

Figure 22:
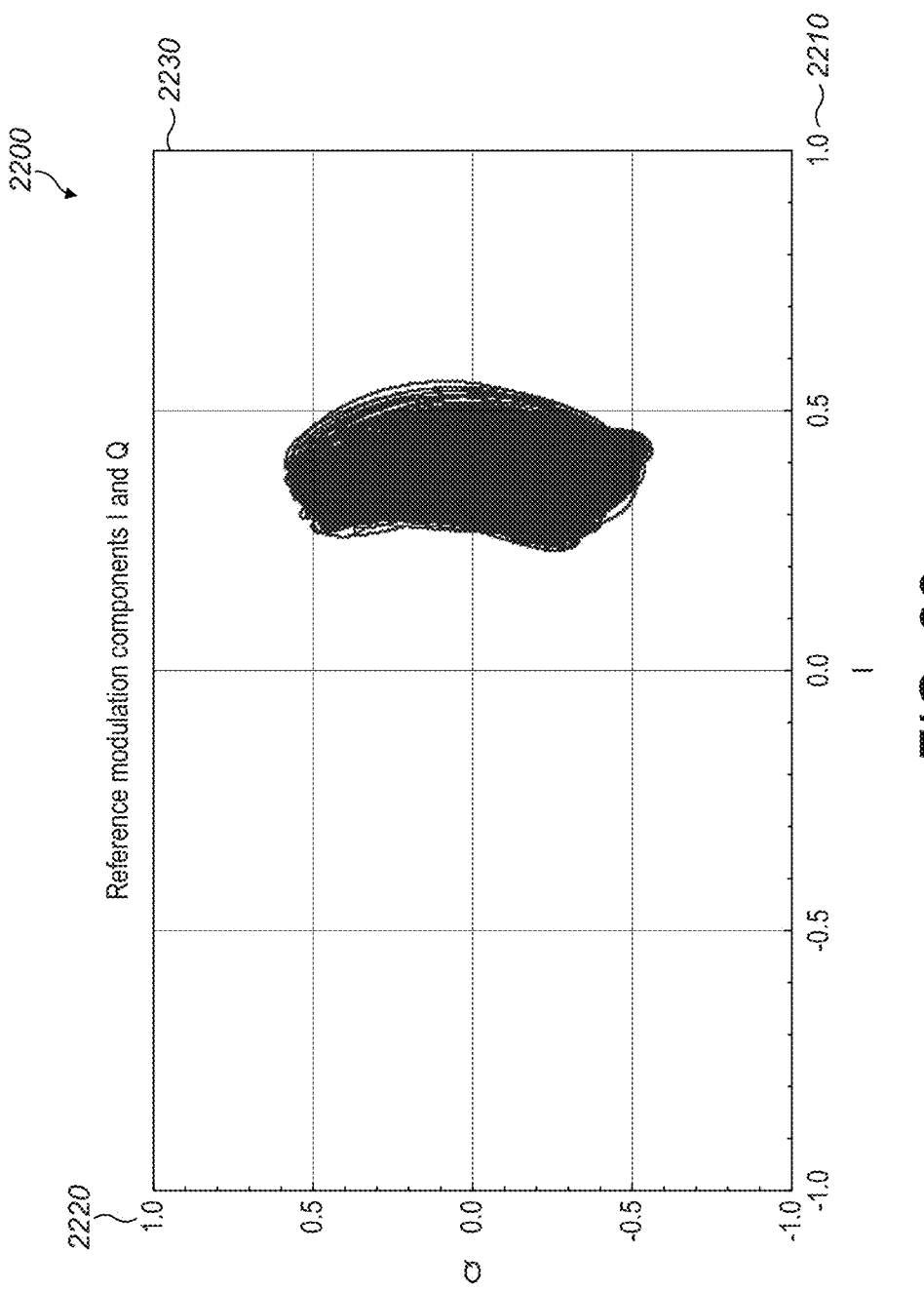

FIG. 22 is a graph 2200 showing reference phase modulation in the IQ domain. The x-axis 2210 is I in radians, the y-axis 2220 is Q in radians and the plot 2230 shows the parametric plot between the two.

Figure 23:
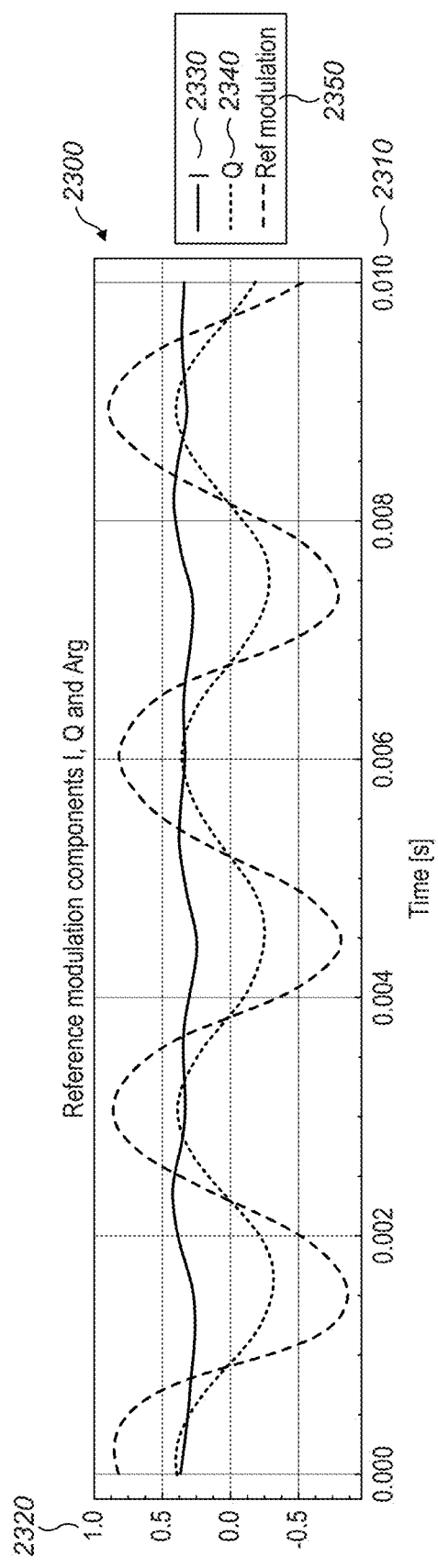

FIG. 23 is a graph 2300 showing inline/quadrature components and reference phase modulation. The graph 2300 has an x-axis 2310 in seconds, a y-axis 2320 in radians, an I plot 2330, a Q plot 2340 and a reference modulation plot 2350.

FIG. 21 and FIG. 22 show the components of reference modulation, or the modulation of the phase of the transmitter signal. FIG. 23 shows the IQ components and the resulting extracted reference phase modulation. This is the reference against which the phase modulation of the sensed signal is compared in order to determine the total time of flight.

A similar mixing technique is used to recover the phase modulation from a sensed, or received, signal. The following shows the modulation of a reflected wave recovered from a sensor.

Figure 24:
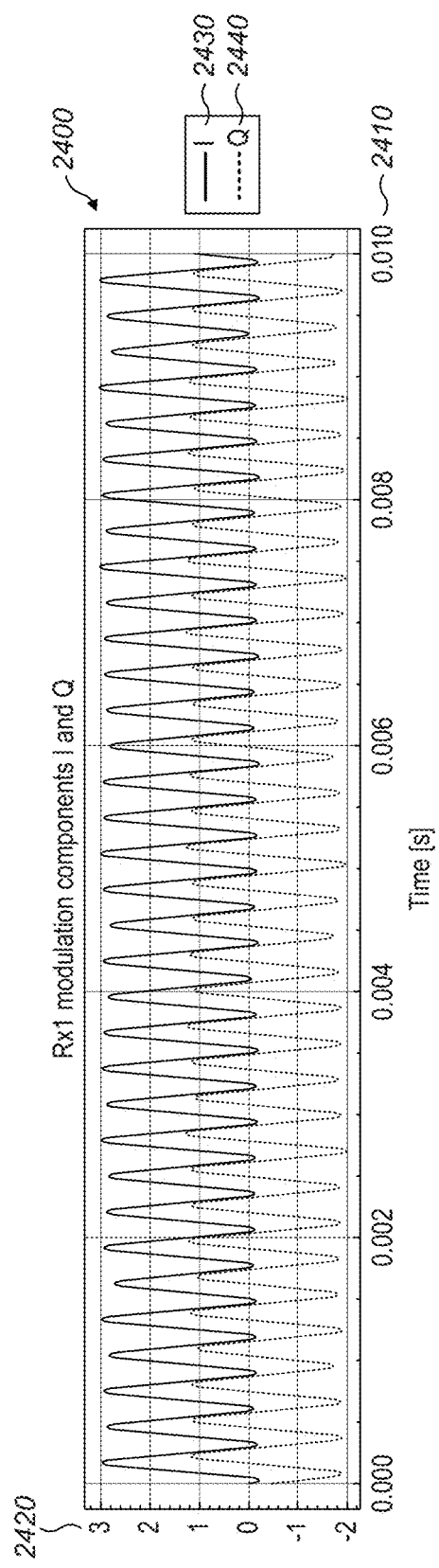
FIGS. 24, 25 and 26 are graphs showing receiver modulation components.

FIG. 24 is a graph 2400 showing the Inline and Quadrature components of the received phase modulation. The graph 2400 has an x-axis 2410 of time, a y-axis 2420 of radians, a plot for I 2430 and a plot for Q 2440.

Figure 25:
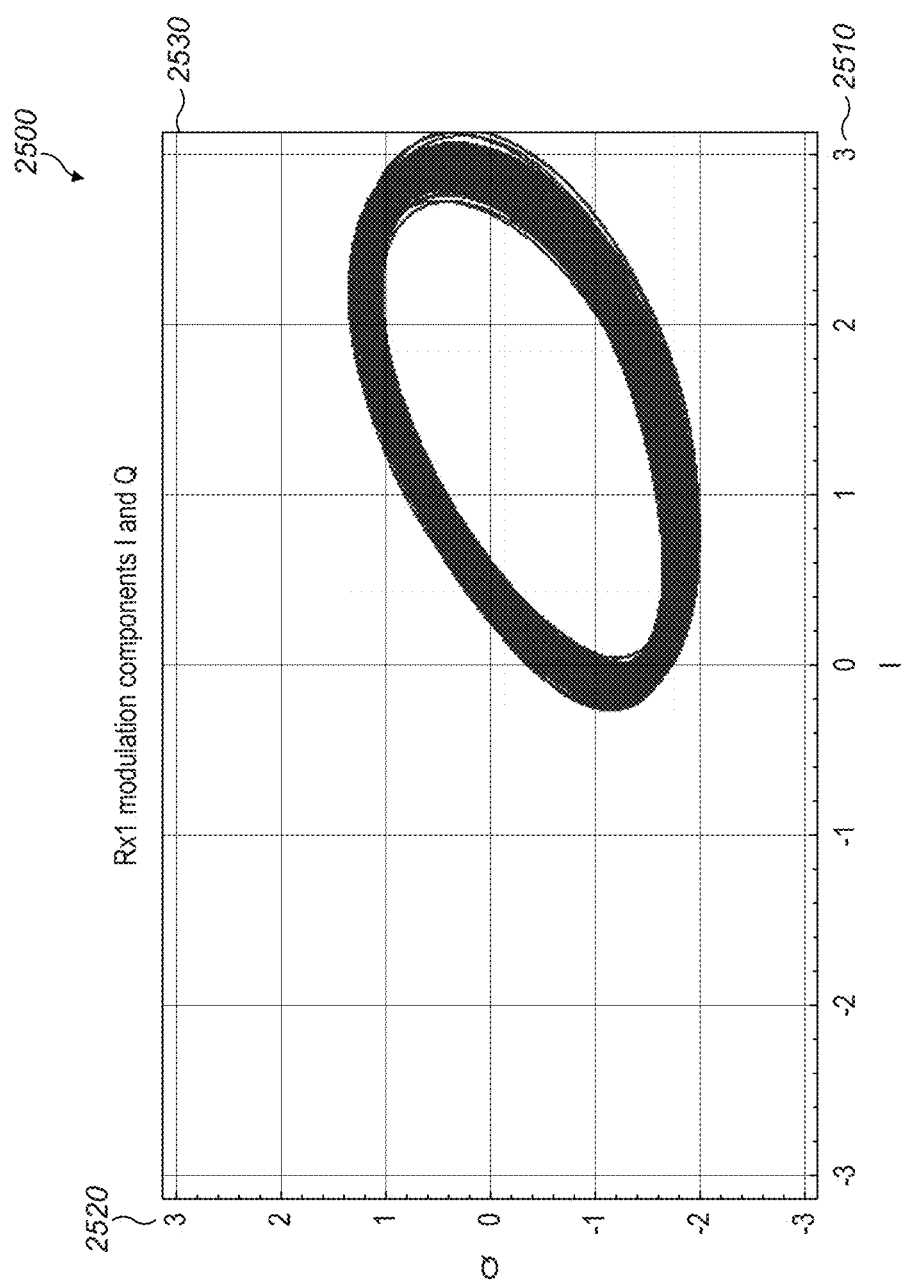

FIG. 25 is a graph 2500 showing received phase modulation in the IQ domain. The x-axis 2510 is I in radians, the y-axis 2520 is Q in radians and the plot 2530 shows a parametric plot between the two.

Figure 26:
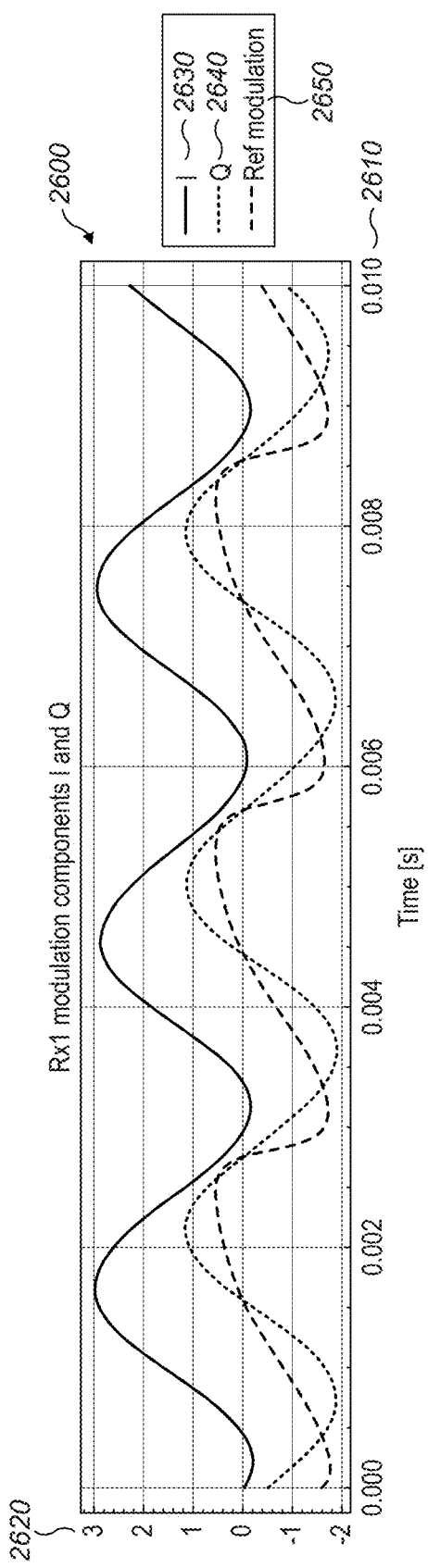

FIG. 26 is a graph 2600 showing Inline/Quadrature components and received phase modulation. The graph 2600 has an x-axis 2610 of time, a y-axis 2620 in radians, a plot for I 2630, a plot for Q 2640 and a plot for received phase modulation 2650.

FIG. 24, FIG. 25 and FIG. 26 show the IQ components resulting from the mixing, and the phase modulation in the received waveform recovered in this manner.

Figure 27:
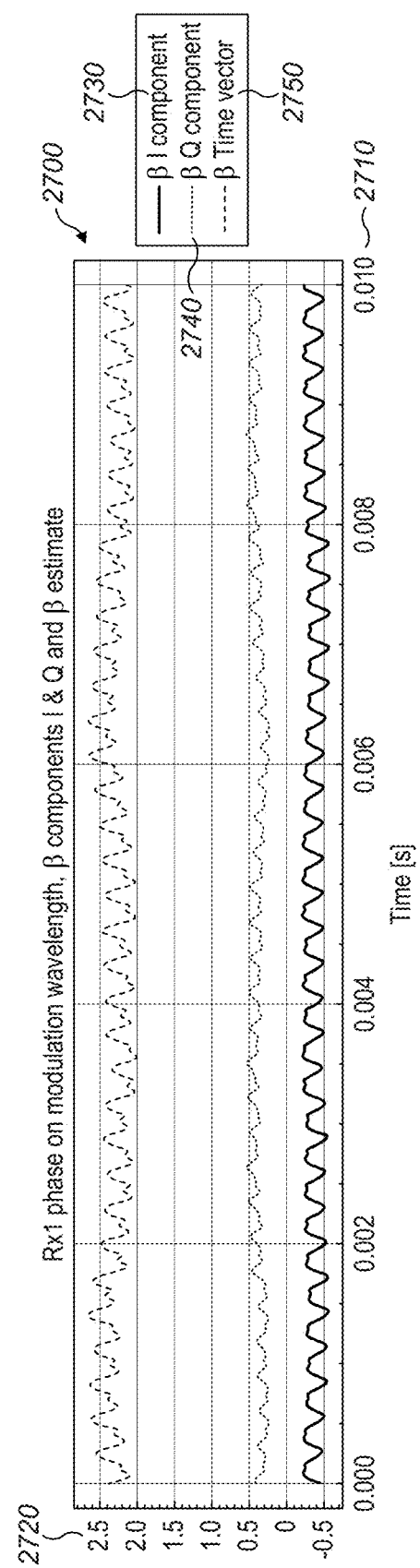
FIGS. 27 and 28 are graphs showing receiver phase on modulation components.

The difference between the received phase modulation and the reference phase modulation is measured as shown in FIG. 19 by mixing the two signals and combining to yield a temporal signal, β, representing the estimated difference between received and reference phase. FIG. 27 is a graph 2700 showing the time domain signals resulting from the estimation of the difference between the modulated phase in the receiver compared to the reference modulated phase. The graph 2700 has an x-axis 2710 in seconds, a y-axis of radians 2720, a plot for the β I component 2730, a plot for the β Q component 2740 and a plot for the β time vector 2750.

Figure 28:
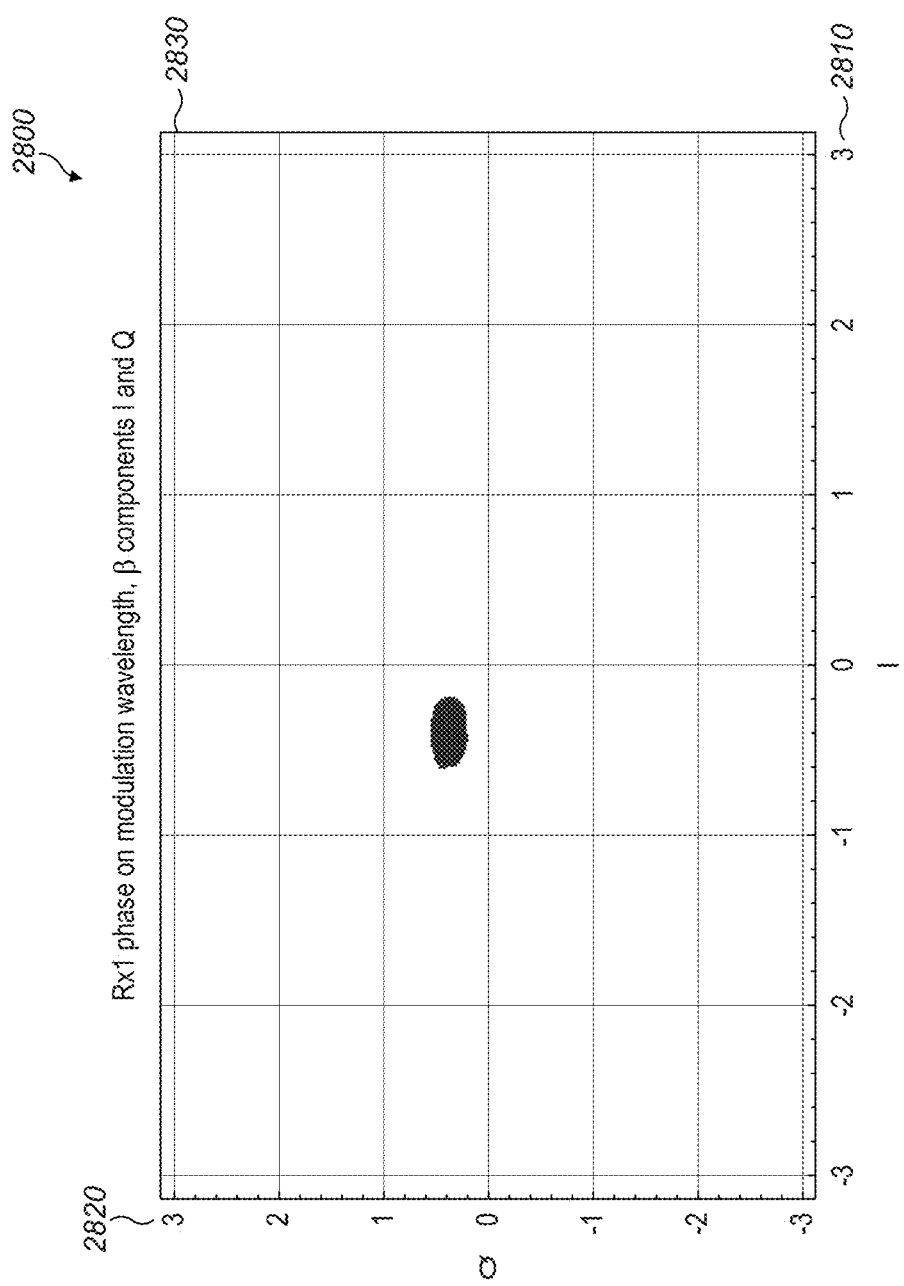

FIG. 28 is a graph 2800 of the IQ domain view of estimated difference between received and reference modulated phase. The x-axis 2810 is in radians showing I, the y-axis 2820 is in radians showing Q and the plot 2830 shows the parametric plot between the two. FIG. 28 shows the IQ components of the estimate in the IQ domain, yielding a small distribution of values and thus correctly indicating that the reflector is stationary relative to the transmitter and receiver.

The estimate of phase difference is linearly related to the distance travelled by the acoustic wave from transmitter, to reflector and finally to the receiver. The time domain estimate of phase difference may be filtered or averaged to yield a stable estimate of phase difference, from which the distance travelled by the acoustic wave may be calculated.

The above description is extended to include a number of transmitters, or a number of receivers, or multiple transmitters and receivers.

From the estimated distances, and geometry of the emitters and sensors, the location of the reflector may be determined. A number of approaches are possible here, starting with simple trigonometry and geometry. Other approaches are also possible, for example envelope of spheres centered on each sensor or multilateration.

Orthogonal axes of sensors in a plane may be used to determine the location of the reflector projected onto the plane. Orthogonal axes in three dimensions may be used to locate within a volume.

The axes do not need to be orthogonal to each other, but orthogonal axes provide the highest precision for the space bounded by the sensors, or size of an array.

The reflector's position, projected onto each axis, may be calculated for each axis joining sensors from knowledge of the reflector distance to each of the sensors. Projecting on to two or more axes yields a location in 2D or 3D. For a planar array of sensors, the axes would be in one plane and so these projections would yield a 2D location projected onto the array.

From two or more sensors, the angle of arrival may be estimated along each axis describing these sensors. Numerous axes may be utilized to locate within a volume.

Furthermore, the elevation of the reflector is also estimated from knowledge of the location of the sensors and the relative distances to the various sensors. Combining the elevation with the location projected on to the 2D plane yields the 3D location of the reflector.

A technique for recovering the modulation of the phase baseline from a reflection in an active haptics acoustic field allows one to compare to the reference modulation phase, and thus calculate the distance travelled from emitter to sensor. The solver which determines the relative phases of the emitters has the required information, and if this is static then the task is simpler. However, even in a changing haptic field it is conceivable that the phase information for the haptics could be derived and removed from the net phase to arrive at the wanted phase modulation. Alternatively, if the wanted phase modulation wavelength is long compared to the wavelength (reciprocal rate of change of phase) of the changing haptic field, then there is a strong possibility of the mixing and filtering may remove the phase for the haptics generation, yielding sufficient information indicating the phase modulation. Furthermore, given that the wavelength of the phase modulation may be altered, the choice of phase modulation wavelength could be made in order to facilitate the recovery of the modulated phase in the presence of the phase changing due to haptics since the characteristics of the haptic field are known a priori. These concepts are yet to be demonstrated in a model but are certainly conceptually possible.

A further variant of the current solution is to compare the phase modulation in two or more sensed signals directly and without the use of knowledge of the transmitted signal. Direct comparison of modulated phase between two sensed signals yields information regarding the differential phase between the two received signals, which in turn is proportional to the differential distance, or the difference in the distance, travelled by the acoustic wave from transmitter to reflector and then to each of the sensors. The differential distance may then be used to locate the reflector in the volume as well, for example deriving the estimated angle of arrival of the wave. The advantage of this technique of comparing modulated phase of two received signals directly reduces the complexity of the system, and therefore also the cost, by eliminating the requirement to provide a sampled stream of the reference modulated carrier and also the processing associated with the same signal. For full 3D location of the reflector in this scenario, the elevation of the reflector may need to complement the information gained from the differential phase.

V. Additional Disclosure

Inventive steps of the foregoing may include:

Using a phase signal that is orthogonal to the haptics generation, and so does not disrupt or degrade the haptics generation.

Application of a long wavelength phase modulation of an acoustic field as a signal generator for the purposes of sensing reflected waves, determining the phase of the modulation in the sensed signal through demodulation and comparing the demodulated phase to the transmitting phase in order to determine the distance of the reflector from the transmitter and receiver(s).

Use of a long wavelength, longer than the total distance travelled by the wave, to remove ambiguity in phase between transmitter and receiver that would result from using wavelengths shorter than the total distance travelled by the acoustic wave.

Continuous phase modulation of an acoustic field in real time means that the sensing system may estimate distance continuously and in real time (quantized only by the sampling rate of the system), and so freeing the system update rate from the constraints of the speed of sound that would apply in a sound type of approach.

Long wavelength modulation may be configured with varying modulation index and modulation wavelength in space and time to better suit the particular application, range or environment. Larger modulation index yields improved demodulated SNR and signal dynamic range but spreads the energy of the modulated carrier wider in the frequency domain and thus degrades raw SNR. The longer modulation wavelengths allow measurement of distance over a longer range without ambiguity, but the very long wavelengths would require higher resolving power in the data path, e.g. to resolve smaller rates of change of phase in the presence of real system noise.

Use of configurable modulation wavelength allows one to use spatial coding, for example an array may be partitioned into a number of sub-sections, each of which using a different modulation wavelength. The sensing system is then able to deduce more information about the reflector, for example the distance and orientation, by comparing the relative contributions of the different modulation wavelengths present in each receiver's signal.

The relatively low barrier to implementation, in terms of number of sensors, compatibility with arrays, and current software, makes this a key candidate for location/tracking IP.

Additional paragraphs of disclosure are:

1. A method comprising:
generating an acoustic field with known phase modulation;
sensing acoustic energy reflected from an object;
converting the acoustic energy into electrical signals;
processing the electrical signals to determine location of the object in the volume.

2. The method as in paragraph 1, wherein the phase modulation wavelength is long compared to the carrier wavelength.

3. The method as in paragraph 2, wherein the wavelength is selected to eliminate spatial aliasing in the system while also allowing a sparse population of receivers.

4. The method as in paragraph 2, wherein the rate of change of phase is controlled to reduce and eliminate audible side effects in the system.

5. The method as in paragraph 2, wherein the processing allows a continuous streaming of data and update to the estimated location.

6. The method as in paragraph 2, wherein the phase modulation wavelength varies according to the location of the emitters in the system to apply spatial coding, and phase modulation wavelength may also vary in time.

7. The method as in paragraph 1, wherein the electrical signals are digitized for subsequent processing.

8. A method as in paragraph 1, further comprising a phase modulation that is orthogonal to other features of the acoustic which may be used for other purposes.

9. The method in paragraph 8, wherein the other purpose of the acoustic field is haptic feedback in midair.

10. The method as in paragraph 9, wherein the phase modulation wavelength is long compared to the carrier wavelength.

11. The method as in paragraph 10, wherein the wavelength is selected to eliminate spatial aliasing in the system.

12. The method as in paragraph 10, wherein the rate of change of phase is controlled to reduce and eliminate audible side effects in the system.

13. The method as in paragraph 10, wherein the processing allows a continuous streaming of data and update to the estimated location.

14. The method of paragraph 1 in which the acoustic field with coded phase is generated by at least one emitter.

15. The method of paragraph 1 in which the reflected acoustic wave is sensed by at least one sensor.

16. The method in paragraph 9 in which the reference coded phase is known with sufficient precision at the emitter that the location calculation yields sufficient accuracy.

17. The method in paragraph 9 in which the reference coded phase is extracted from the signal driving the emitter of the same reference coded phase.

18. The method in paragraphs 2 and 10, wherein the phase coding in the sensed signal is extracted and compared to the reference phase coding in order to calculate the distance of the reflector from the sensor.

19. The method in paragraphs 18, wherein the calculated distances from each sensed signal are combined to calculate a location of the reflector.

20. The method in paragraphs 2 and 10, wherein the sensed signals are combined directly to calculate the differential phase in the coded phase and therefore the differential distance travelled by the acoustic wave to each of the sensors.

21. The method in paragraphs 2 and 10, wherein the coding applied to the phase is sinusoidal modulation.

22. The method in paragraphs 2 and 10, wherein the coding applied to the phase is level coded and with a repeat distance more than twice the maximum distance that is to be sensed and calculated to avoid ambiguity in location of reflector.

(7). Camera Calibration Through Ultrasonic Range Sensing

I. Brightness Optimization

The brightness received at a camera location, as scattered light from an object illuminated with infrared (IR) light, is thought to be dependent on the range of the tracked object from the source of light.

The 3D depth sensor system proposed herein consists of a source of illumination, an optical camera in its proximity and an acoustic tracking system. The latter consists of a set of transducers (up to possibly only one). They could be part of integrated haptic feedback, parametric audio, levitation systems, or a stand-alone tracking system supporting other applications. They could work in simplex or duplex mode, estimating the depth coordinates with traditional time-of-flight measurement.

Figure 29:
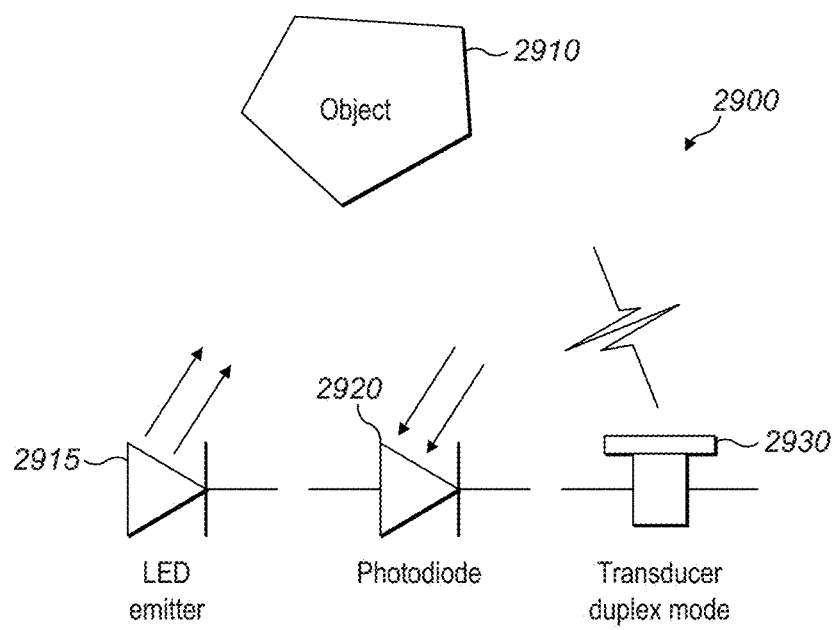
FIG. 29 is a 3D depth sensor system.

FIG. 29 shows an exemplary 3D depth sensor system 2900 of this kind in which a LED emitter 2915 is chosen as source of light. The sensor system 2900 also includes an object 2910, a photodiode 2920 and a transducer in duplex mode 2930.

Given a source of IR light and an IR camera to its proximity, different data sets were collected during an experimental investigation to train an algorithm correlating the amount of reflection of light from a hand illuminated with IR, with its range from the source of light. Specifically, the depth coordinates of the center of the palm of one hand and the brightness of the pixel associated to the center of the palm were extracted and collected for each measurement. This enabled the exploitation of the depth coordinate (i.e., the distance between the center of the camera and the palm center) as the ground truth (or target value) to train the optimization algorithms.

Two experiments were run reducing the intensity of IR light emitted by the LEDs and received by the camera, using two different types of photographic neutral-density (ND) filters, one low and one high filter. ND filters reduce the intensity of all the wavelengths of light at the camera locations by the same factor. Hence, two different methods were used to collect data:

1. By using an IR illuminator as an EM light source, with low ND filter
2. By using an IR illuminator as an EM light source, with high ND filter Two training sets were collected during the experimental investigations. In method 1, there were 3516 training samples collected. In method 2, there were 4951 training samples collected.

Figure 30:
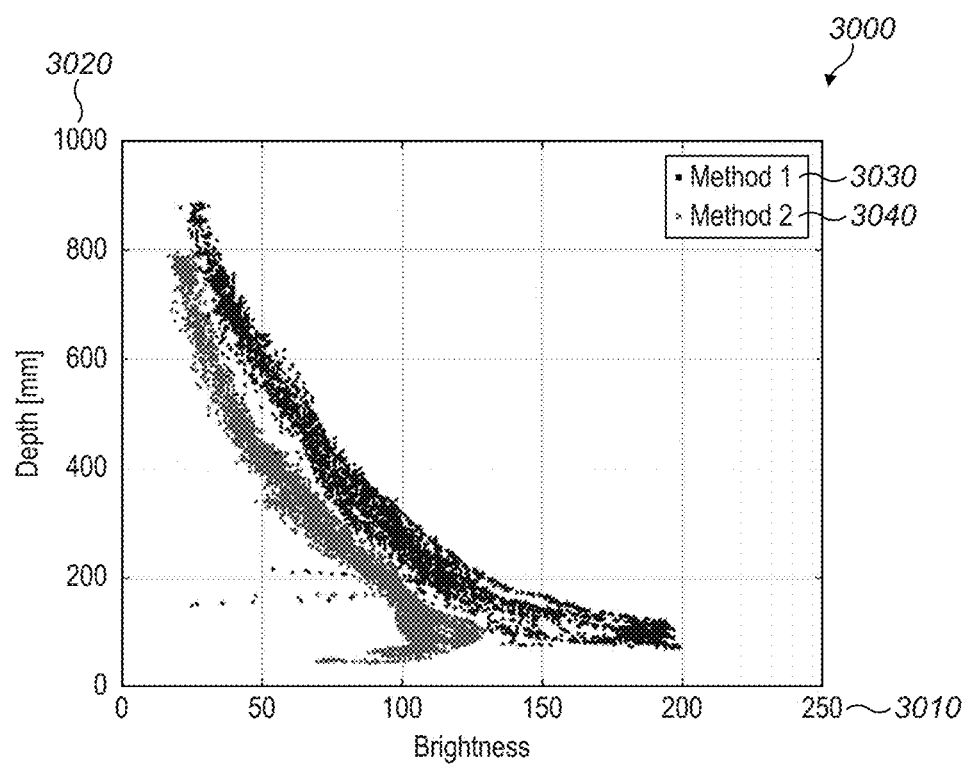
FIG. 30 is a graph showing brightness versus depth.

The data is presented in FIG. 30, which shows a graph 3000 having an x-axis 3010 of brightness in uncalibrated units, a y-axis 3020 of depth in mm, a plot of method 1 3030 showing a parametric plot between the two and a plot of method 2 3040 showing a parametric plot between the two.

Showing brightness versus depth, FIG. 30 displays a trend for which depth values are low when intensity values are high. Specifically, data shows a clear second order correlation between depth and brightness. When the high ND filter is used to reduce the intensity of the IR illuminator (method 2), brightness values associated to the same depth are lower. Specifically, the correlation between brightness and depth seems to undergo shifts in the x-axis for different values of light intensities and reflectance of the tracked object.

FIG. 30 suggests the best fit for the training set to be a single-variable, second order polynomial function, expressed as:

$$\hat{f}(x) = a \cdot x^2 + b \cdot x + c \qquad (28)$$

Where the single variable x is the brightness of the pixel associated to the centre palm, and a, b and c are the coefficients of the polynomial. From $\hat{f}(x)$, the range associated to other relevant features of the hand (e.g. finger) can be estimated from their respective brightness values.

The data can be labelled with the index n=1, . . . , N, so that each data point consists of a value of x, denoted by $x^n$, and a corresponding desired value for the output $\hat{f}(x)$, denoted by $t^n$, with w being a vector of polynomial coefficients. In order to find suitable values for the coefficients of the polynomial, it is commonly considered the error between the desired output $t^n$, for a particular input $x^n$, and the corresponding value predicted by the polynomial function given by $f(x^n; w)$. The least-square regression involves minimizing the square of the error, summed over all data point, as follows:

$$E = \frac{1}{2} \sum_{n=1}^{N} \{f(x^n; w) - t^n\}^2 \qquad (29)$$

Figure 31A:
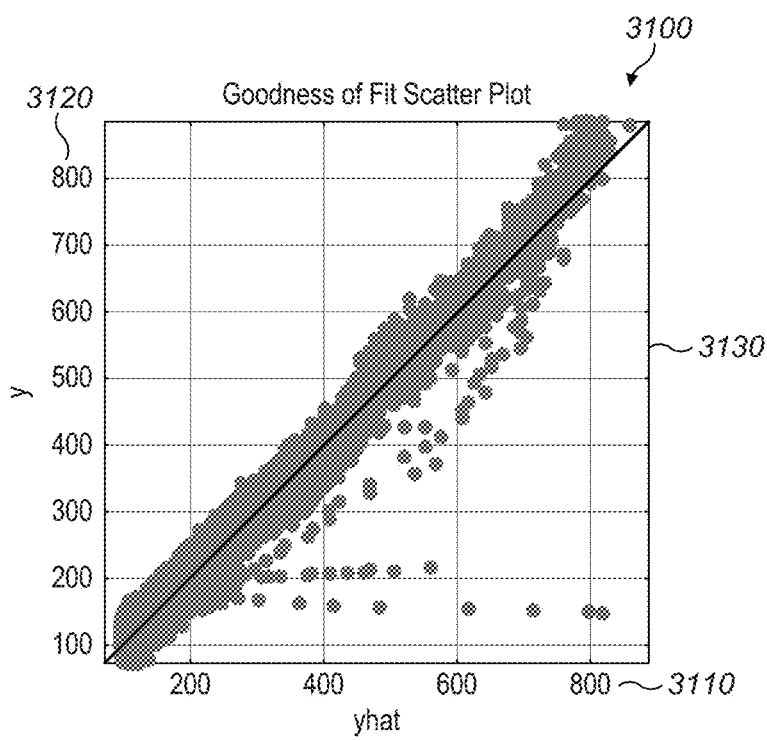
FIGS. 31A and 31B are scatter plots of the goodness of fit for training samples.
Figure 31B:
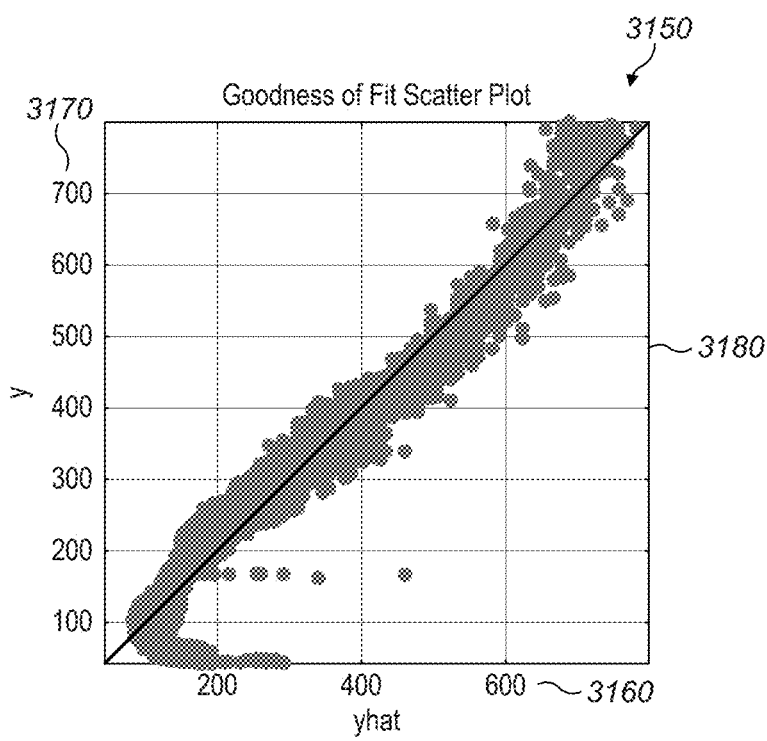

Least-square optimization leads to polynomial curve fitting with a coefficient of determination (R-squared) equal to 0.975 and 0.959 for method 1 and method 2. FIG. 31A shows the scatter plot 3100 of the goodness of fit of the training samples obtained with the data of method 1. The x-axis 3110 is that in mm, the y-axis 3120 is y in mm and plot 3130 shows goodness of fit. FIG. 31B shows the scatter plot 3150 of the goodness of fit of the training samples obtained with the data of method 2. The x-axis 3160 is that in mm, the y-axis 3170 is y in mm and plot 3180 shows goodness of fit. In these graphs, y is "ground truth," that is, real distance data, and that is the estimated value of distance $\hat{f}(x)$, where x is brightness.

The estimator $\hat{f}(x)$ is subject to a few assumptions and limitations. By hypothesis, it is assumed to be only dependent on brightness, which seems a reasonable statement considering the high value of the coefficient of determination.

II. Fusion System and Calibration

The estimator $\hat{f}(x)$ is also environment sensitive, especially to ambient IR lighting conditions and to reflectance of the tracked object. In fact, the use of different ND filters is likely to horizontally shift the brightness values, preserving the overall relationship with depth, as can be observed in FIG. 30. Hence, a continuous calibration of the algorithm is needed to correctly shift the second order polynomial based on the lighting level and the reflectance of the tracked object. This can be achieved if the range of relevant features of the tracked objects are known. Consider an acoustic tracking system as an example scenario. If the target range of the center of mass of the tracked object over time, t, is known, the equation (1) becomes a quadratic equation to be solved in terms of the correction factor K, when $\hat{f}(x)$ is equal to t:

$$\hat{f}(x) = a(x-K)^2 + b(x-K) + c \qquad (30)$$

Where x is the brightness of the pixel associated to the centre of mass of the tracked object (e.g. the center of a hand's palm) and the sign of K is dictated by the sign of the difference between t and $\hat{f}(x)$. The fusion between optical and acoustic data happening at this stage contributes to the definition of an accurate tracking depth system and depth algorithm. The range of other relevant hand's features (i.e. fingers) can be estimated with equation (3), once the correction factor has been assessed. Since the brightness of other relevant features of a hand would stay in a neighborhood of x, the consistent calibration of equation (3) throughout time assures the estimation not to be divergent from the real value. Calibration can be performed at fixed time intervals.

Figure 32:
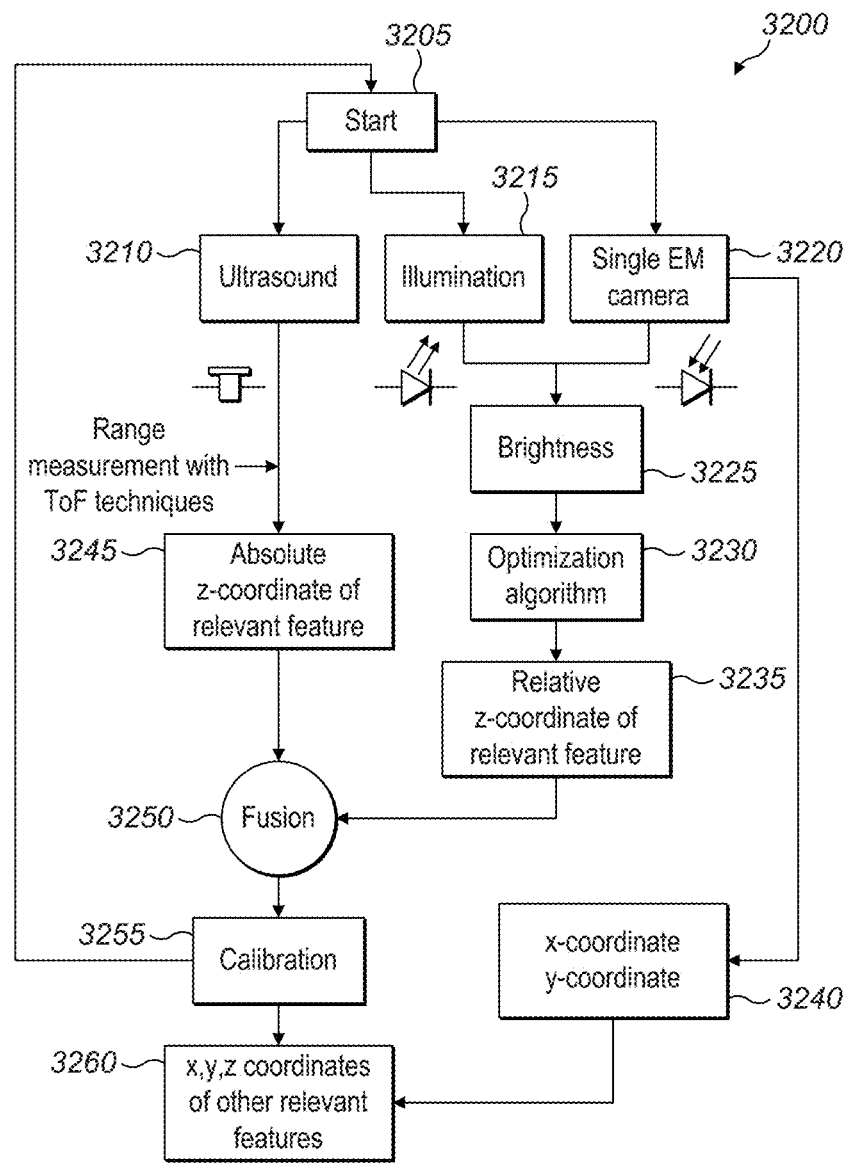
FIG. 32 is a flow chart of the 3D depth sensor system.

FIG. 32 is a schematic 3200 the steps required in the 3D depth sensor system based on the camera calibration through ultrasonic range sensing proposed herein. Calibration data 3255 is fed to the start module 3205, which is then split into ultrasound 3210, illumination 3215 and a single EM camera 3220. Using range measurement with ToF techniques the ultrasound 3210 is processed using the absolute z-coordinate of the relevant feature 3245 and then fed to the fusion module 3250. The illumination 3215 and a single EM camera 3220 merge and are: (i) processed by a brightness module 3255, an optimization algorithm 3230 and the relative z-coordinate of the relevant feature 3235; and (ii) then fed to the fusion module 3250. The fusion module undergoes calibration 3255 and then is combined with x-coordinate, y-coordinate data 3240 from the single EM camera 3220 to form x, y, z coordinates of other relevant features 3260.

III. Further Disclosure

Figure 33:
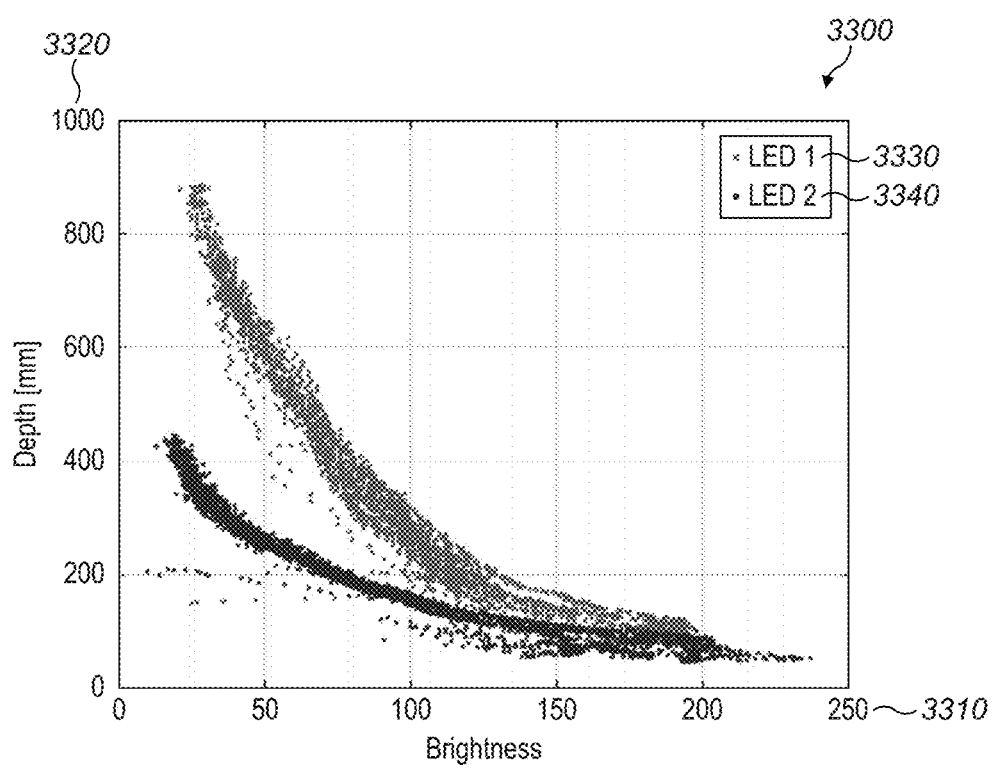
FIG. 33 is a graph showing brightness versus depth.

The estimator $\hat{f}(x)$ is also expected to be source and/or camera sensor specific. In fact, the use of a different source (or a different camera, or both) would change also the coefficients of the polynomial, leading to slightly different relationships. The effect of using a different source of IR light on the correlation between depth and brightness is shown in FIG. 33. FIG. 33 shows a graph 3300 having an x-axis 3310 of brightness in uncalibrated units, a y-axis 3320 of depth in mm, a plot of new LED 1 3330 showing the interface between the two and a plot of new LED 2 3340 showing the interface between the two. In this case a simple calibration would not help, but a new optimization algorithm should be trained and adjusted based on a collection of new, camera or source specific, training samples.

1. A 3D depth sensor system based on brightness optimization, collected with one single optical camera and calibrated exploiting with ultrasonic, time-of-flight measurements.

A system of paragraph 1, which uses a second order polynomial optimization algorithm to estimate range from brightness.

A system of paragraph 1, which is consistently calibrated with an acoustic tracking system at fixed update rates.

(8). Conclusion

While the foregoing descriptions disclose specific values, any other specific values may be used to achieve similar results. Further, the various features of the foregoing embodiments may be selected and combined to produce numerous variations of improved haptic systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method comprising:
defining at least one control point in space;
assigning a value equating to a desired amplitude at each of the at least one control point;
controlling a set of transducers to produce transducer output that creates an acoustic field exhibiting the desired amplitude at each of the at least one control points to generate haptic sensations toward an object;
controlling a set of transducers to produce transducer output to locate and track the object using the acoustic field orthogonal to the method used to generate the haptic sensations so that the locating and tracking proceeds while also providing the haptic sensations;
wherein the transducer output comprise: (1) an interpolation of a plane-wave state when the locating and tracking exploits modulated features of reflected signals; and (2) a focused-wave state haptic sensations are generated in mid-air.

2. The method as in claim 1, further comprising sensing the reflected signals, generating electrical signals representing the reflected signals, and digitizing the electrical signals for further processing.

3. The method as in claim 1, wherein the acoustic field comprises a coded phase generated by at least one emitter.

4. The method as in claim 1, further comprising:
selecting a phase modulation wavelength to eliminate spatial aliasing while also allowing a population of receivers having greater spacing than half of the phase modulation wavelength.

5. The method as in claim 1, further comprising:
selecting a phase modulation wavelength to eliminate spatial aliasing while also allowing a population of emitters having greater spacing than half of the phase modulation wavelength.

6. The method as in claim 5, wherein the phase modulation wavelength varies according to locations of emitters to apply spatial coding; and
wherein the phase modulation wavelength varies in time.

7. The method as in claim 1, wherein the processing comprises a continuous streaming of data and updates to the estimated location.

8. The method as in claim 1, further comprising:
extracting a first phase coding in the reflected signals;
comparing the first phase coding to a first reference phase coding and calculating a first distance of the object from a sensor based on such comparison.

9. The method as in claim 8, further comprising:
extracting a second phase coding in the reflected signals;
comparing the second phase coding to a second reference phase coding and calculating a second distance of the object from the sensor based on such comparison;
combining the first distance and the second distance to calculate a location of the object.

10. The method as in claim 1, wherein acoustic energy reflected from the object is combined to calculate a differential phase in a coded phase and a differential distance traveled by the acoustic energy to a plurality of sensors.

11. The method as in claim 1, further comprising:
applying coding to phase modulation in a form of sinusoidal modulation.

12. The method as in claim 1, further comprising:
applying level-coded coding to phase modulation having a distance an acoustic wave travels before the phase modulation repeats in time more than twice a maximum distance that is to be sensed by at least one sensor.

* * * * *